United States Patent
Tubaltsev et al.

(10) Patent No.: US 11,025,543 B2
(45) Date of Patent: *Jun. 1, 2021

(54) ROUTE ADVERTISEMENT BY MANAGED GATEWAYS

(71) Applicant: Nicira, Inc., Palo Alto, CA (US)

(72) Inventors: Ariel Tubaltsev, Los Gatos, CA (US); Ronghua Zhang, San Jose, CA (US); Benjamin C Basler, Los Altos, CA (US); Serge Maskalik, Los Gatos, CA (US); Rajiv Ramanathan, Palo Alto, CA (US); David J Leroy, Palo Alto, CA (US); Srinivas Neginhal, Palo Alto, CA (US); Kai-Wei Fan, San Jose, CA (US); Ansis Atteka, Palo Alto, CA (US)

(73) Assignee: NICIRA, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/776,157

(22) Filed: Jan. 29, 2020

(65) Prior Publication Data

US 2020/0169503 A1 May 28, 2020

Related U.S. Application Data

(63) Continuation of application No. 16/179,976, filed on Nov. 4, 2018, now Pat. No. 10,567,283, which is a
(Continued)

(51) Int. Cl.
*H04L 12/741* (2013.01)
*H04L 12/713* (2013.01)
(Continued)

(52) U.S. Cl.
CPC ............ *H04L 45/74* (2013.01); *H04L 45/02* (2013.01); *H04L 45/586* (2013.01); *H04L 49/354* (2013.01)

(58) Field of Classification Search
CPC ....... H04L 45/74; H04L 49/354; H04L 45/02; H04L 45/586
See application file for complete search history.

(56) References Cited

U.S. PATENT DOCUMENTS

| 5,504,921 A | 4/1996 | Dev et al. |
| 5,550,816 A | 8/1996 | Hardwick et al. |

(Continued)

FOREIGN PATENT DOCUMENTS

| CN | 101018159 A | 8/2007 |
| CN | 101442442 A | 5/2009 |

(Continued)

OTHER PUBLICATIONS

Agarwal, Sugam, et al., "Traffic Engineering in Software Defined Networks," 2013 Proceedings IEEE INFOCOM, Apr. 14, 2013, 10 pages, Bell Labs, Alcatel-Lucent, Holmdel, NJ, USA.
(Continued)

*Primary Examiner* — Mohammad S Anwar
(74) *Attorney, Agent, or Firm* — Adeli LLP

(57) ABSTRACT

Some embodiments provide a network system. The network system includes a first set of host machines for hosting virtual machines that connect to each other through a logical network. The first set of host machines includes managed forwarding elements for forwarding data between the host machines. The network system includes a second set of host machines for hosting virtualized containers that operate as gateways for forwarding data between the virtual machines and an external network. At least one of the virtualized containers peers with at least one physical router in the external network in order to advertise addresses of the virtual machines to the physical router.

20 Claims, 25 Drawing Sheets

Related U.S. Application Data continuation of application No. 15/436,714, filed on Feb. 17, 2017, now Pat. No. 10,164,881, which is a continuation of application No. 14/214,561, filed on Mar. 14, 2014, now Pat. No. 9,590,901.

(51) Int. Cl.
*H04L 12/751* (2013.01)
*H04L 12/931* (2013.01)

(56) References Cited

U.S. PATENT DOCUMENTS

| | | |
|---|---|---|
| 5,751,967 A | 5/1998 | Raab et al. |
| 6,006,275 A | 12/1999 | Picazo et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,754,220 B1 | 6/2004 | Lamberton et al. |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,152,179 B1 | 12/2006 | Critchfield |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,428,220 B1 | 9/2008 | Caronni et al. |
| 7,450,498 B2 | 11/2008 | Golia et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,519,734 B1 | 4/2009 | Dumitriu et al. |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,647,426 B2 | 1/2010 | Patel et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,014,278 B1 | 9/2011 | Subramanian et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,218,454 B2 | 7/2012 | Hajiaghayi et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B1 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,611,351 B2 | 12/2013 | Gooch et al. |
| 8,612,627 B1 | 12/2013 | Brandwine |
| 8,625,594 B2 | 1/2014 | Sakai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Merwe et al. |
| 8,762,507 B1 | 6/2014 | Ingram et al. |
| 8,775,599 B2 | 7/2014 | Bansal et al. |
| 8,902,743 B2 | 12/2014 | Greenberg et al. |
| 8,904,028 B2 | 12/2014 | Iannaccone et al. |
| 8,958,298 B2 | 2/2015 | Zhang et al. |
| 8,997,094 B2 | 3/2015 | Bosch et al. |
| 9,059,999 B2 | 6/2015 | Koponen et al. |
| 9,201,837 B2 | 12/2015 | Egi et al. |
| 9,203,703 B2 | 12/2015 | Koponen et al. |
| 9,225,597 B2 | 12/2015 | Tubaltsev et al. |
| 9,270,581 B2 | 2/2016 | Guellal et al. |
| 9,450,852 B1 | 9/2016 | Chen et al. |
| 9,503,371 B2 | 11/2016 | Thakkar et al. |
| 9,577,845 B2 | 2/2017 | Thakkar et al. |
| 9,590,901 B2 | 3/2017 | Tubaltsev et al. |
| 9,762,537 B1 | 9/2017 | Eyada |
| 9,900,224 B2 | 2/2018 | Dumitriu et al. |
| 10,003,534 B2 | 6/2018 | Thakkar et al. |
| 10,038,628 B2 | 7/2018 | Ravinoothala et al. |
| 10,091,161 B2 | 10/2018 | Dubey et al. |
| 10,164,881 B2 | 12/2018 | Tubaltsev et al. |
| 10,237,123 B2 | 3/2019 | Dubey et al. |
| 10,305,757 B2 | 5/2019 | Yadav et al. |
| 10,333,849 B2 | 6/2019 | Masurekar et al. |
| 10,389,634 B2 | 8/2019 | Thakkar et al. |
| 10,560,320 B2 | 2/2020 | Shakimov et al. |
| 10,567,283 B2 * | 2/2020 | Tubaltsev ............... H04L 45/74 |
| 10,616,045 B2 | 4/2020 | Dubey et al. |
| 10,645,204 B2 | 5/2020 | Dubey et al. |
| 10,652,143 B2 | 5/2020 | Ravinoothala et al. |
| 10,805,220 B2 | 10/2020 | Masurekar et al. |
| 2001/0043614 A1 | 11/2001 | Viswanadham et al. |
| 2002/0093952 A1 | 7/2002 | Gonda |
| 2002/0095498 A1 | 7/2002 | Chanda et al. |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056317 A1 | 3/2006 | Manning et al. |
| 2006/0056412 A1 | 3/2006 | Page |

(56) References Cited

U.S. PATENT DOCUMENTS

| | | |
|---|---|---|
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0198321 A1 | 9/2006 | Nadeau et al. |
| 2006/0239271 A1 | 10/2006 | Khasnabish et al. |
| 2006/0291388 A1 | 12/2006 | Amdahl et al. |
| 2007/0028244 A1 | 2/2007 | Landis et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0140235 A1 | 6/2007 | Aysan et al. |
| 2007/0156919 A1 | 7/2007 | Potti et al. |
| 2007/0201357 A1 | 8/2007 | Smethurst et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0031263 A1 | 2/2008 | Ervin et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0189769 A1 | 8/2008 | Casado et al. |
| 2008/0198858 A1 | 8/2008 | Townsley et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0016215 A1 | 1/2009 | Nadas et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249472 A1 | 10/2009 | Litvin et al. |
| 2009/0249473 A1 | 10/2009 | Cohn |
| 2009/0257440 A1 | 10/2009 | Yan et al. |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0046532 A1 | 2/2010 | Okita |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0149992 A1 | 6/2010 | Tan |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0241767 A1 | 9/2010 | Corry et al. |
| 2010/0265956 A1 | 10/2010 | Li |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2010/0332664 A1 | 12/2010 | Yevmenkin et al. |
| 2011/0016215 A1 | 1/2011 | Wang |
| 2011/0022695 A1 | 1/2011 | Dalai et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0069634 A1 | 3/2011 | Hajiaghayi et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0194567 A1 | 8/2011 | Shen |
| 2011/0261825 A1 | 10/2011 | Ichino |
| 2011/0283017 A1 | 11/2011 | Alkhatib et al. |
| 2011/0299386 A1 | 12/2011 | Negoto et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0102009 A1 | 4/2012 | Peterson et al. |
| 2012/0131643 A1 | 5/2012 | Cheriton |
| 2012/0155266 A1 | 6/2012 | Patel et al. |
| 2012/0182992 A1 | 7/2012 | Cowart et al. |
| 2012/0182993 A1 | 7/2012 | Hadas et al. |
| 2012/0233331 A1 | 9/2012 | Voccio et al. |
| 2012/0236734 A1 | 9/2012 | Sampath et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0051399 A1 | 2/2013 | Zhang et al. |
| 2013/0083693 A1 | 4/2013 | Himura et al. |
| 2013/0121209 A1 | 5/2013 | Padmanabhan et al. |
| 2013/0125120 A1 | 5/2013 | Zhang et al. |
| 2013/0132536 A1 | 5/2013 | Zhang et al. |
| 2013/0142048 A1 | 6/2013 | Gross, IV et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0155845 A1 | 6/2013 | Patel et al. |
| 2013/0212246 A1 | 8/2013 | Koponen et al. |
| 2013/0219078 A1 | 8/2013 | Padmanabhan et al. |
| 2013/0250951 A1 | 9/2013 | Koganti |
| 2013/0254599 A1 | 9/2013 | Katkar et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0305344 A1 | 11/2013 | Alicherry et al. |
| 2013/0329548 A1 | 12/2013 | Nakil et al. |
| 2013/0329584 A1 | 12/2013 | Ghose et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0050218 A1 | 2/2014 | Kamble et al. |
| 2014/0056125 A1 | 2/2014 | Guellal et al. |
| 2014/0156818 A1 | 6/2014 | Hunt |
| 2014/0195666 A1 | 7/2014 | Dumitriu et al. |
| 2014/0201733 A1 | 7/2014 | Benny et al. |
| 2014/0229945 A1 | 8/2014 | Barkai et al. |
| 2014/0247753 A1 | 9/2014 | Koponen et al. |
| 2014/0269705 A1 | 9/2014 | DeCusatis et al. |
| 2014/0301391 A1 | 10/2014 | Krishnan et al. |
| 2014/0313892 A1 | 10/2014 | Kamble et al. |
| 2014/0337515 A1 | 11/2014 | Naseh et al. |
| 2014/0341226 A1 | 11/2014 | Okita |
| 2014/0359343 A1 | 12/2014 | Fu |
| 2014/0372582 A1 | 12/2014 | Ghanwani et al. |
| 2015/0009831 A1 | 1/2015 | Graf |
| 2015/0010009 A1 | 1/2015 | Takahashi et al. |
| 2015/0063360 A1 | 3/2015 | Thakkar et al. |
| 2015/0063364 A1 | 3/2015 | Thakkar et al. |
| 2015/0244628 A1 | 8/2015 | Gredler et al. |
| 2015/0263899 A1 | 9/2015 | Tubaltsev et al. |
| 2015/0263946 A1 | 9/2015 | Tubaltsev et al. |
| 2015/0271011 A1 | 9/2015 | Neginhal, Sr. et al. |
| 2015/0309901 A1 | 10/2015 | Pershin et al. |
| 2015/0372943 A1 | 12/2015 | Hasan et al. |
| 2016/0080483 A1 | 3/2016 | Li et al. |

(56) References Cited

U.S. PATENT DOCUMENTS

| | | |
|---|---|---|
| 2016/0173415 A1 | 6/2016 | Wang et al. |
| 2016/0205196 A1 | 7/2016 | Hasan et al. |
| 2016/0248703 A1 | 8/2016 | Gopalakrishnan et al. |
| 2016/0294612 A1 | 10/2016 | Ravinoothala et al. |
| 2016/0301603 A1 | 10/2016 | Park et al. |
| 2017/0005915 A1 | 1/2017 | Mirsky et al. |
| 2017/0118067 A1 | 4/2017 | Vedula |
| 2017/0126493 A1 | 5/2017 | Zhang et al. |
| 2017/0139789 A1 | 5/2017 | Fries et al. |
| 2017/0142012 A1 | 5/2017 | Thakkar et al. |
| 2017/0163532 A1 | 6/2017 | Tubaltsev et al. |
| 2017/0288981 A1 | 10/2017 | Hong et al. |
| 2017/0317954 A1 | 11/2017 | Masurekar et al. |
| 2017/0317971 A1 | 11/2017 | Dubey et al. |
| 2018/0006880 A1 | 1/2018 | Shakimov et al. |
| 2018/0176073 A1 | 6/2018 | Dubey et al. |
| 2018/0183667 A1 | 6/2018 | Dubey et al. |
| 2018/0302326 A1 | 10/2018 | Thakkar et al. |
| 2018/0324088 A1 | 11/2018 | Ravinoothala et al. |
| 2019/0075050 A1 | 3/2019 | Tubaltsev et al. |
| 2019/0158397 A1 | 5/2019 | Liu |
| 2019/0173982 A1 | 6/2019 | Dubey et al. |
| 2019/0306064 A1 | 10/2019 | Masurekar et al. |
| 2020/0092161 A1 | 3/2020 | Dubey et al. |
| 2020/0274797 A1 | 8/2020 | Ravinoothala et al. |

FOREIGN PATENT DOCUMENTS

| | | |
|---|---|---|
| CN | 101981560 A | 2/2011 |
| CN | 102215158 A | 10/2011 |
| CN | 106576075 A | 4/2017 |
| EP | 1653688 A1 | 5/2006 |
| EP | 3117561 A2 | 1/2017 |
| EP | 3435596 A1 | 1/2019 |
| GB | 2419703 A | 5/2006 |
| JP | 2003069609 A | 3/2003 |
| JP | 2003124976 A | 4/2003 |
| JP | 2003318949 A | 11/2003 |
| WO | 2005112390 A1 | 11/2005 |
| WO | 2008095010 A1 | 8/2008 |
| WO | 2008129527 A2 | 10/2008 |
| WO | 2013113265 A1 | 8/2013 |
| WO | 2015138043 A2 | 9/2015 |
| WO | 2015142404 A1 | 9/2015 |
| WO | 2015147942 A1 | 10/2015 |
| WO | 2016164277 A1 | 10/2016 |

OTHER PUBLICATIONS

Aggarwal, R., et al., "Data Center Mobility based on E-VPN, BGP/MPLS IP VPN, IP Routing and NHRP," draft-raggarwa-data-center-mobility-05.txt, Jun. 10, 2013, 24 pages, Internet Engineering Task Force, IETF, Geneva, Switzerland.

Ballani, Hitesh, et al., "Making Routers Last Longer with ViAggre," NSDI '09: 6th USENIX Symposium on getworked Systems Design and Implementation, Apr. 2009, 14 pages, USENIX Association.

Jumitriu, Dan Mihai, et al., (U.S. Appl. No. 61/514,990), filed Aug. 4, 2011, 31 pp.

Foster, Nate, et al. "Frenetic: A Network Programming Language," ICFP '11, Sep. 19-21, 2011, 13 pages, Tokyo, Japan.

Handley, Mark, et al., "Designing Extensible IP Router Software," Proc. of NSDI, May 2005, 14 paeges.

Lin, Pingping, et al., "Seamless Interworking of SDN and IP," SIGCOMM'13, Aug. 12-16, 2013, 2 pages, ACM, New York, USA.

Maltz, David A., et al., "Routing Design in Operational Networks: A Look from the Inside," SIGCOMM D4, Aug. 30-Sep. 3, 2004, 14 pages, ACM, Portland, Oregon, USA.

Mann, Vijay, et al., "Crossroads: Seamless VM Mobility Across Data Centers Through Software Defined Networking," IEEE Network Operations and Management Symposium (NOMS), Apr. 16-20, 2012, 9 pages, IEEE, Piscataway, NJ, USA.

McKeown, Nick, et al., "OpenFlow: Enabling Innovation in Campus Networks," ACM SIGCOMM Computer Communication Review, Apr. 2008, 6 pages, vol. 38, No. 2, ACM.

Mechtri, Marouen, et al., "Inter and Intra Cloud Networking Gateway as a Service," 2013 IEEE 2nd International Conference on Cloud Networking (ClouNet), Nov. 11, 2013, 8 pages, IEEE.

PCT International Search Report and Written Opinion dated Oct. 5, 2015 for commonly owned International Patent Application PCT/US2014/072875, 22 pages, International Searching Authority (EPO).

Rosen, E., "Applicability Statement for BGP/MPLS IP Virtual Private Networks (VPNs)," RFC 4365, Feb. 2006, 32 pages, The Internet Society.

Shenker, Scott, et al., "The Future of Networking, and the Past of Protocols," Dec. 2, 2011, 30 pages, USA.

\* cited by examiner

ROUTE ADVERTISEMENT BY MANAGED GATEWAYS

CLAIM OF BENEFIT TO PRIOR APPLICATIONS

This application is a continuation of U.S. patent application Ser. No. 16/179,976, filed Nov. 4, 2018, now published as U.S. Patent Publication 2019/0075050. U.S. patent application Ser. No. 16/179,976 is a continuation of U.S. patent application Ser. No. 15/436,714, filed Feb. 17, 2017, now issued as U.S. Pat. No. 10,164,881. U.S. patent application Ser. No. 15/436,714 is a continuation of U.S. patent application Ser. No. 14/214,561, filed Mar. 14, 2014, now issued as U.S. Pat. No. 9,590,901. U.S. patent application Ser. No. 16/179,976, now published as U.S. Patent Publication 2019/0075050, U.S. patent application Ser. No. 15/436,714, now issued as U.S. Pat. No. 10,164,881, and U.S. patent application Ser. No. 14/214,561, now issued as U.S. Pat. No. 9,590,901 are incorporated herein by reference.

BACKGROUND

In physical L3 networks, such as the Internet, routers exchange routing and reachability information using various routing protocols, including Border Gateway Protocol (BGP). A primary functionality of BGP is to allow two routers to exchange information advertising available routes or routes that are no longer available. That is, a first router may use this protocol to inform a second router that packets for a given IP address or IP prefix can be sent to the first router. The second router can then use this information to calculate routes.

Within some managed virtualized networks, routes are calculated by a network controller and pushed down to the forwarding elements that handle routing within the managed network. As the controller directs how these forwarding elements will route packets, there is no need for the exchange of routing information between the forwarding elements. However, these managed virtualized networks may send and receive traffic through external networks. This currently requires an administrator to manually provide routes to the routers in the external network.

BRIEF SUMMARY

Some embodiments provide a network control system that enables logical networks operating in a network managed by the network control system to peer with and advertise routing information to physical routers outside of the managed network. In some embodiments, the logical networks contain logical routers at least partially implemented in managed gateways, and these gateways use a routing protocol (e.g., Border Gateway Protocol) to peer with the external physical routers. When multiple managed gateways implement the logical router (or at least the portion of the logical router that interfaces with the external network), these multiple gateways may separately advertise the same routes to an external router in some embodiments, thereby allowing the external router to distribute traffic for the advertised destinations across the multiple gateways.

A logical router, in some embodiments, connects a set of logical switches to which virtual machines logically attach. Each logical switch represents a particular set of IP addresses (i.e., a subnet), and is implemented in the managed network across a set of managed forwarding elements to which the virtual machines physically connect (e.g., through virtual interfaces). In some embodiments, the logical routers are implemented in a distributed fashion as well by the managed forwarding elements that connect to the virtual machines. However, when the logical router also connects to the external network via one or more ports, these connections to the external network are implemented through the use of one or more gateways. The gateways, in some embodiments, are responsible for both sending data traffic from the managed network to the external unmanaged physical network and processing traffic sent from the external network into the managed network.

In some embodiments, a user (e.g., an administrator) configures a logical network, including a logical router with one or more ports connecting to the external network, for implementation within the managed network. In addition, the user may specify that the logical router, via these ports, should peer with physical routers in the external network in order to exchange routing information. Upon receiving the logical network configuration, a network controller (or controller cluster) responsible for managing the logical router selects a set of gateways for implementing the connection to the external networks. In some embodiments, when these ports of the logical router have been designated for peering with the external routers, the network controller assigns each such port to a different gateway. In some embodiments, these gateways are spread across clusters of gateways in the network, such that each port is implemented in a different failure domain.

The selected gateways peer with the external routers using a routing protocol, such as Border Gateway Protocol (BGP). In some embodiments, the controller generates routing protocol data based on the logical network configuration. For each port of the logical router that faces the external network, the controller identifies (i) the set of external routers with which the gateway implementing the port will peer (that is, its neighbors) and (ii) the set of routes that the gateway implementing the port will advertise. These routes may be simply the IP prefixes representing the logical switches that connect to the logical router, or may additionally include other routes input by the user or dynamically generated by processes that implement the logical router. In some embodiments, different ports of the logical router may advertise their routes to different external network routers. Once the network controller generates this data, along with the routing table data for the logical router implementation in the gateway, the network controller distributes the data to the gateways (e.g., through a hierarchy of network controllers).

In some embodiments, the gateways on which the logical routers are implemented are host machines grouped in clusters, allocated for hosting logical routers and other services for logical networks. These gateway machines also include managed forwarding elements, which serve as tunnel endpoints for packets sent to and from the managed forwarding elements on which the VMs reside. Some embodiments implement the logical routers within virtualized containers that have the ability to store a routing table, such as namespaces. In addition, some embodiments operate a routing protocol application, or daemon (e.g., a BGP daemon) in the namespace. In some cases, a gateway host machine may have several namespaces operating different logical routers, some or all of which include a routing protocol application for peering with the external routers.

One or more daemons may operate on the gateway host machine outside of the namespaces (e.g., in the virtualization software of the gateway) in order to receive data tuples that define both the routing tables and the routing protocol configuration for a particular namespace. This daemon or daemons operate to instantiate the namespace, provision the namespace with the routing table, and start the routing protocol application in the namespace. In addition, the daemon(s) generate a configuration file for the routing protocol application in some embodiments, and store the configuration file (e.g., in a file system of the host machine) for access by the routing protocol application.

Upon installing its configuration file, the routing protocol application begins communication with the external router. In some embodiments, the application behaves in the same way as a standard physical router would in terms of its exchange of information with its neighbors. For example, the BGP daemon of some embodiments opens a BGP session with each router identified as a neighbor in its configuration, sends keep-alive messages as specified by BGP, and advertises its routes to the identified neighbors via BGP packets. In some embodiments, the BGP daemon also receives BGP packets sent by its neighbors, and uses these packets to identify routes. The BGP daemon of some embodiments either installs the routes in its local routing table (i.e., within the same namespace), pushes the routes up to the network controller so that the network controller can calculate new routing tables for the gateway routing tables implementing the logical router, or a combination thereof. In other embodiments, however, the advertisement of routes only works in one direction, with the BGP daemon sending out routes to its neighbors but not installing routes received from those neighbors. That is, the BGP daemon neither pushes the received routes up to the network controllers nor installs the routes in the routing table at the local gateway.

In some cases, multiple gateways that implement the same logical router (e.g., implementing different ports) may advertise the same routes (e.g., to reach VMs on a particular logical switch, or to reach a public IP shared by those VMs) to the same external router. The external router, in this case, will view these multiple gateways as equal-cost next-hops for packets sent to the advertised addresses. As such, the external routers in some embodiments spread packets sent to those destinations across the various gateways that advertise the routes. The external routers may use any of a variety of different equal-cost multi-path (ECMP) techniques to determine to which gateway a packet should be sent.

In the above-described embodiments, the routing protocol application resides inline. That is, the application operates on the gateway, which is the location through which packets are sent. In some embodiments, however, the network controller(s) act as a route server for the gateways, and the routing protocol application resides on the controller. In this case, the routing protocol configuration is not distributed to the gateways by the controller, but instead used to instantiate the routing protocol application on the controller. The controller then advertises the routing information to the external routers (and potentially receives advertised routing information from the external routers). This advertised information informs the external routers as to which gateways to use for which routes. As in the inline case, the external routers may use ECMP techniques to distribute packets sent to the logical network between the several gateways.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network control system that enables logical networks operating in a network managed by the network control system to peer with and advertise routing information to physical routers outside of the managed network. In some embodiments, the logical networks contain logical routers at least partially implemented in managed gateways, and these gateways use a routing protocol (e.g., Border Gateway Protocol) to peer with the external physical routers. When multiple managed gateways implement the logical router (or at least the portion of the logical router that interfaces with the external network), these multiple gateways may separately advertise the same routes to an external router in some embodiments, thereby allowing the external router to distribute traffic for the advertised destinations across the multiple gateways.

Figure 1:
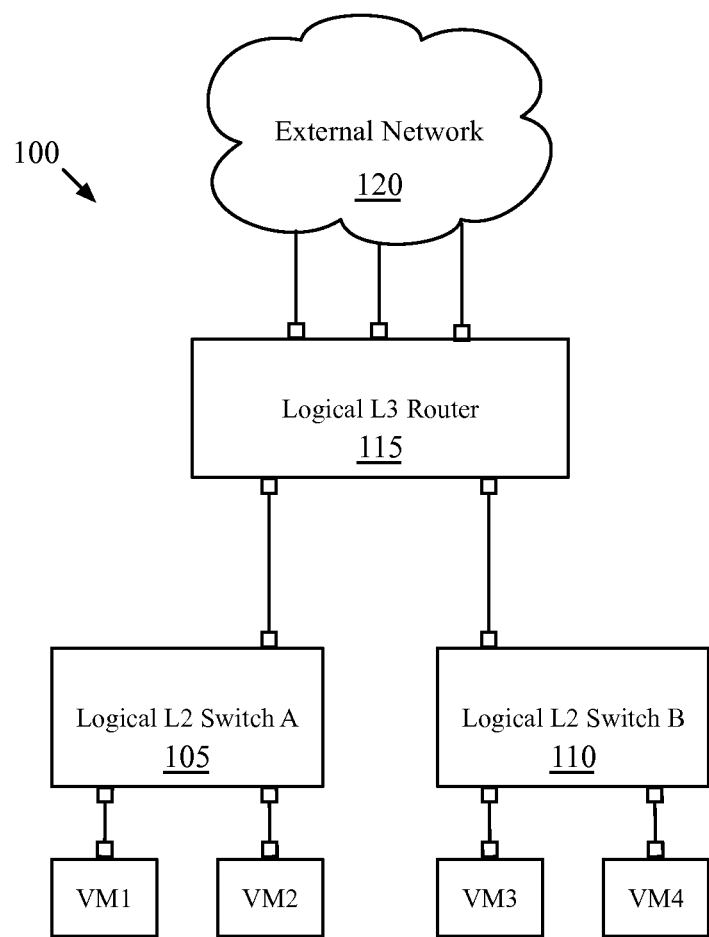
FIG. 1 conceptually illustrates a logical network architecture of some embodiments that includes a logical router.

FIG. 1 conceptually illustrates an example of a logical network architecture 100. The logical network 100 includes two logical switches 105 and 110 and a logical router 115. Each of the logical switches 105 and 110 connects several virtual machines (in this case, two virtual machines (VMs) are connected by each logical switch, and the logical router 115 connects the two logical switches (i.e., logical layer 2 domains) together. In addition, the logical router connects the logical network to an external network 120, via three logical ports. While in this example, the logical router 115 has several ports connecting to the external network (e.g., as uplink ports), in some embodiments the logical router may only have a single port that connects to the external networks.

In some embodiments, the logical network is an abstract conception of a network generated by an administrator, and the logical network is implemented in a virtualized, distributed manner in a managed physical infrastructure (e.g., in a multi-tenant datacenter). That is, the virtual machines that connect to the logical switches may reside on various different host machines within the infrastructure, and physical managed forwarding elements (e.g., software virtual switches) operating on these host machines implement some or all of the logical forwarding elements (logical switches, logical routers, etc.).

A logical router, as in this example, connects a set of logical switches to which virtual machines logically attach. Each logical switch represents a particular set of IP addresses (i.e., a subnet), and is implemented in the managed network across a set of managed forwarding elements to which the virtual machines physically connect (e.g., through virtual interfaces). In some embodiments, the logical routers are implemented in a distributed fashion as well by the managed forwarding elements that connect to the virtual machines. However, when the logical router also connects to the external network via one or more ports, these connections to the external network are implemented through the use of one or more gateways. The gateways, in some embodiments, are responsible for both sending data traffic from the managed network to the external unmanaged physical network and processing traffic sent from the external network into the managed network.

Figure 2:
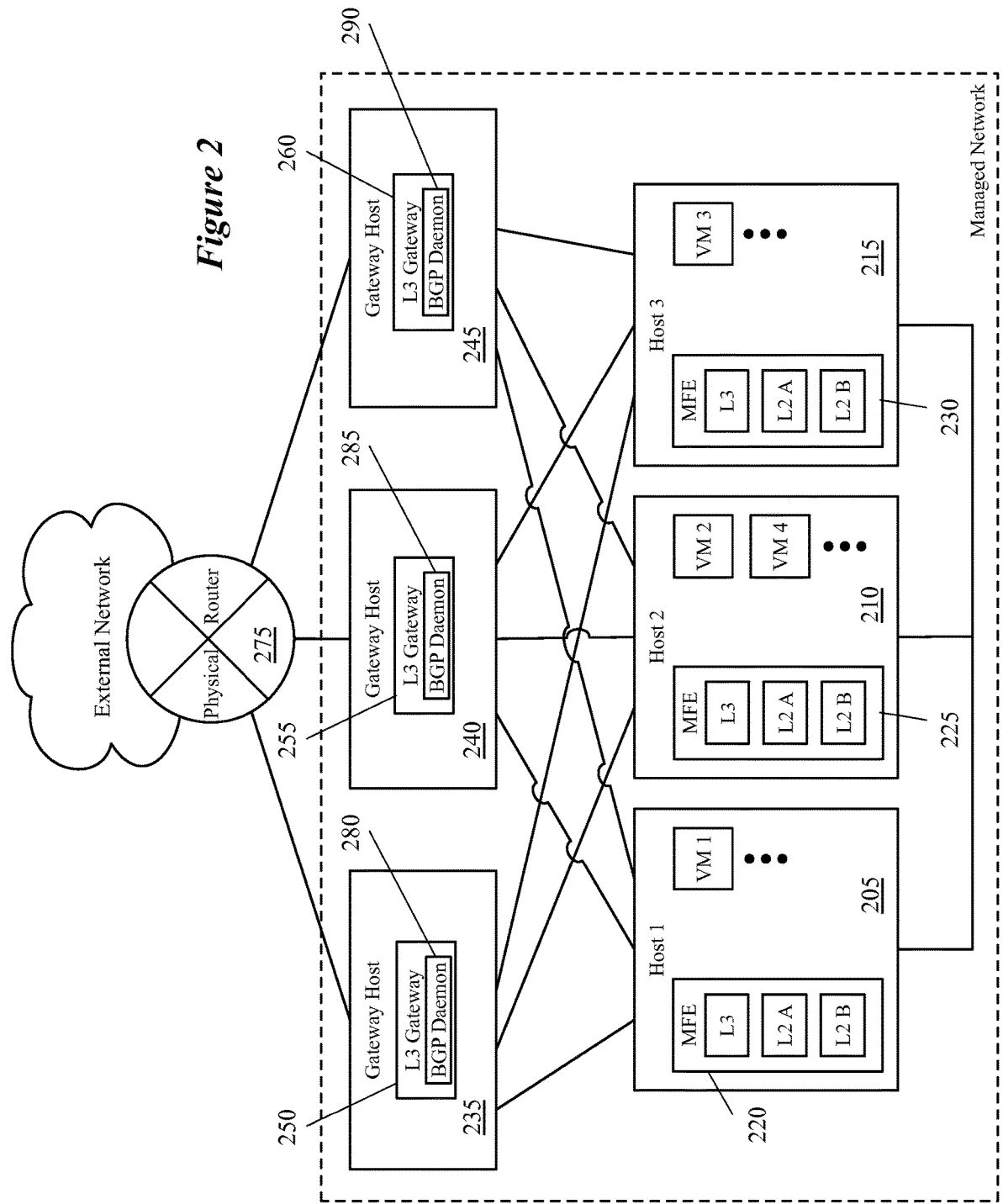
FIG. 2 conceptually illustrates a physical implementation of the logical network of FIG. 1.

FIG. 2 conceptually illustrates such a physical implementation of the logical network 100. This figure illustrates a managed network 200 that includes three host machines 205-215 and three gateway host machines 235-245. The VMs of the logical network 100 reside on the hosts 205-215, implemented on top of virtualization software (e.g., a hypervisor, virtual machine monitor, etc.) that operates in the host. Additional virtual machines that connect to other logical networks may reside on some or all of these hosts, as well as additional hosts in the managed network that are not shown in this figure.

In addition to the virtual machines, each of the hosts 205-215 operates a managed forwarding element (MFE) 220-230. In some embodiments, this MFE is a virtual switch that operates within the virtualization software of the host (e.g., Open vSwitch, or another software forwarding element). In the example illustrated in FIG. 2, the MFEs 220-230 each implement both of the logical switches 105 and 110, as well as the logical router 115. This enables first-hop logical processing in some embodiments, in which all or most of the logical processing for a packet is performed at the first MFE that receives the packet. Thus, a packet sent from VM 1 to VM 4 would be processed, by the MFE 220, through logical switch 105 to logical router 115 and then to logical switch 110. The MFE 220 would identify the logical egress port of logical switch 110 for the packet as the port to which VM 4 attaches, and map this egress port to a tunnel to the MFE 230 at host 210.

In some embodiments, a network controller (or controller cluster) provisions the MFEs 220-230 by generating flow entries, or data tuples that the MFE converts into flow entries. These flow entries specify matching conditions (e.g., physical ingress port, logical ingress port, destination MAC or IP addresses, transport layer 5-tuples, etc.) and actions to take on a packet that matches the conditions (e.g., assign packet to a logical forwarding element, assign a logical egress port, write data to register, encapsulate in a particular tunnel, etc.). Thus, in order for the MFE to process a packet through the logical network, the MFE matches the packet to a first flow entry, performs the action (e.g., to modify the packet or store logical context data in a register for the packet), resubmits the packet in order to match another flow entry, etc.

The gateway host machines 235-245 of some embodiments host L3 gateways 250-260 for the logical network 100 that implement the connections between the external network 120 and the logical network 100 (specifically, the logical router 115). When the physical router 275 receives a packet with a destination address that corresponds to one of the VMs of the logical network 100, or a public IP shared by the VMs on a logical switch, the physical router 275 sends the packet to one of the gateway hosts 235-245. The gateway hosts 235-245 also include MFEs, and in some embodiments these MFEs receive packets from the physical router 275 and hand off the packets to the L3 gateway in their respective host for processing.

In some embodiments, a user (e.g., an administrator) configures the logical network 100. Upon receiving such a configuration with several logical router ports connecting to the external network, a network controller (or controller cluster) selects the set of gateway host machines 235-245 for implementing this connection. Specifically, some embodiments select a different gateway host machine for each of these logical router ports. In some embodiments, these gateways are spread across clusters of gateways in the network, such that each port is implemented in a different failure domain. The network controller calculates a routing table for the logical router, a portion of which is implemented at the gateway host machines and a portion of which is implemented by the MFEs (e.g., the MFEs 220-230 and those on the gateway host machines 235-245).

The L3 gateways 250-260 implement the portion of the routing table of the logical router 115 for north-south traffic (i.e., traffic sent into and out of the managed network). Some embodiments only handle ingress traffic, with outgoing traffic sent through other means (e.g., by a direct connection between the MFEs in the host machines 220-230 and the physical router 275 or other network elements in the external network 120). In other embodiments, the L3 gateways handle both ingress and egress traffic.

As shown, the L3 gateways 250-260 each include a Border Gateway Protocol (BGP) daemon 280-290. These daemons 280-290 peer with the external physical router 275 and advertise routes to this router for the logical router 115. In some embodiments, the BGP daemons 280-290 operates in the same way as a traditional physical router in terms of its exchange of information with its neighbors. For example, these BGP daemons may open a BGP session with the physical router 275, send keep-alive messages as specified by the protocol, and advertise its routes to the physical router 275 via BGP packets. In some embodiments, the BGP daemons also receive BGP packets sent by the physical router 275, and uses these packets to identify routes. The BGP daemons of some embodiments either install the routes in their local routing tables (i.e., within the same namespaces), push the routes up to the network controller so that the network controller can calculate new routing tables for all of the L3 gateways implementing the logical router, or a combination thereof. In other embodiments, however, the BGP daemon only effectively works in one direction, sending out routes to its neighbors (to attract ingress traffic) but not installing routes received from those neighbors. That is, the BGP daemon neither pushes the received routes up to the network controllers nor installs the routes in the routing table at the local gateway.

In some embodiments, the peering of the L3 gateways with the physical router(s) is a user-specified property of the logical ports. In some embodiments, when the user (e.g., administrator) specifies for the logical router to peer with external routers, the controller generates routing protocol data based on the logical network configuration. For each port of the logical router that faces the external network, the controller identifies (i) the set of external routers with which the gateway implementing the port will peer (that is, its neighbors) and (ii) the set of routes that the gateway implementing the port will advertise. These routes may be simply the IP prefixes representing the logical switches that connect to the logical router, or may additionally include other routes input by the user or dynamically generated by processes that implement the logical router. In some embodiments, different ports of the logical router may advertise their routes to different external network routers. Once the network controller generates this data, along with the routing table data for the L3 gateway, the network controller distributes the data to the gateways (e.g., through a hierarchy of network controllers).

In some embodiments, the L3 gateways 250-260 are virtualized containers that have the ability to store a routing table, such as namespaces. In addition, the BGP daemons 280-290, or other routing protocol applications, operate within these containers according to the data received from the controllers. One or more daemons may operate on the gateway host machine outside of the containers (e.g., in the virtualization software of the gateway) in order to receive data tuples from the controller that define both the routing tables and the BGP configuration for a particular namespace. This daemon or daemons operate to instantiate the namespace, provision the namespace with the routing table, and start the BGP daemon in the namespace. In addition, the daemon(s) generate a configuration file for the BGP daemon in some embodiments, and store the configuration file (e.g., in a file system of the host machine) for access by the routing protocol application. Upon installing its configuration file, the BGP daemons begins communication with its external router neighbors.

In the example shown in FIG. 2, multiple gateways 235-245 that implement the same logical router 115 (e.g., implementing different ports) advertise the same routes (e.g., to reach VMs on the logical switches 105 and 110) to the same external router 275. The external router, in some embodiments, views these multiple L3 gateways as equal-cost next-hops for packets sent to the advertised addresses. As such, the external routers in some embodiments spread packets sent to those destinations across the various gateways that advertise the routes. The external routers may use any of a variety of different equal-cost multi-path (ECMP) techniques to determine to which gateway a packet should be sent.

In the above-described embodiments, the routing protocol application resides inline. That is, the application operates on the gateway, which is the location through which packets are sent. In some embodiments, however, the network controller(s) act as a route server for the gateways, and the routing protocol application resides on the controller. In this case, the routing protocol configuration is not distributed to the gateways by the controller, but instead used to instantiate the routing protocol application on the controller. The controller then advertises the routing information to the external routers (and potentially receives advertised routing information from the external routers). This advertised information informs the external routers as to which gateways to use for which routes. As in the inline case, the external routers may use ECMP techniques to distribute packets sent to the logical network between the several gateways.

The above description introduces the use of BGP by logical networks of some embodiments, though one of ordinary skill in the art will recognize that the invention is not limited to BGP, and that other routing protocols may be used. Several more detailed embodiments are described below. First, Section I describes the provisioning of gateways by network controllers. Section II then describes architecture of the host machines that host L3 gateways in some embodiments. Next, Section III describes the process of configuring a routing protocol application on a gateway, and Section IV describes the operation of the routing protocol application of some embodiments. Section V then describes the use of a network controller as a route server in some embodiments. Finally, Section VI describes an electronic system with which some embodiments of the invention are implemented.

I. Provisioning Gateways by Network Controllers

As mentioned, in some embodiments a network control system sets up and configures the logical routers and associated routing protocol applications in one or more gateways for a logical network. One or more network controllers in the network control system receive the network configuration input by an administrator and convert this information into data tuples that can be read by the gateway host machines, in addition to selecting the one or more gateway host machines to use for the logical routers. The network control system also distributes the data tuples to these host machines.

Figure 3:
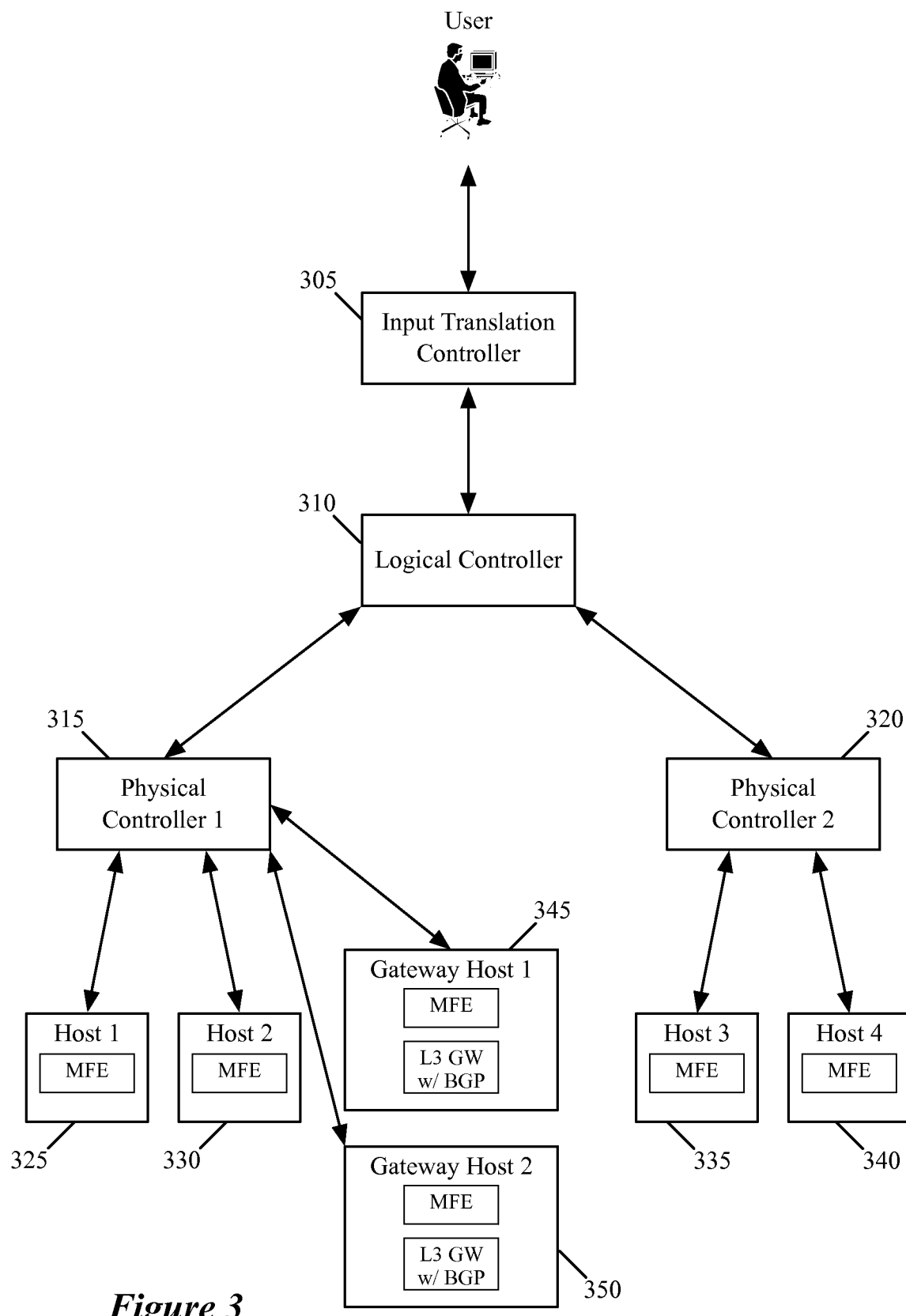
FIG. 3 conceptually illustrates a network control system of some embodiments for provisioning managed forwarding elements, L3 gateways, and routing protocol applications in order to implement logical networks and enable the logical routers of those networks to peer with external routers.

FIG. 3 conceptually illustrates such a network control system 300 of some embodiments for provisioning managed forwarding elements, L3 gateways, and routing protocol applications in order to implement logical networks and enable the logical routers of those networks to peer with external routers. As shown, the network control system 300 includes an input translation controller 305, a logical controller 310, physical controllers 315 and 320, host machines 325-340, and two gateway host machines 345 and 350. As shown, the hosts 325-340, as well as the gateway hosts 345 and 350, include managed forwarding elements, which may implement logical forwarding elements as shown in the above figures (e.g., through the use of flow entries). The gateway hosts 345 and 350 also each include L3 gateways for handling packets ingressing to and/or egressing from the managed network. These L3 gateways additionally include BGP functionality (e.g., in the form of a BGP daemon). One of ordinary skill in the art will recognize that many other different combinations of the various controllers and hosts are possible for the network control system 300.

In some embodiments, each of the controllers in a network control system is a computer (e.g., having an x86-based processor) with the capability to function as an input translation controller, logical controller, and/or physical controller. Alternatively, in some embodiments a given controller may only have the functionality to operate as a particular one of the types of controller (e.g., only as a physical controller). In addition, different combinations of controllers may run in the same physical machine. For instance, the input translation controller 305 and the logical controller 310 may run in the same computing device, with which a data center management application interacts (or with which an administrator interacts directly).

The input translation controller 305 of some embodiments includes an input translation application that translates network configuration information received from a user. While shown as receiving the information directly from the user in FIG. 3, in some embodiments a user interacts with a data center management application, which in turn passes the network configuration information to the input translation controller.

For example, a user may specify a network topology such as that shown in FIG. 1. For each of the logical switches, the user specifies the machines that connect to the logical switch (i.e., to which logical ports of the logical switch the VMs are assigned). The user may also specify which logical switches attach to any logical routers, one or more logical ports of the logical router for connection to external networks, and whether these logical ports peer with external physical routers. The input translation controller 305 translates the received network topology into logical control plane data that describes the network topology as a set of data tuples in some embodiments. For example, an entry might state that a particular MAC address A is located at a first logical port X of a particular logical switch, that a logical router Q is located at a second logical port Y of the particular logical switch, or that a logical port G of the logical router Q is an uplink port interfacing with the external network.

In some embodiments, each logical network is governed by a particular logical controller (e.g., logical controller 310). The logical controller 310 of some embodiments translates the logical control plane data that defines the logical network and the logical forwarding elements (e.g., logical routers, logical switches) that make up the logical network into logical forwarding plane data, and the logical forwarding plane data into physical control plane data. The logical forwarding plane data, in some embodiments, consists of flow entries described at a logical level. For the MAC address A at logical port X, logical forwarding plane data might include a flow entry specifying that if the destination of a packet matches MAC A, to forward the packet to port X. The port of the logical router Q will also have a MAC address, and similar flow entries are created for forwarding packets with this MAC address to port Y of the logical switch. In addition, the logical forwarding plane data of some embodiments includes a flow entry for sending packets with an unknown IP address to, e.g., logical port G.

In some embodiments, the logical controller translates the logical forwarding plane data into universal physical control plane data. The universal physical control plane data enables the network control system of some embodiments to scale even when the network includes a large number of managed forwarding elements (e.g., thousands) to implement a logical forwarding element, and when the network implements a large number of logical networks. The universal physical control plane abstracts common characteristics of different MFEs in order to express physical control plane data without considering differences in the MFEs and/or location specifics of the MFEs.

As stated, the logical controller 310 of some embodiments translates logical control plane data into logical forwarding plane data (e.g., logical flow entries that include a match over logical network parameters, such as logical addresses, logical ingress ports, etc.), then translates the logical forwarding plane data into universal physical control plane data. In some embodiments, the logical controller application stack includes a control application for performing the first translation and a virtualization application for performing the second translation. Both of these applications, in some embodiments, use a rules engine for mapping a first set of tables into a second set of tables. That is, the different data planes are represented as tables (e.g., n Log tables), and the controller applications use a table mapping engine (e.g., an n Log engine) to translate between the planes (e.g., by applying join operations on the tables). The input and output tables, in some embodiments, store sets of data tuples that define the different planes of data.

Each of the physical controllers 315 and 320 is a master of one or more managed forwarding elements (e.g., located within host machines). In this example, each of the two physical controllers is a master of two managed forwarding elements located at the VM host machines 325-340. Furthermore, the physical controller 315 is a master of two gateway hosts 345 and 350, on which both MFEs as well as L3 gateways for a particular logical network reside. In some embodiments, all of the L3 gateways for a logical router are managed by the same physical controller (as in this figure), while in other embodiments different physical controllers manage the different gateway hosts for a logical network.

In some embodiments, a physical controller receives the universal physical control plane data for a logical network and translates this data into customized physical control plane data for the particular MFEs that the physical controller manages and which require data for the particular logical network. In other embodiments, the physical controller passes the appropriate universal physical control plane data to the MFEs, which have the ability (e.g., in the form of a chassis controller running on the host machine) to perform this conversion themselves.

The universal physical control plane to customized physical control plane translation involves a customization of various data in the flow entries. For the example noted above, the universal physical control plane would involve several flow entries (i.e., several data tuples). The first entry states that if a packet matches the particular logical data path set (e.g., based on the packet being received at a particular physical ingress port), and the destination address matches MAC A, then forward the packet to logical port X. This entry will be the same in the universal and customized physical control planes, in some embodiments. Additional entries are generated to match a physical ingress port (e.g., a virtual interface of the host machine) to the logical ingress port X (for packets received from the VM having MAC A), as well as to match a destination logical port X to the physical egress port of the physical MFE (e.g., again the virtual interface of the host machine). However, these physical ingress and egress ports are specific to the host machine on which the MFE operates. As such, the universal physical control plane entries include abstract physical ports while the customized physical control plane entries include the actual physical interfaces (which, in many cases are virtual interfaces) that attach to the specific MFEs.

In some embodiments, as shown, the gateway hosts also operate managed forwarding elements (e.g., using the same packet processing/virtual switching software as the VM hosts 325). These MFEs also receive physical control plane data from the physical controller that enables the MFEs to implement the logical forwarding elements. In addition, some embodiments distribute the routing table data and routing protocol (e.g., BGP) configuration information to the L3 gateways operating in the gateway hosts through the hierarchical network control system. The logical controller 310 that manages the logical network selects the set of gateway hosts for the logical router (e.g., using a load balancing algorithm that spreads the L3 gateways for various logical routers across a set of hosts), then generates the data to distribute to these hosts.

The logical controller identifies the physical controller(s) that manages each of these selected gateway hosts, and distributes the routing table and/or routing protocol configuration data to the identified physical controllers. In some embodiments, both the L3 gateway configuration (e.g., a routing table, NAT table, etc.) and the BGP configuration are distributed as a set of data tuples. For instance, the BGP configuration data tuples of some embodiments specifies IP addresses of the gateway's BGP neighbors, and a set of IP addresses or prefixes to advertise to those neighbors. The physical controllers then distribute these data tuples to the gateway hosts. In some embodiments, each of the gateway hosts for a particular logical router receives the same routing table and BGP configuration. On the other hand, in some embodiments, different gateway hosts may have connections to different external physical routers, and therefore has different sets of BGP neighbors. As described in detail below, the gateway hosts convert the data tuples into (i) a routing table for use by a container (e.g., a VM, a namespace) that operates on the gateway host as the L3 gateway and (ii) a BGP configuration file for use by a BGP module (e.g., a daemon or other application) that operates within the container.

Figure 4:
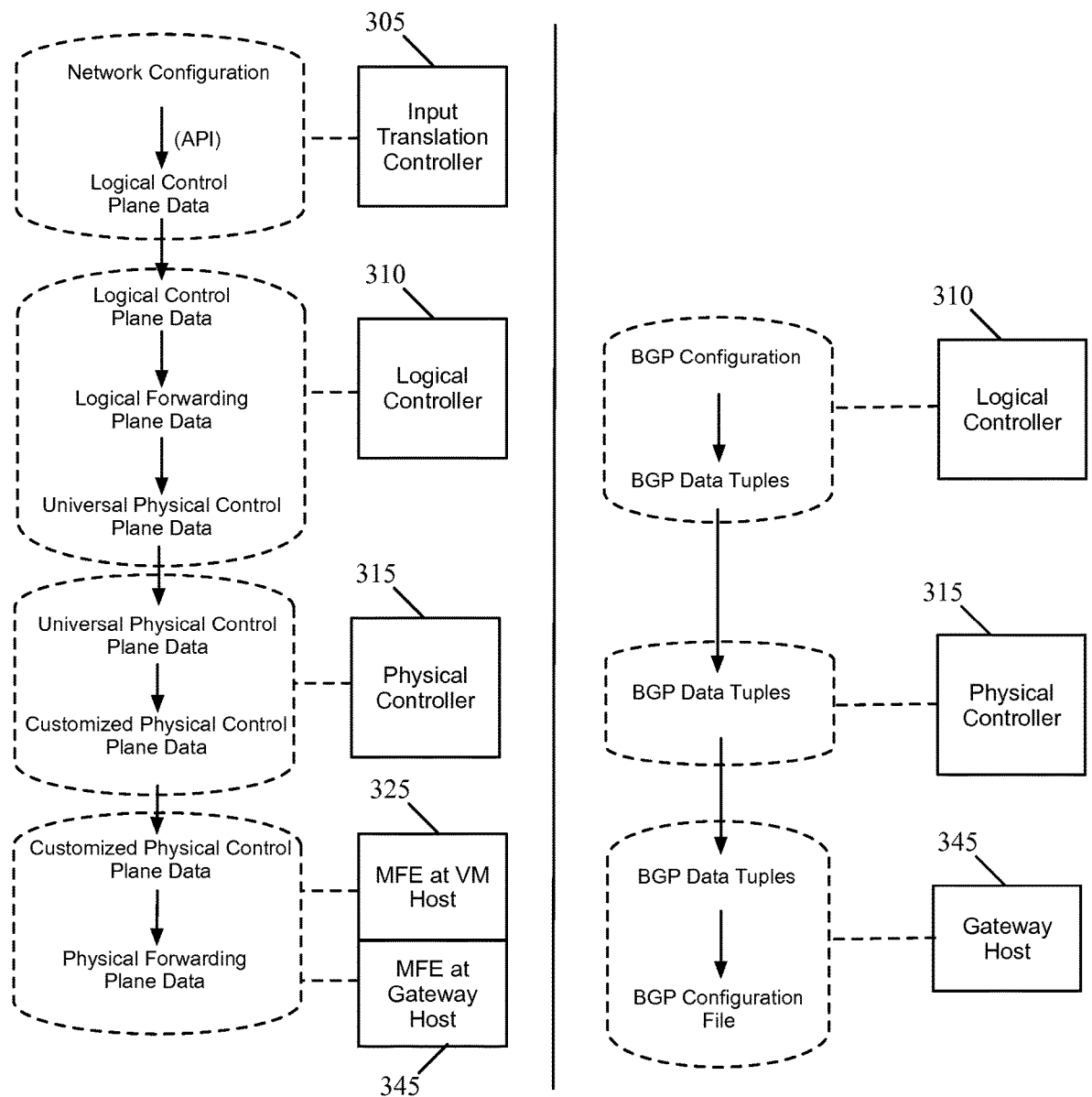
FIG. 4 conceptually illustrates the propagation of data through the hierarchical network control system of some embodiments.

The above describes the hierarchical network control system of some embodiments, although the network control system of other embodiments includes only a single controller (or a controller cluster with one active and one or more standby controllers). FIG. 4 conceptually illustrates the propagation of data through the hierarchical network control system of some embodiments. The left side of this figure shows the data flow to the managed forwarding elements to implement the logical forwarding elements (e.g., the logical switches and logical routers) of the logical network, while the right side of the figure shows the propagation of BGP data to the gateway hosts in order to provision a BGP daemon operating within the L3 gateway.

On the left side, the input translation controller 305 receives a network configuration through an API, which is converted into logical control plane data. This network configuration data includes a logical topology such as that shown in FIG. 1. The network configuration specifies attachments of logical switches to a logical router in some embodiments, with MAC addresses assigned to each VM and each logical router port that connects to a logical switch, and each logical switch having an associated IP subnet.

As shown, the logical control plane data is converted by the logical controller 310 (specifically, by a control application of the logical controller) to logical forwarding plane data, and then subsequently (by a virtualization application of the logical controller) to universal physical control plane data. In some embodiments, these conversions generate a flow entry at the logical forwarding plane (or a data tuple that defines a flow entry), then add a match over the logical data path set (e.g., the logical switch or router) at the universal physical control plane. The universal physical control plane also includes additional flow entries (or data tuples) for mapping generic physical ingress ports (i.e., a generic abstraction of a port not specific to any particular MFE) to logical ingress ports as well as for mapping logical egress ports to generic physical egress ports. For instance, for a port of the logical switch at which a VM resides, the flow entries at the universal physical control plane would include a forwarding decision to send a packet to the logical port to which the VM connects when the destination MAC address of the packet matches that of the VM, as well as an egress context mapping entry that maps the logical egress port to a generic physical (i.e., virtual) interface. For other MFEs, including those at the gateway hosts, the universal physical control plane data includes a generic tunneling entry for encapsulating the packet in a tunnel to the MFE at which the VM is located.

The physical controller 315 (one of the several physical controllers in the hierarchical network control system 300), as shown, translates the universal physical control plane data into customized physical control plane data for the particular MFEs that it manages at hosts 325, 330, 345, and 350. This conversion involves substituting specific data (e.g., specific physical ports or tunnel encapsulation information) for the generic abstractions in the universal physical control plane data. For instance, in the example of the above paragraph, the port integration entries are configured to specify the physical layer port to which the VM attaches (i.e., an identifier for the actual virtual interface). Similarly, the tunnel encapsulation entries for the different MFEs will have different tunnel encapsulation information.

While this example illustrates the physical controller 315 as performing the universal physical control plane to customized physical control plane translation, some embodiments utilize a chassis controller on the host machines for this task. In such embodiments, the physical controllers do not translate the physical control plane data, but instead just serve as a distribution mechanism for delivering this data to the numerous host machines located in the network so that the logical controller does not have to communicate with every MFE in the network. In this case (not shown in the figures), the universal physical control plane to customized physical control plane conversion is performed by one module or element at the hosts 325 and 345 (i.e., the chassis controller), while the MFEs at the hosts 325 and 345 perform the customized physical control plane to physical forwarding plane data conversion.

Whether the customization of the physical control plane data is performed by the physical controller or a chassis controller at the host, the MFE at host 325 (one of several MFEs managed by the physical controller 315) performs a translation of the customized physical control plane data into physical forwarding plane data. The physical forwarding plane data, in some embodiments, are the flow entries stored within the MFE (e.g., within the user space and/or kernel of a software virtual switch such as Open vSwitch) against which the MFE actually matches received packets. In addition, the MFEs at both of the gateway hosts 345 and 350 perform such a translation in order to forward packets between (i) the L3 gateways, (ii) other network entities (e.g., VMs) within the managed network via tunnels, and (iii) the external network.

The right side of FIG. 4 illustrates data propagated to the gateway hosts (e.g., host 345) to implement a BGP configuration for a L3 gateway, rather than for the MFEs. As shown, the logical controller 310 converts a BGP configuration to a set of data tuples that define that configuration. In some embodiments, the BGP configuration is generated by either the logical controller or the input translation controller based on the network configuration input by the user (e.g., administrator). When a user designs the logical network, some embodiments allow the user to specify for the logical router whether the connections to the external network will use a routing protocol (or BGP specifically) to peer with external routers. In some embodiments, the user specifies this by choosing a type of port for these connections (e.g., an uplink port) for which BGP (or a different routing protocol) is automatically activated. In addition, each logical switch in the logical network will have an associated IP subnet (either assigned by the user or automatically assigned by the logical controller). For each port, or for the logical router as a whole, either the user may specify the external physical routers that will send packets to the port or the logical controller generates this data based on the gateways selected for the port.

Based on this information (i.e., the set of physical routers to which each port connects, the IP addresses/subnets of the VMs/logical switches), the logical controller 310 generates the set of data tuples for the BGP configuration. This may be performed by the table mapping engine in some embodiments, that also converts the logical control plane data into physical control plane data. In addition to the BGP data tuples, the logical controller generates data tuples for the logical router aspect of the L3 gateway (e.g., the routing table). In order to define containers on a particular gateway host, some embodiments define each container as a separate data tuple that specifies the existence of the container and the processes running on the container, including BGP. Within this data tuple, BGP may be enabled. Furthermore, this data tuple defines various BGP options, such as the router ID, whether or not to advertise graceful restart capability, and a list of prefixes (e.g., in classless inter-domain routing (CIDR) form) to advertise to all peers. In addition, the logical controller creates a data tuple for each BGP neighbor (i.e., peer external router) of a particular L3 gateway. These neighbor data tuples specify, in some embodiments, the address of the BGP neighbor, a keep-alive timer that indicates the time between keep-alive packets, and the interface through which the BGP application in the gateway communicates with the neighbor, among other information.

Once the logical controller 310 identifies the gateway hosts for the logical router and creates the data tuples, the logical controller then identifies the physical controller or controllers that manage the gateway hosts. As mentioned, like the VM hosts 325-340, each of the gateway hosts has an assigned master physical controller. In the example of FIG. 3, both of the gateway hosts are managed by the physical controller 315, so the other physical controller 320 does not receive the BGP data tuples.

In order to supply the logical router configuration data to the gateway hosts, the logical controller 310 of some embodiments pushes the data to the physical controller 315. In other embodiments, the physical controllers request the configuration data (e.g., in response to a signal that the configuration data is available) from the logical controller.

The physical controller 315 passes the data to the gateway hosts, including host 345, much as they pass the physical control plane data. In some embodiments, the BGP data tuples are sent to a database running on the host that is part of the software associated with the MFE, and is used to configure certain aspects of the MFE (e.g., its port information and other non-flow entry configuration data).

In some embodiments, a process on the gateway host 345 starts up the container for the L3 gateway and translates the BGP data tuples stored in the database into a BGP configuration file for an application operating in the L3 gateway. The application can load the configuration in order to determine its operating configuration.

The above description describes the conversion, by the network control system, of the network configuration into a set of physical forwarding plane flow entries that the physical controller passes to the host (e.g., via a protocol such as OpenFlow). In other embodiments, however, the data for defining flow entries is passed in other forms, such as more abstract data tuples, and the MFEs or processes running on the hosts with the MFEs convert these data tuples into flow entries for use in processing data traffic.

Figure 5:
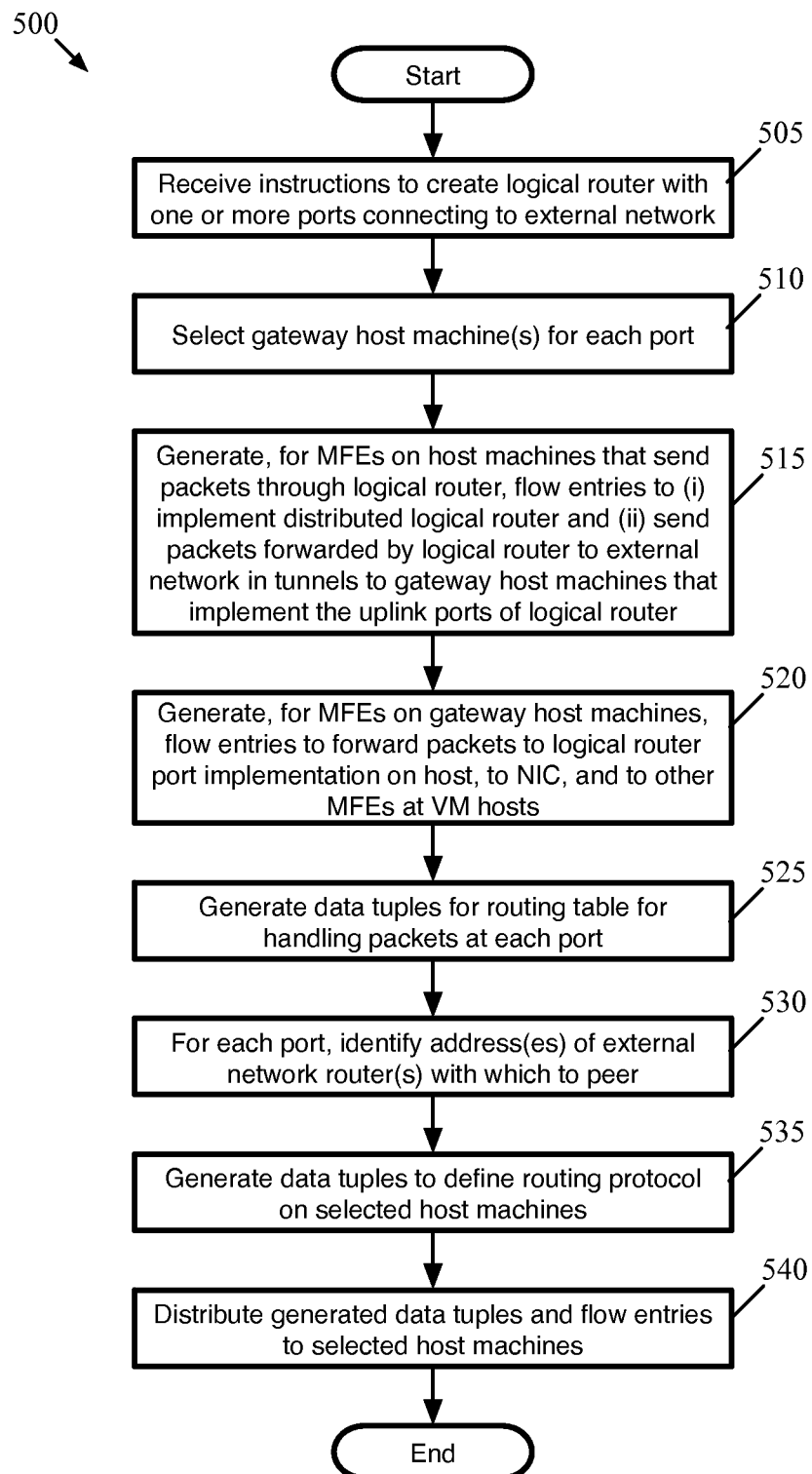
FIG. 5 conceptually illustrates a process of some embodiments for generating and distributing data in order to implement a set of connections between a logical router in a managed network and an external network.

FIG. 5 conceptually illustrates a process 500 of some embodiments for generating and distributing data in order to implement a set of connections between a logical router in a managed network and an external network. In some embodiments, the process 500 is performed by a network controller (e.g., by a logical controller in a network controller hierarchy such as that shown in FIG. 3) upon receiving a network configuration that includes a logical router with router peering enabled.

As shown, the process 500 begins by receiving (at 505) instructions to create a logical router with one or more ports connecting to an external network. These instructions may be the result of a network administrator designing a logical network (e.g., through a cloud management application that passes the logical network configuration through controller APIs) that includes the logical router. In some embodiments, the instructions to create the logical router specifically indicate that the connections to the external network should be implemented using BGP, or another protocol, for router peering and route advertisement. In other embodiments, this capability is automatically enabled for all logical routers with at least one connection to the external network.

Next, the process selects (at 510) gateway host machines for each of the ports that connect to the logical network. Some embodiments assign each port to a different gateway host, while other embodiments allow multiple ports (and therefore multiple namespaces hosting routing tables and BGP services) to be created on a single gateway host. In some embodiments, the gateway hosts are arranged in terms of clusters, or failure domains. These clusters, in some embodiments, may be sets of host machines that are physically located together in the managed network, and therefore more likely to all fail together (e.g., due to a top of rack switch failing, power issues, etc.). Different embodiments may assign gateways to host machines differently respective to the clusters. For instance, some embodiments assign only one gateway per cluster for a particular logical router, while other embodiments assign all gateways for a logical router to the same cluster. Yet other embodiments may assign gateways to several different clusters, but allow two or more gateways within a single cluster.

Furthermore, in some embodiments, the gateway host machines may be assigned to different groups based on the functions for which those gateway hosts are used. For example, within a physical managed network, some embodiments use a first group of gateway hosts for providing logical services (e.g., DHCP, metadata proxy), a second group of gateway hosts for L3 gateways that utilize BGP for route advertisement and for which each logical router port is assigned a single gateway, and a third group of gateway hosts for L3 gateways that do not utilize route advertisement and for which each logical router port is assigned to multiple gateways. In this case of FIG. 5, the controller selects gateway hosts from among the second group for each logical router port. Each group may span several clusters of gateway hosts, thereby allowing for the process 500 to select (at 510) gateway host machines within the second group from several clusters (i.e., failure domains).

Some embodiments allow the administrator to specify the cluster to which the controller assigns each logical port of the logical router, and the controller handles selection of the actual gateway host within that cluster. Thus, the administrator might specify to have two logical ports assigned to gateways in a first cluster, four in a second cluster, and two more in a third cluster. The controller then assigns each logical port to a specific gateway host in its selected cluster. For this assignment, some embodiments use a load balancing technique, such as calculating a hash function of a property of the logical router or port (e.g., a UUID assigned by the controller) modulo the number of gateway hosts in the cluster. This assigns the logical router ports to gateway hosts within the cluster effectively at random (even though the algorithm itself is deterministic), and therefore load balances the L3 gateways across the gateway hosts over the long run.

Some other embodiments may use other techniques to load balance the L3 gateways across the hosts in a cluster. For instance, rather than using the hash algorithm to choose between all gateway hosts in a cluster, some embodiments choose between only those gateways with the fewest number of logical routers currently operating, and modulo the result of the hash function by this smaller number of gateways. Other embodiments analyze the number of logical routers on each gateway and the operational load of the gateways (e.g., based on number of packets processed over a particular timeframe) in order to determine to which gateway host a particular logical router should be assigned.

Figure 6:
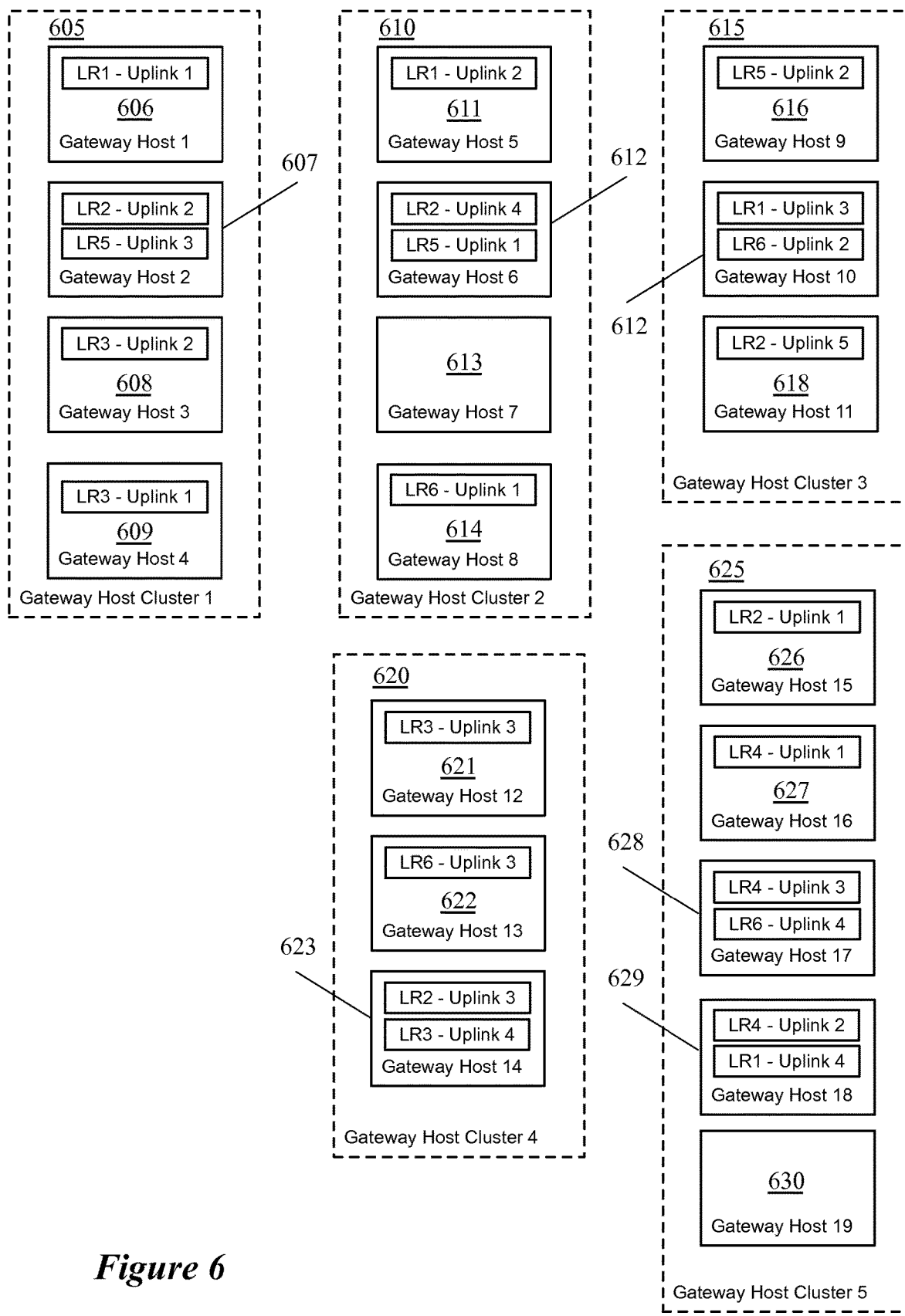
FIG. 6 conceptually illustrates five separate clusters of gateway hosts, and the logical router ports (referred to as uplinks) implemented on those gateway hosts.

FIG. 6 conceptually illustrates five separate clusters 605-625 of gateway hosts, and the logical router ports (referred to as uplinks) implemented on those gateway hosts. Specifically, the first cluster 605 includes four gateways 606-609, the second cluster 610 includes four gateways 611-614, the third cluster 615 includes three gateways 616-618, the fourth cluster 620 includes three gateways 621-623, and the fifth cluster 625 includes five gateways 626-630. This figure illustrates only the gateway hosts for each cluster that are capable of hosting L3 gateways for ports that use BGP for route advertisement. In some embodiments, the clusters (i.e., failure domains) might include additional gateway hosts assigned to different functionalities, such as hosting logical services (e.g., DHCP, DHCP relay, etc.).

In this example, each of six different logical routers (LR1-LR6) have from three to five logical ports for connecting with the external network, spread throughout these clusters differently. For example, the logical router LR1 has uplink ports implemented on gateways in the hosts 606, 611, 613, and 627, located in four different clusters. The logical router LR3 has uplink ports implemented on gateways in the hosts 608, 609, 621, and 623, with two gateways in each of two of the different clusters. The logical router LR4 has all three of its uplink ports implemented on gateways in the same cluster 625, on hosts 627, 628, and 629. Thus different configurations for implementing the uplink ports of a logical router are possible, depending on the administrator decisions and the needs of the logical networks.

No explicit load balancing is used in the illustrated example, with the gateways assigned to hosts using, e.g., explicit assignment by an administrator or a hash function mod the number of gateways. therefore both the second cluster 610 and the fifth cluster 625 include gateway hosts 613 and 630, respectively, with no gateways implemented (even though both of these clusters also include hosts with multiple gateways). In addition, not all of the clusters have the same number of gateway hosts. This may be due to the clusters simply having different numbers of physical machines, some of the clusters having different numbers of gateway hosts assigned to different tasks, or some of the clusters having host machines offline due to connection or other problems. In some embodiments, when an application running on a gateway identifies a problem with the gateway host, the application notifies a network controller (e.g., the physical controller that manages the gateway host) of the issue so that the gateway host can be taken out of use until the issue is resolved.

Different embodiments handle failover of the L3 gateways implementing the uplink ports differently. In some embodiments, when a gateway host with a L3 gateway implementing an uplink port fails, the network does not immediately replace the L3 gateway on a new host. Instead, the network controller allows the incoming (and, in some embodiments, outgoing) packets to be distributed across the other uplink ports whose gateways are still active. On the other hand, some embodiments replace the L3 gateway with a new implementation for the uplink port on a different gateway host (e.g., in the same cluster as the failed host).

Both the FIG. 6 and the above description illustrates using a single gateway host to implement each uplink port. However, to guard against host failure, some embodiments select both an active and a standby gateway host for each of the uplink ports that connects to the external network. That is, one of the implementations for the logical router port in a first gateway host is active, with MFEs instructed to send packets to it and with its BGP daemon advertising routes. The other implementation of the logical router port, in a second gateway, is configured in the same way but the MFEs do not send traffic to it and its BGP daemon does not advertise routes. If the first (active) gateway host fails, then the MFEs will begin sending traffic to the second (standby) host, and the network controller will let the second host know to activate its BGP daemon. The failover for high-availability gateways is described in further detail in U.S. application Ser. No. 14/166,446, entitled "High Availability L3 Gateways for Logical Networks" and filed Jan. 28, 2014, now issued as U.S. Pat. No. 9,503,371. U.S. application Ser. No. 14/166,446, now issued as U.S. Pat. No. 9,503,371, is incorporated herein by reference.

Returning to FIG. 5, after selecting the gateway hosts for each of the logical router ports connecting to the external network, the process 500 generates (at 515) flow entries (or data tuples defining flow entries) for MFEs on host machines that send packets through the logical router (i.e., machines hosting VMs attached to logical switches that attach to the logical router). These flow entries, among other functionalities, both (i) implement the distributed logical router and (ii) send packets, forwarded by the logical router to one of the logical ports connecting to the external network, to the selected gateway host machines through tunnels. In addition, the flow entries generated for the VM hosts will also include numerous other entries, such as those implementing the logical forwarding for the logical switches, ingress and egress ACLs, etc.

To implement the logical router in the MFEs, some embodiments generate logical forwarding entries that match packets based on destination IP address or address prefix (as well as over the logical pipeline for the router itself), and identify a logical egress port of the logical router based on the IP address. To generate these flow entries, the network controller of some embodiments first generates the routing table for the logical router. In some embodiments, these routes include a default route for sending packets to one of the ports that connects to the external network, as well as routes for sending packets to each attached logical switch based on the IP subnets associated with the logical switches. The routing tables are then embedded into flow entry data tuples (e.g., including a match over the logical router pipeline). In addition, the flow entries for the logical router perform MAC address modification on the packets (to modify the source MAC address to be that of the logical egress port of the logical router, and the destination MAC address to be the address matching the destination IP address). This may include flow entries for either performing ARP or sending packets to an ARP daemon that operates on the hosts as well. Beyond the actual routing of the packet, the network controller generates flow entries for L3 ingress and egress ACL, in some embodiments, according to any policies defined for the logical router.

Different embodiments use different types of flow entries for choosing to which of the logical ports connecting to the external network a packet should be forwarded. Some embodiments send all outgoing packets through a single one of the logical ports, but when the amount of outgoing traffic is large (e.g., for a webserver, a streaming video application, etc.), the gateway on which this port is implemented can become a bottleneck. Other embodiments use an equal-cost multi-path (ECMP)-like technique to choose a logical egress port for packets exiting the logical network. For instance, a flow entry of some embodiments lists the ports as a bundle and then provides a technique to identify to which of the ports to send the packet for a given set of packet properties (e.g., a hash of packet properties modulo the number of ports).

The process 500 also generates (at 520) flow entries for the MFEs on the gateway host machines. These flow entries, among other functions, forward packets to the container (e.g., namespace) implementing a logical router port on the gateway host, forward packets to the NIC that connects to an external router, and forward packets to the other MFEs at the VM hosts through tunnels. For instance, outbound packets (i.e., received from a VM host) are sent by the MFE to the namespace for additional routing by the L3 gateway routing tables in some embodiments. After this routing, the namespace returns the packet to the MFE (as a new packet) with an external router identified as its destination and the MFE sends this new packet to the outbound NIC. For incoming packets, the MFE first sends the packet to the namespace for routing by the L3 gateway routing tables, then receives the packet back and performs first-hop routing to identify a logical egress port of the logical router (typically the port to which one of the logical switches attaches), identify a logical egress port of the logical switch (typically the port to which a VM attaches), and send the packet out a tunnel to the appropriate MFE.

In addition to the flow entries (or data tuples defining the flow entries), the process generates (at 525) data tuples for the routing table for handling ingressing (and, in some embodiments, egressing) packets at each of the L3 gateways implementing a logical port. In some embodiments, these data tuples are generated by a table mapping engine that also generates the flow entries. However, other embodiments utilize a separate route processor to generate the routing entries. As indicated above, much of the routing table is implemented as flow entries sent to the MFEs. However, the routing table of the L3 gateway handles packets being routed to and received from the external network. Accordingly, the routing table (and additional aspects of the IP network stack which may be implemented by the L3 gateway, such as a NAT table) is responsible for performing any necessary ARP (e.g., into the external networks), decrementing the packet TTL (i.e., as another hop for the packet), and for outgoing packets selecting an external router to which the packet will be sent.

These flow entries and/or data tuples generated at operations 515-525 enable the L3 gateways and MFEs to handle the processing of data packets. In addition, the process 500 generates data for the routing protocol application (e.g., a BGP daemon) operating at each of the L3 gateways. Thus, the process identifies (at 530) the addresses (and other information) of the external network router(s) with which to peer for each logical port (i.e., each L3 gateway) that connects to the external network. In some embodiments, the administrator inputs this data for each logical port, and handles ensuring that the external routers are correctly connected to the gateway hosts (or, e.g., a top of rack switch to which the gateway hosts connect). In other embodiments, the network controller automatically determines the set of external routers to which each of the gateway hosts is connected based on its stored network state information, and uses these as the external network routers with which to peer the L3 gateway.

Based on these identified external routers, as well as the calculated routes for the logical network, the process generates (at 535) data tuples to define the routing protocol for the L3 gateways on the selected host machines. As indicated above, in order to define the L3 gateway container on a particular gateway host, some embodiments define each container as a separate data tuple that specifies the existence of the container and the processes running on the container, including BGP or another routing protocol application. This data tuple defines various BGP options, such as the router ID, whether or not to advertise graceful restart capability, and a list of prefixes to advertise to all peers. This list of IP addresses and/or prefixes, in some embodiments, is based on the user configuration of the logical network (e.g., the public IPs configured for the logical switches of the logical network). In addition, the controller generates a data tuple for each peer external router (e.g., BGP neighbor) of each L3 gateway. These neighbor data tuples specify, in some embodiments, the address of the external router, a keep-alive timer that indicates the time between keep-alive packets, and the interface through which the BGP application in the gateway communicates with the neighbor, among other information.

With the data generated, the process 500 distributes (at 540) the generated data tuples and/or flow entries to the various host machines. In some embodiments, the two types of data (flow entries and routing table/routing protocol data tuples) are distributed via different protocols. Some embodiments distribute the flow entries to both the VM hosts and the gateway hosts via a first protocol such as OpenFlow, while distributing the routing protocol (e.g., BGP) information and the routing table to the gateway hosts via a second protocol such as OVSDB. The OVSDB protocol used in some embodiments also carries configuration information for the MFEs (for both the VM hosts and the gateway hosts).

The above FIG. 5 conceptually illustrates the process 500 as a single linear flow performed by the controller. However, one of ordinary skill in the art will recognize that the order in which the controller calculates the various flow entries and/or data tuples need not follow that shown in the figure. For instance, the controller might generate the flow entries for the gateway hosts before those for the MFEs, etc. Furthermore, some embodiments do not wait until all of the indicated data is calculated in order to distribute the data, but might distribute the data incrementally. For instance, some embodiments distribute the forwarding data separate from the routing protocol data, or incrementally distribute the forwarding data to a specific host once all the data for that host has been generated.

II. Gateway Host Architecture

The above section describes in detail the generation of logical router and routing protocol data by a controller and the distribution of that data to the gateway host machines on which the containers (e.g., namespaces) operating as L3 gateways reside. In some embodiments, the gateway host machines include various modules (e.g., running as user space daemons or kernel modules) that are responsible for creating the containers, building routing tables in the containers, and processing packets to and from the namespaces, based on the data tuples distributed by the network control system.

Figure 7:
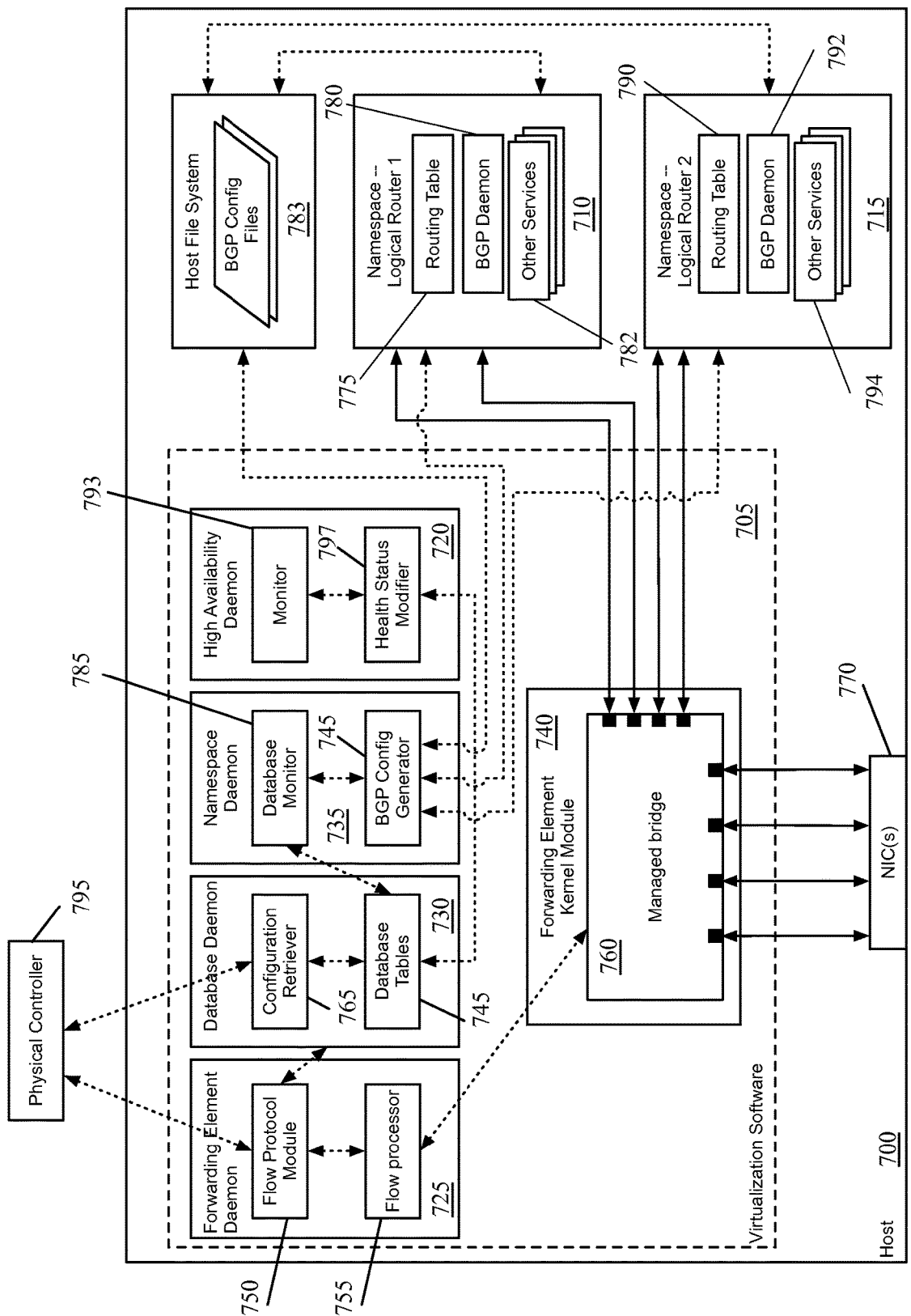
FIG. 7 conceptually illustrates a software architecture of some embodiments for a gateway host machine.

FIG. 7 conceptually illustrates a software architecture of some embodiments for a gateway host machine 700. The host machine 700 is a host designated for hosting L3 gateway implementations, which may operate a routing protocol application, within namespaces. As shown, the host 700 includes virtualization software 705 and two namespaces 710 and 715. In some embodiments, the host includes a base Linux operating system on which the namespaces 710 and 715 run as containers. In some embodiments, the gateway host machine 700 is a computer with a standard x86-based processor.

The virtualization software 705 includes a forwarding element daemon 725, a database daemon 730, a namespace daemon 735, a high availability daemon 720, and a forwarding element kernel module 740. In some embodiments, the forwarding element daemon 725, the database daemon 730, the namespace daemon 735, and the high availability daemon 720 operate in the user space of virtualization software 705, while the forwarding element kernel module 740 operates in the kernel of the virtualization software 705. In some embodiments, the forwarding element used on the host is Open vSwitch (OVS), and these modules are the OVS daemon, OVSDB daemon, and OVS kernel module, in addition to the namespace daemon and the high availability daemon. In some embodiments, the functionalities of the namespace daemon 735 and the high availability daemon 720 are combined into a single user space application. This figure illustrates both control path connections (shown as dashed lines) for provisioning the managed forwarding element and the namespaces, as well as data path connections (shown as solid lines) for sending data packets (including BGP packets). One of ordinary skill in the art will recognize that, in addition to the modules shown, which relate to the virtual switch and hosted namespaces, the virtualization software of some embodiments includes additional modules for performing, e.g., virtualization of the hardware resources (e.g., processors, memory, etc.) of the host machine 700.

The forwarding element daemon 725 is an application that communicates with a physical network controller 795 in some embodiments in order to receive instructions for processing and forwarding packets sent to and from the namespaces 710 and 715 (e.g., packets entering the managed network from an external network or leaving the managed network to an external network). Specifically, as described in the previous section, the forwarding element daemon 725 receives physical control plane flow entries from the physical controller 795. The forwarding element daemon, in some embodiments, communicates with the network controller through the OpenFlow protocol, though other embodiments may use different communication protocols for transferring the forwarding data to the host machine. Additionally, in some embodiments the forwarding element daemon 725 retrieves configuration information from the database daemon 730 after the physical controller 795 transmits the configuration information to the database daemon.

The forwarding element daemon 725 of some embodiments includes a flow protocol module 750 and a flow processor 755. The flow protocol module 750 handles the communication with the network controller 795 in order to receive physical control plane information (e.g., flow entries) for the managed forwarding element. As mentioned, in some embodiments this communication uses the OpenFlow protocol. When the flow protocol module 750 receives this physical control plane information, it translates the received information into data understandable by the flow processor 755 (e.g., physical forwarding plane information useable for processing packets).

The flow processor 755 manages the rules for processing and forwarding (i.e., switching, routing) packets in some embodiments. For instance, the flow processor 755 stores rules (e.g., in a machine readable storage medium, such as a disk drive) received from the flow protocol module 750. In some embodiments, the rules are stored as a set of flow tables (forwarding tables) that each includes a set of flow entries. These flow entries, in some embodiments, include a match (i.e., a set of packet characteristics) and one or more actions (i.e., a set of actions to take on packets that match the set of characteristics). In some embodiments, the flow processor 725 handles packets for which the managed bridge 760 (described below) does not have a matching rule. In such cases, the flow processor 755 matches the packets against its stored rules. When a packet matches a rule, the flow processor 725 sends the matched rule and the packet to the managed bridge 760 for the managed bridge to process. This way, when the managed bridge 760 subsequently receives a similar packet that matches the generated rule, the packet will be matched against the generated exact match rule in the managed bridge and the flow processor 755 will not have to process the packet.

In some embodiments, the database daemon 730 is an application that also communicates with the physical controller 795 in order to configure the managed forwarding element (e.g., the forwarding element daemon 725 and/or the forwarding element kernel module 740). For instance, the database daemon 730 receives configuration information from the physical controller and stores the configuration information in a set of database tables 745. This configuration information may include tunnel information for creating tunnels to other managed forwarding elements, port information, etc. In some embodiments, the database daemon 730 communicates with the network controller 795 through a database communication protocol (e.g., OVSDB). In some cases, the database daemon 730 may receive requests for configuration information from the forwarding element daemon 725. The database daemon 730, in these cases, retrieves the requested configuration information (e.g., from its set of database tables 745) and sends the configuration information to the forwarding element daemon 725.

In addition to the forwarding element configuration (tunnel and port information, etc.), the database daemon 730 of some embodiments additionally receives BGP configuration information that defines the configuration for the BGP daemons operating in the namespaces 710 and 715. This information includes information about the routes the BGP daemon advertises to its peers, as well as information identifying those peers. The database daemon 730 may receive this BGP configuration information along with the forwarding element configuration information, or in separate transactions with the controller 795.

As shown, the database daemon 730 includes a configuration retriever 765 and a set of database tables 745 (which may be stored, e.g., on a hard drive, volatile memory, or other storage of the host 700). The configuration retriever 765 is responsible for communications with the physical controller 795. In some embodiments, the configuration retriever receives the configuration information for the managed forwarding element from the controller. In addition, the configuration retriever in some embodiments receives the data tuples for configuring the namespaces 710 and 715, and any routing tables, NAT tables, BGP daemon, or other services provided by the namespaces. The configuration retriever 765 also converts these data tuples into database table records to store in the database tables 745 in some embodiments.

Specifically, the database tables 745 of some embodiments include a container table, with each record in the database defining a different namespace (or other container) on the host machine. Thus, for the host 700, the container table would include a row for each of the two namespaces 710 and 715. In addition, for each namespace, the database tables store information defining the routing table (e.g., a default route, any additional routes defined for the connected logical switches, and any user-defined static routes). If the router performs NAT, then the database also stores the NAT rules (source NAT and/or destination NAT) for the logical router). Furthermore, for each namespace, the database stores a list of the logical router ports, with IP address, MAC address, netmask, etc. for each port.

For the namespaces 710 and 715, with active BGP daemons, the database table record indicates that BGP is enabled. Furthermore, in some embodiments, these records contain an additional column specifying the BGP properties of the L3 gateway as a peering router. These properties may include a local autonomous system number (which, in different embodiments, identifies either the logical network to which the L3 gateway belongs or the managed network as a whole), a router identifier (e.g., an IP address), whether or not to advertise graceful restart (used for failover purposes—in some embodiments, namespaces that are the only L3 gateway implementing a port do not advertise graceful restart), and a set of addresses/prefixes advertised by the BGP daemon.

Furthermore, some embodiments define a database table record (e.g., in a different database table) for each external physical router that the L3 gateway peers with via the BGP daemon (i.e., each BGP neighbor). These records, in some embodiments, specify some or all of the IP address of the neighbor router, the autonomous system number for the router, a keep-alive timer (i.e., the duration between keep-alive messages sent to the neighbor in order to keep a BGP session alive), an optional password used for MD5 authentication, a hold-down timer duration (i.e., the duration after which, if no keep-alive messages are received, the BGP daemon assumes that the neighbor has gone down), and an interface through which communication with the BGP neighbor is sent.

The forwarding element kernel module 740 processes and forwards network data (e.g., packets) between the namespaces running on the host 700, network hosts external to the host 700, and forwarding elements operating on other hosts in the managed network (e.g., for network data packets received through the NIC(s) 770 or from the namespaces 710 and 715). In some embodiments, the forwarding element kernel module 740 implements the forwarding tables of the physical control plane for one or more logical networks (specifically, the logical networks to which the namespaces 710 and 715 belong). To facilitate the processing of network data, the forwarding element kernel module 740 communicates with forwarding element daemon 725 (e.g., to receive flow entries from the flow processor 755).

FIG. 7 illustrates that the forwarding element kernel module 740 includes a managed bridge 760. In addition, in some embodiments, the virtual switch kernel module may include additional bridges, such as physical interface (PIF) bridges. Some embodiments include a PIF bridge for each of the NICs 770 in the host machine's hardware. In this case, in some embodiments a PIF bridge is located between the managed bridge 760 and each of the NICs 770.

The managed bridge 760 of some embodiments performs the actual processing and forwarding of the packets between the namespaces 710 and 715 and the VMs and other hosts (including external hosts) that send traffic to and receive traffic from the namespaces. Packets are received at the managed bridge 760, e.g., from the MFEs at the VM hosts through tunnel ports, or from the external routers via their connection to the NICS, such that packets arriving over different tunnels or external router connections are received at different interfaces of the bridge 760. For packets received from other MFEs (e.g., at the VM hosts), the managed bridge 760 sends the packets to the appropriate namespace through its interface(s) with the namespace based on a destination logical port appended to the packet (or other information, such as a destination MAC or IP address).

For packets received from an external router, the managed bridge 760 of some embodiments sends the packets to the appropriate namespace based on, e.g., a destination MAC and/or IP address of the packet. When an external router routes a packet to the namespace, the router performs MAC address replacement using previously-discovered ARP information. In some embodiments, the external router has a MAC address of the namespace associated with various IP addresses behind that namespace, and therefore uses the namespace MAC address as the destination address for packets directed to that gateway. In some embodiments, the managed bridge uses this information to direct these packets to the appropriate namespace, as packets entering the logical network do not yet have logical context information appended.

Similarly, the managed bridge receives packets from the namespaces 710 and 715, and processes and forwards these packets based on the interface through which the packets are received and the source and/or destination addresses of the packets. In some embodiments, to process the packets, the managed bridge 760 stores a subset of the rules stored in the flow processor 755 (and/or rules derived from rules stored in the flow processor 755) that are in current or recent use for processing the packets. The managed bridge 760, in this figure, includes two interfaces to each of the namespaces 710 and 715. In some embodiments, the managed bridge includes a separate interface for each logical port of the logical router. Thus, the managed bridge may send a packet to the namespace through one of its interfaces, and after routing by the namespace routing table, the managed bridge receives the packet back through a different interface. On the other hand, because the namespace only implements one of the logical router ports, some embodiments only have a single interface between the namespace and the managed bridge.

Although FIG. 7 illustrates one managed bridge, the forwarding element kernel module 740 may include multiple managed bridges. For instance, in some embodiments, the forwarding element kernel module 740 includes a separate bridge for each logical network that is implemented within the host machine 700, or for each namespace residing in the host (which will often be the same as each logical network). As such, in this example, the forwarding element kernel module 740 would include two managed bridges, with separate interfaces to the namespaces 710.

Each of the namespaces 710 and 715 implements a different L3 gateway (i.e., implements a different port of a logical router). In some embodiments, all of the namespaces on a particular gateway host machine are of the same type (i.e., implementing a single logical router port using a router peering protocol such as BGP). On the other hand, some embodiments also allow namespaces that are one of several to equivalently implement an entire routing table for a logical router or act as gateways for a logical router that has a single logical port attachment to the external network. Furthermore, some embodiments also allow namespaces to provide logical services other than routing, such as DHCP, DHCP relay, metadata proxy, etc.

As indicated in this figure, different namespaces implementing different L3 gateways (e.g., different logical ports) for different logical networks (or, in some cases, for the same logical router or different logical routers within the same logical network) may reside on the same host 700 in some embodiments. In this case, both of the namespaces 710 and 715 run a BGP daemon and a routing table.

In some embodiments, the namespace may provide multiple services. In this case, the first namespace 710 includes a routing table 775, a BGP daemon 780, and other services 782. These other services running on the namespace 710 might provide ARP functionality, a network address translation (NAT) table, or other features associated with a router. The second namespace 715 also includes a routing table 790 and a BGP daemon 792, along with other services 794. Some embodiments use the same set of services for all of the L3 gateways that implement ports and use router peering protocols, while other embodiments allow the user to configure the network stack or other services provided. In addition, some embodiments restrict the use of stateful services, such as NAT, for implementations in which multiple gateways are active for a logical router at the same time. That is, the network control system prevents the L3 gateways from utilizing those service that require the various gateways for a logical router to share state information.

The namespace daemon 735 of some embodiments manages the namespaces 710 and 715 residing on the host 700 and the services running in those namespaces (e.g., logical router and L3 gateway service). As shown, the namespace daemon 735 includes a database monitor 785 and a BGP configuration generator 799. In addition, some embodiments include configuration generators or similar modules for other services (e.g., a NAT table generator, a routing table generator, configuration generators for DHCP and other services that may be provided in the namespaces, etc.).

The database monitor 785 listens on the database tables 745 for changes to specific tables that affect the namespaces implementing logical routers. These changes may include the creation of a new namespace, removal of a namespace, adding or removing a BGP neighbor, modifying the BGP configuration or routing table within a namespace, attaching new logical switches to a logical router, etc. When the database monitor 785 detects a change that affects the namespaces, it either causes the namespace daemon to create a new namespace on the host for a new logical router, instantiate a new process in an existing namespace (e.g., for a newly enabled service), or generate/modify the routing table or other configuration data for a namespace.

When the database monitor 785 detects new BGP configuration data (either a new namespace with a BGP configuration, a modification to an existing BGP configuration, modifications to the set of neighbors for a particular BGP daemon, etc.), the database monitor 785 provides this data to the BGP configuration generator 799 (or instructs the BGP configuration generator 799 to retrieve the new data from the database tables 745). The BGP configuration generator uses the data tuples stored in the database tables 745 to build a configuration file for the BGP daemon in the format required by the daemon. In some embodiments, the namespace daemon 785 stores the generated configuration in the host file system 783 In some embodiments, the BGP daemon 780 and 792 is a standard application available for Linux or a different operating system.

The high availability daemon 720 monitors the health of the gateway host 700 and/or the namespaces 710 and 715 operating on the host 700. This daemon is responsible for reporting to the controller 795 when the gateway host 700 is no longer healthy and should be taken out of use, thereby allowing the controller to assign the namespaces operating on the host to new gateway hosts, modify flow entries used for tunnel encapsulation at the VM hosts that send packets to the L3 gateways implemented on the gateway host 700, etc.

The high availability daemon 720 includes a monitor 793 and a health status modifier 797 in some embodiments. The monitor 793 of some embodiments monitors various aspects of the gateway host machine 700 to determine whether the machine should remain in use or be taken out of use for hosting L3 gateways (as well as other services for logical networks). The monitor 793 may monitor the underlying hardware resources (e.g., processors, memory, etc.) to ensure that these resources are functioning well enough to provide the logical routing services at necessary speeds. In addition, the monitor 793 ensures that connections to the other host machines (e.g., the VM hosts that send traffic to the gateway host) are functioning properly. Some embodiments monitor the connections by monitoring the physical NICs, and monitoring whether packets are received from these hosts. In addition, the monitor 793 of some embodiments monitors the software operating on the host. For instance, the monitor checks on the other modules of the virtualization software 705 and the namespaces 710 and 715 to ensure that they have not crashed or otherwise failed. In addition, in some embodiments the high availability daemon 720 uses Bidirectional Forwarding Detection (BFD) to monitor upstream routers (e.g., routers external to the managed network) directly.

When the monitor 793 determines that the gateway host 700 should be taken out of use for any reason, the high availability daemon 720 notifies the physical controller 795 that manages the gateway host machine 700. To notify the controller, in some embodiments the health status modifier 797 modifies the database tables 745 with information that the database daemon 765 (e.g., via the configuration retriever 765) propagates up to the controller 795. In some embodiments, the health status modifier 797 modifies a table that includes a health variable for the gateway host 700 to indicate that the gateway should be inactive. In some embodiments, the health status modifier 797 modifies a row in the tables 745 created for each namespace to indicate that the namespace should be considered inactive. When a single namespace crashes, the health status modifier 797 only modifies the data for the crashed namespace.

The configuration retriever 765, in some embodiments, detects that the database tables 745 have been modified and sends updated data tuples to the physical controller 795. When the controller 795 receives such an indication, the controller identifies the logical controllers with affected logical routers, enabling these controllers to (i) assign the logical ports for implementation on new gateway hosts, and (ii) generate new flow entries for the MFE hosts that send packets to the L3 gateways.

III. Configuration of Routing Protocol Application

As indicated in the previous section, in some embodiments an application (e.g., a user space daemon) or set of applications operating on the gateway host machine is responsible for receiving a L3 gateway configuration and installing that configuration in a namespace or other container on the gateway host. The L3 gateway configuration may include a routing table, a routing protocol configuration, as well as other data. The application, among other functions, retrieves information from a set of database tables stored on the host and uses that information to set up the L3 gateway, with its various functionalities, in a namespace on the host. This setup includes the generation of a configuration file that specifies various BGP parameters and BGP neighbors for the BGP daemon, in some embodiments.

Figure 8:
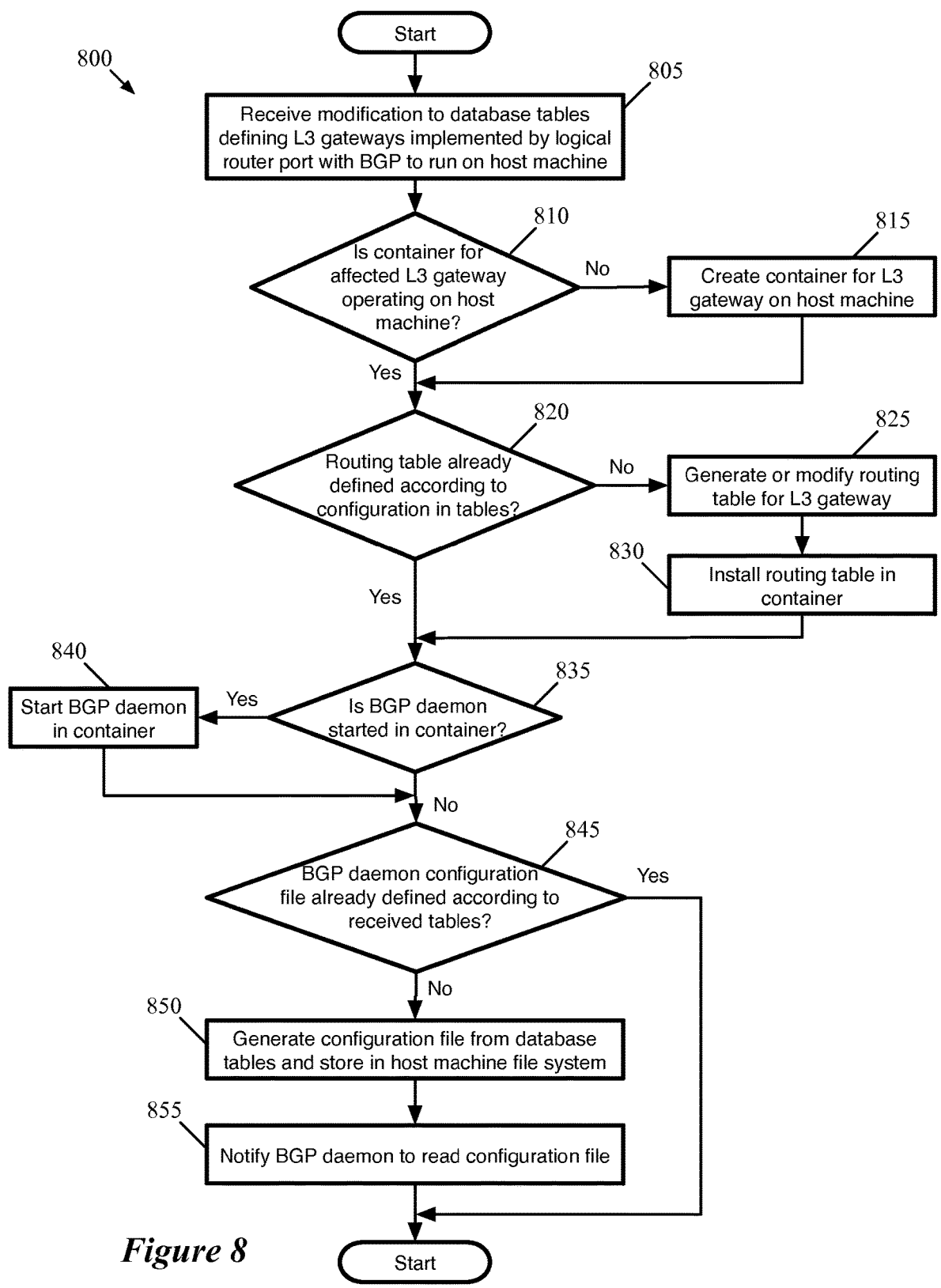
FIG. 8 conceptually illustrates a process of some embodiments for setting up or modifying a L3 gateway on a gateway host machine.

FIG. 8 conceptually illustrates a process 800 of some embodiments for setting up or modifying a L3 gateway on a gateway host machine. In some embodiments, the process 800 is performed by a user space daemon in the virtualization software running on the gateway host, such as the namespace daemon 785. As shown, the process 800 begins by receiving (at 805) a modification to database tables that define L3 gateways implementing a logical router port with BGP to run on the host machine. In some embodiments, the application responsible for creating the L3 gateway on the host and generating the BGP configuration file listens on a set of database tables that are populated by controller data. When a new row is added to the table defining the namespaces on the host, or an existing row is modified, the application detects this change and retrieves the data. When the change relates to either the creation of a namespace with a BGP daemon or the modification of the BGP configuration for an existing namespace, the BGP configuration generator is called in order to create or modify the configuration file for the new/affected BGP daemon.

Upon receiving the database tables, the process 800 determines (at 810) whether the container for the affected L3 gateway is already operating on the host machine. That is, the process determines whether the modification to the database tables is for adding a new gateway or modifying an existing gateway. In some embodiments, the database tables on the gateway host first receive a data tuple simply defining a new container, and then subsequently receive the configuration information, in which case the routing table and/or BGP configuration data will be treated as a modification to an existing namespace.

When the container is not yet operating on the host machine, the process creates (at 815) a container for a new L3 gateway on the host machine. In some embodiments, a user space application operating in the virtualization software of the gateway host machine (e.g., a namespace daemon) is responsible for creating and removing containers for L3 gateways on the host. As mentioned, in some embodiments this container is a virtualized container such as a namespace or a virtual machine that operates on top of the base operating system. Some embodiments use a Linux namespace, as this uses less operational resources than a typical virtual machine, and is adequate for the operations performed by the L3 gateway (e.g., IP stack including routing, BGP daemon). In some embodiments, each gateway host machine runs numerous (e.g., dozens) of namespaces operating L3 gateways for numerous different logical routers of numerous different logical networks.

Next, the process 800 determines (at 820) whether a routing table has yet been defined for the affected L3 gateway according to the configuration in the database tables. For example, if the database tables only define a new L3 gateway without providing any information about the configuration of the namespace for the L3 gateway, then the namespace daemon will create a new namespace on the host, but not configure the namespace at all. Furthermore, if the database tables only include modifications to other aspects of the namespace, such as the BGP configuration, then the namespace daemon will not modify the routing table of the particular L3 gateway. However, in some embodiments, the namespace daemon ensures that any routes advertised by the BGP daemon are also in the routing table of the L3 gateway. As such, if new prefixes are added to the list of those to advertise in the BGP configuration, then the namespace daemon adds these to the routing table if not already present.

However, when the routing table currently installed in the container does not match the routing table definition in the database tables (either because there is no routing table yet defined or because the routing table definition has been modified), the process generates or modifies (at 825) the routing table for the L3 gateway, and installs (at 830) the routing table in the container. In some embodiments, this is actually one operation, as the namespace daemon directly modifies the IP stack in the namespace. In other embodiments, the namespace daemon generates a routing table or IP stack and then installs this in the container as a separate action.

Next, the process 800 determines (at 835) whether the BGP daemon has been started in the container for the L3 gateway. For example, if the container was previously created without a configuration, or if the container was just created during the process 800 (i.e., if the database tables defined a new container with a BGP configuration), then the daemon would not have yet been started in the container. On the other hand, if the modification to the database tables was just an update to the routing table or the BGP configuration (e.g., adding routes for a new logical switch, adding or removing a BGP neighbor, etc.), then the BGP daemon would already be in operation in the container for the L3 gateway.

When the BGP daemon has not yet been started, the process starts (at 840) a BGP daemon in the container. In some embodiments, the namespace daemon sends an instruction to the namespace implementing the L3 gateway to start up a BGP daemon. In order for the namespace to actually run an instance of the BGP daemon, in some embodiments the software is already installed on the namespace by default. In other embodiments, either the namespace retrieves the daemon (e.g., from a storage on the gateway host) or the namespace daemon retrieves the daemon and installs it on the namespace.

With the BGP daemon started, the process determines (at 845) whether the configuration of the BGP daemon matches that defined in the received database tables for the L3 gateway. If the BGP daemon was just started (at operation 840), then the daemon will not yet have a configuration, and therefore clearly will not match that defined in the database tables. In addition, the database table modifications might add or remove routes to advertise, add or remove BGP neighbors, or modify the data for a BGP neighbor. However, if the database table modifications only affect the routing table, then no BGP configuration modifications will be required.

When the operating configuration does not match that defined by the database tables, the process generates (at 850) a configuration file from the database tables and stores the file in the file system of the host machine. In some embodiments, within a specific directory of the file system, each of the gateways operating on the machine is assigned a subdirectory for, e.g., the BGP configuration file, as well as storage for other data (e.g., a DHCP configuration file, etc.). In order to generate the configuration file, in some embodiments the namespace daemon uses the data tuples from the database table records and transforms them into a specific format readable by the BGP daemon. For instance, in some embodiments the configuration file is a textfile. In other embodiments, the namespace daemon first generates an intermediate configuration file (e.g., a text file), then converts this into a binary snapshot readable by the BGP daemon, and stores both of these files in the directory for the BGP daemon instance in the namespace. The configuration file, in some embodiments, defines (i) the autonomous system and identification information for the BGP daemon as a router, (ii) a set of routes for the BGP daemon to advertise, and (iii) information about the external router peers of the BGP daemon.

Once the configuration file has been generated, the process 800 notifies (at 805) the BGP daemon to read the configuration file in order for its configuration to match that defined in the database tables. In some embodiments, the notification takes place via a TCP connection within the gateway host between the namespace daemon and the BGP daemon. The BGP daemon, in some embodiments, reads the binary configuration file, calculates changes from its current operating configuration, and applies these changes.

IV. BGP Operation in Gateway

Figure 9:
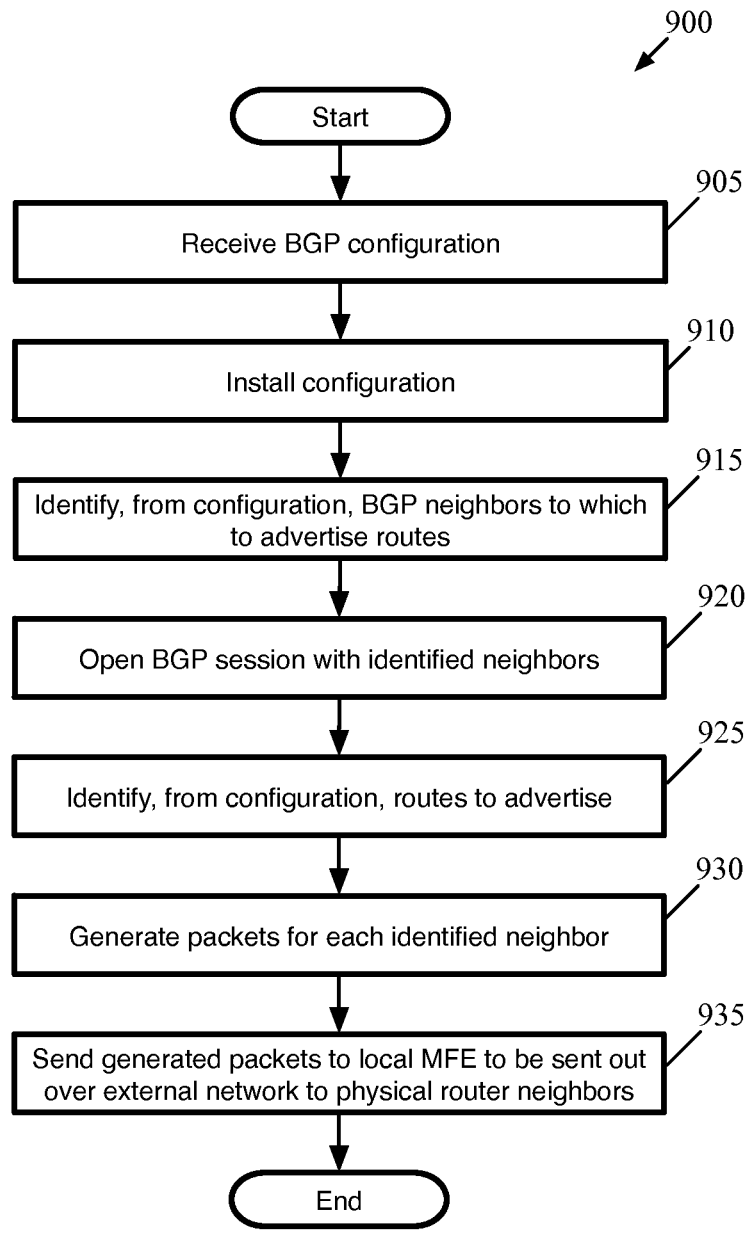
FIG. 9 conceptually illustrates a process of some embodiments performed by the routing protocol application (e.g., BGP daemon) of some embodiments in order to advertise routes to external routers for an L3 gateway.

Once the BGP daemon has been instantiated, and its configuration file loaded, the L3 gateway can participate in route exchange as a peer of the external routers. FIG. 9 conceptually illustrates a process 900 of some embodiments performed by the routing protocol application (e.g., BGP daemon) of some embodiments in order to advertise routes to external routers for an L3 gateway. The process 900 represents a process performed by the BGP daemon upon initial startup. One of ordinary skill in the art will recognize that in many cases the operations will not be performed in the linear fashion shown in this figure. For example, communication with different external routers may require different lengths of setup time, and the BGP daemon treats each peer-to-peer connection as a separate process in some embodiments.

As shown, the process 900 begins by receiving (at 905) a BGP configuration. As described in the previous section, in some embodiments a user space application in the virtualization software of the host (e.g., the namespace daemon) generates a BGP configuration file, stores the configuration file in a directory of the host file system for the namespace, and then notifies the BGP daemon of the configuration file. At this point, the BGP daemon can retrieve the BGP configuration from the directory.

Next, the process 900 installs (at 910) the configuration. In some embodiments, the BGP daemon reads the retrieved binary file, determines the differences between its current operating configuration and the configuration specified in the binary file, and applies these changes to the existing configuration such that the new operating configuration matches that in the configuration file. If this is the initial setup for the BGP daemon, then the operating configuration will have no data. However, if the change is limited to adding or removing a route to advertise, or adding, removing, or modifying information about a neighbor physical router, then the BGP daemon only modifies its configuration to effect the changes, rather than reloading the entire configuration.

Figure 15:
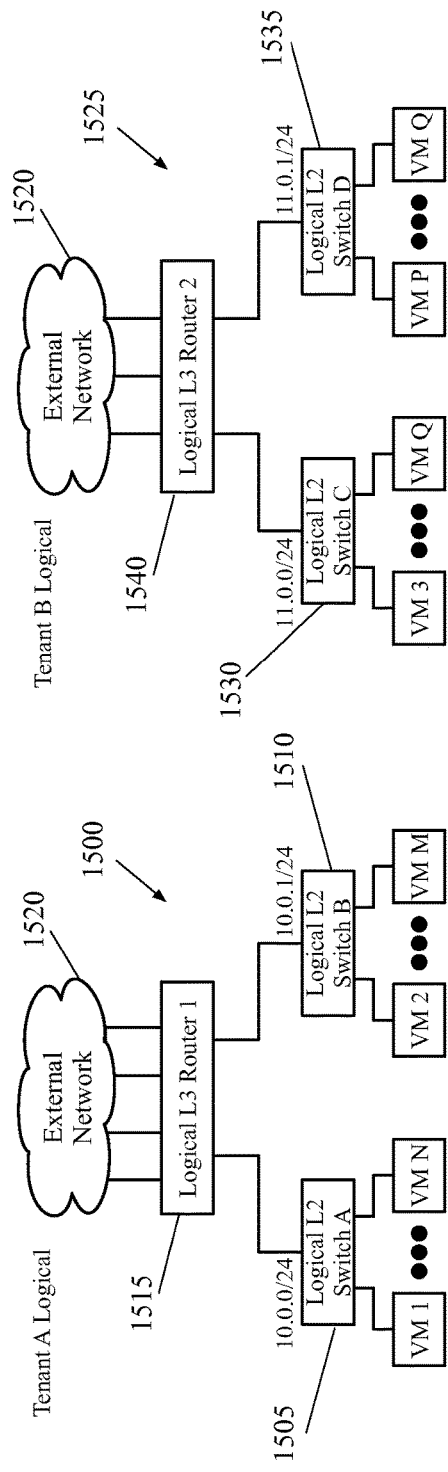
FIG. 15 illustrates two logical networks and the physical implementation of those logical networks in a managed network.
Figure 15:
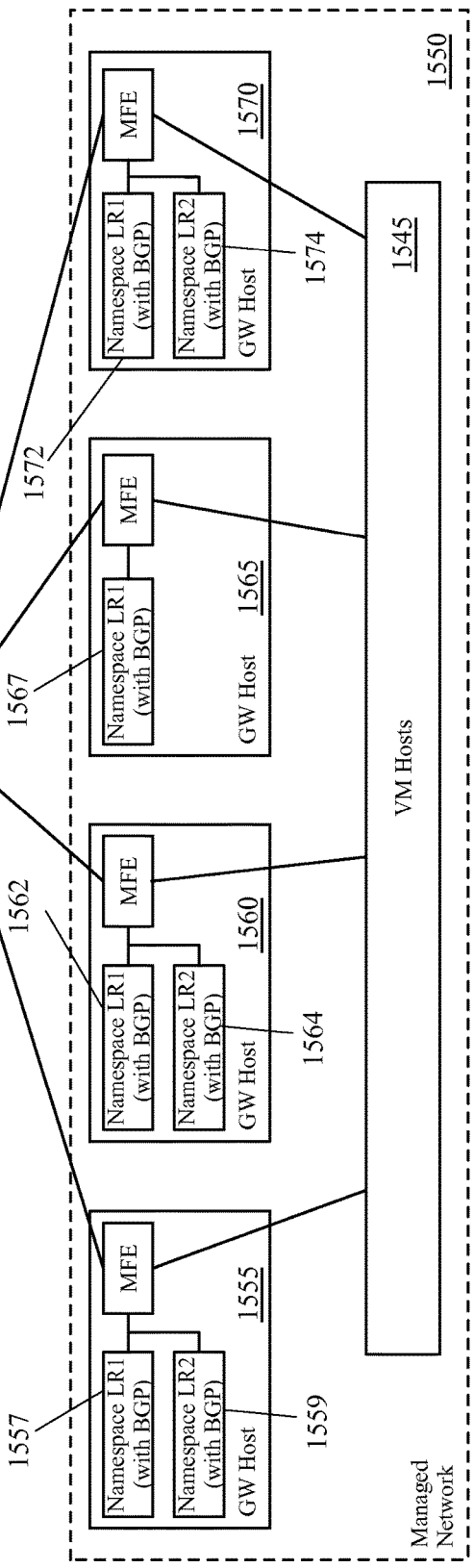

With the configuration installed, the process identifies (at 915) the BGP neighbors (i.e., peer physical routers) with which to set up a connection in order to advertise routes. This may be a single physical router (e.g., as shown in FIG. 15 below) or several physical routers to which the gateway (using the BGP daemon) advertises the same routes (e.g., as in FIG. 10 below). In some embodiments, the physical connections between the gateway host machines on which the L3 gateways operate and the external physical routers are set up manually and identified to the network controller by the administrator when the network is configured, whereas in other embodiments the network controller identifies the routers to which each gateway is connected automatically without this information being input by a user.

In some embodiments, the BGP daemon identifies, for each physical router, the IP address of the router, the autonomous system number to which the router belongs, the keep-alive timer for a BGP session with the router, a hold-down time that specifies a duration after which the BGP daemon should assume the router has gone down if no keep-alive messages have been received, and optionally a password for authentication. Different physical routers with which a single BGP daemon establishes connections may use different BGP settings (e.g., different keep-alive or hold-down timers) and belong to different autonomous systems.

Next, the process opens (at 920), or attempts to open, a BGP session with each of the identified BGP neighbors. In some embodiments, the BGP daemon operates as the standard BGP state machine for each connection. That is, the daemon essentially instantiates a separate state machine for each BGP connection with a different physical router. The daemon, for each connection, attempts to transition to the Established state in order to be able to exchange route updates with the physical router. That is, the BGP daemon attempts to initiate a TCP connection with the peer, send an Open message and receive an Open message in return, and send and receive keep-alive messages in order to transition from the Connect state to the OpenSent state to the OpenConfirm state and finally to the Established state. When a connection with a peer router is in the Established state, the BGP daemon and the peer router can exchange route information.

However, for various reasons, the BGP daemon might be unable to open a session (also referred to as establishing adjacency) with one or more of its identified neighbors. For instance, if the autonomous system number provided in the configuration file for a particular peer router does not match the actual autonomous system number configured on the peer router, then adjacency will not be established. The process 900 assumes that adjacency is established for each BGP neighbor—if the daemon fails to open a session with a particular router, then it continues attempting in some embodiments (e.g., attempting to establish a TCP session, attempting to send and receive Open messages, etc.).

The process also identifies (at 925) the routes to advertise to its peers with which a BGP session has been established, based on the configuration file. In some embodiments, the BGP daemon advertises the same addresses and prefixes to each of the routers with which it peers. These may be single IP addresses (e.g., 10.1.1.1) or CIDR prefixes (e.g., 10.1.1/24) that represent ranges of IP addresses. In some embodiments, the BGP daemon advertises all routes in CIDR slash-notation (e.g., using /32 to denote a single IP address).

Using the identified prefixes and addresses, the process generates (at 930) packets for each identified neighbor with which an adjacency has been established. In some embodiments, these packets are standard BGP Update packets that identify the known reachable prefixes and the list of autonomous systems through which a packet will have to pass to reach each prefix. For routes to logical switches, the BGP packet advertises the subnet (e.g., 10.1.1/24) and only a single autonomous system number (that to which the L3 gateway belongs), as packets will not have to be sent to any other autonomous systems once reaching the L3 gateway in order to reach the VM hosts.

Each time a packet is generated, the process sends (at 935) the generated packet out of the namespace to the local MFE in order for the MFE to send the packet out over the external network to the destination physical router neighbor. If the BGP daemon establishes adjacencies with three different physical routers, then the daemon will send the same BGP Update packet to three different destinations via the MFE. Furthermore, several different namespaces might be running BGP daemon instances on the same host for different logical routers, in which case the same router might receive several different Update packets advertising completely different routes.

Figure 10:
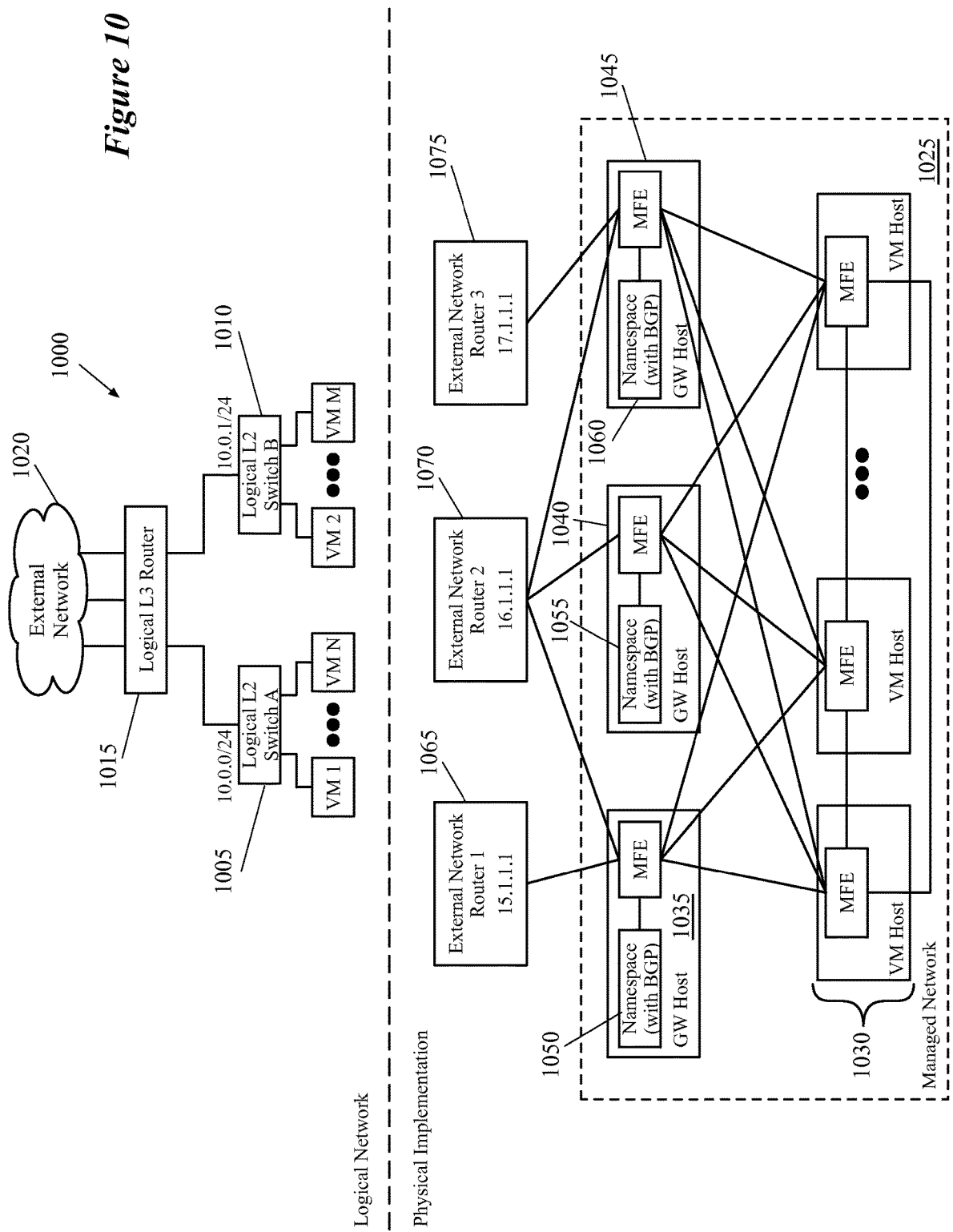
FIG. 10 illustrates both a logical network and the physical implementation of that logical network in a managed network.

FIGS. 10-14 conceptually illustrate an example of the use of BGP in a L3 gateway to advertise routes to a set of three external routers for a logical network. FIG. 10 illustrates both the logical network 1000 and the physical implementation of that logical network in a managed network 1025. As shown in the top half of the figure, the logical network 1000 is configured similarly to the logical network 100 of FIG. 1, with a single logical router 1015 connecting two logical switches 1005 and 1010. The first logical switch 1005 includes IP addresses in the subnet 10.0.0/24 (sometimes written as 10.0.0.0/24), and the second logical switch 1510 includes IP addresses in the subnet 10.0.1/24 (sometimes written as 10.0.1.0/24). In addition, the logical router 1015 includes three ports that connect to an external network 1020, for which route advertisement (e.g., using BGP) is activated.

The bottom portion of FIG. 10 illustrates the physical implementation of the logical network 1000. Within the managed network, a set of VM host machines 1030 hosts the VMs attached to the logical switches 1005 and 1010. These VM hosts 1030 may each host a single VM from the logical network, and some might host multiple VMs, either from the same logical switch or different logical switches. The forwarding tables of the MFEs on the VM hosts each implement both of the logical switches 1005 and 1010 as well as the logical router 1015. In addition, in some embodiments, these VM hosts 1030 may host VMs from other logical networks, and the forwarding tables of the MFEs would then implement these other logical networks as well. Furthermore, the managed network 1025 of some embodiments includes additional VM hosts that host VMs for other logical networks but upon which none of the VMs for logical network 1000 reside.

In addition, the managed network 1025 includes three gateway hosts 1035-1045. Each of these gateway hosts 1035-1045 hosts a namespace that implements one of the three logical router ports that faces the external network 1020. Specifically, the first gateway host 1035 hosts a first namespace 1050 implementing a first logical router port, the second gateway host 1040 hosts a second namespace 1055 implementing a second logical router port, and the third gateway host 1045 hosts a third namespace 1060 implementing a third logical router port. Each of these namespaces 1050-1060 operates a BGP daemon or other routing protocol application for exchanging routing information with the attached external network routers. A MFE also operates on each of the gateway hosts 1035-1045. In some embodiments, the MFEs each implement the logical switches 1005 and 1010 as well as the logical router 1015. While outgoing packets from the VMs will have already been processed through most of the logical network, these MFEs act as first-hop MFEs for incoming packets, and process these incoming packets through the logical network in some embodiments. As the gateway hosts may implement other namespaces for other logical networks, these MFEs may implement other logical networks as well.

In this example, three external network routers 1065-1075 connect to the namespaces 1050-1060 through the MFEs on the gateway hosts. The first router 1065 connects to only the namespace 1050 on host 1035, the second router 1070 connects to all three of the namespaces 1050-1060, and the third router 1075 connects to the namespace 1060 on host 1045. These routers may provide connections through to the Internet, other networks, etc.

Figure 11:
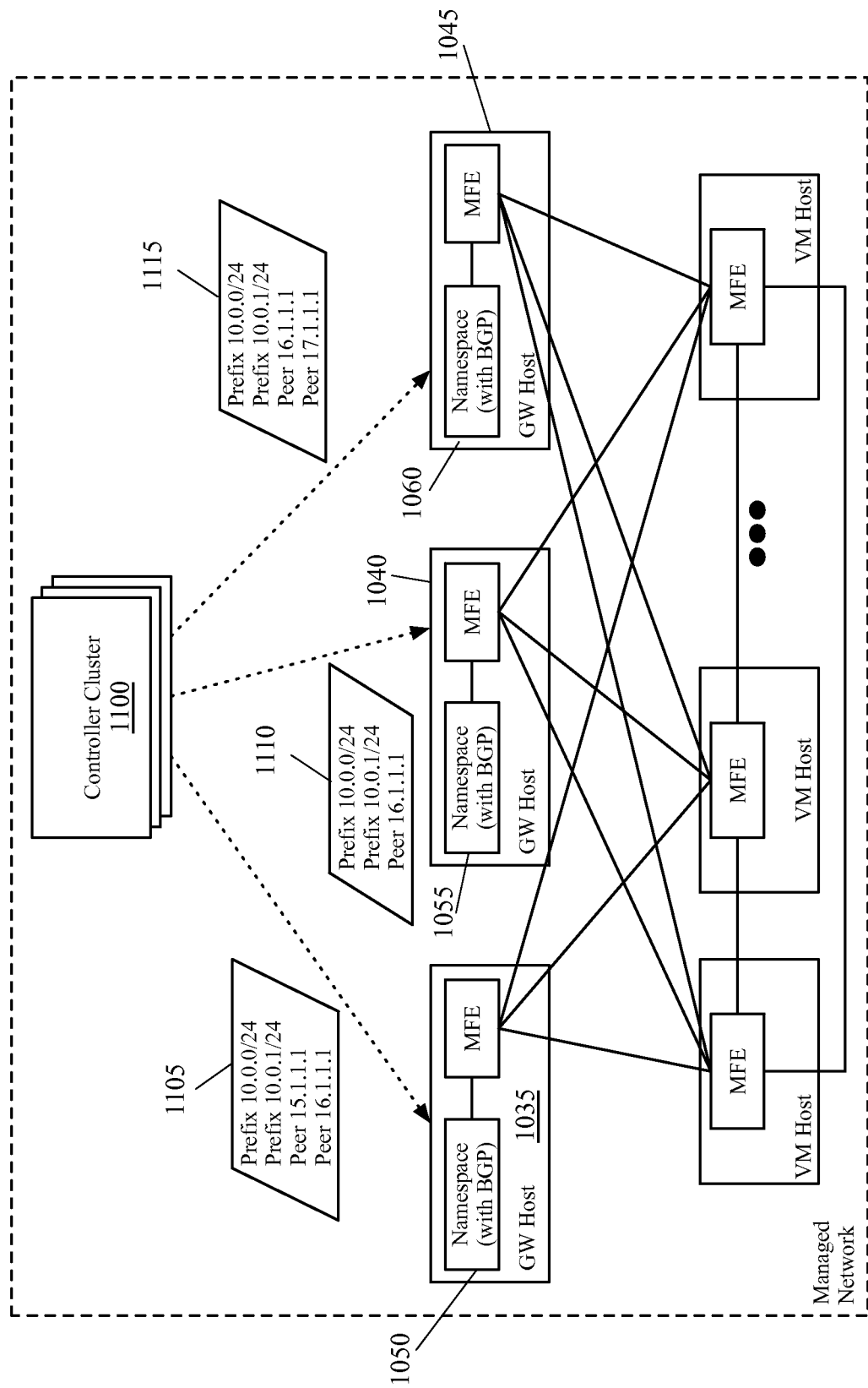
FIG. 11 conceptually illustrates the provisioning of BGP daemons in the three namespaces on the gateway hosts of FIG. 10 by a controller cluster that operates to control the managed network.

FIG. 11 conceptually illustrates the provisioning of the BGP daemons in the three namespaces 1050-1060 on the gateway hosts 1035-1045 by a controller cluster 1100 that operates to control the managed network 1025. The controller cluster 1100, in different embodiments, may be a single controller, a pair or group of controllers operating in a master-standby(s) configuration, or a hierarchy of controllers such as those shown in FIG. 3. As shown, the controller cluster 1100, based on configuration information entered to define the logical network 1000, transmits BGP configuration data to the three gateway hosts 1035-1045 in order to provision the BGP daemons operating in the namespaces on those hosts. Among other information, the BGP configuration data includes the prefixes to advertise (which are the same for each of the gateways) and the list of BGP neighbors (peer routers).

In this example, the controller cluster sends data 1105 to the first gateway host 1035 indicating the prefixes 10.0.0/24 and 10.0.1/24 and two BGP neighbors 15.1.1.1 and 16.1.1.1 (the IP addresses for the two routers with which this gateway interfaces). The controller cluster sends data 1110 to the second gateway host 1040 indicating the same two prefixes and only one BGP neighbor 16.1.1.1. Lastly, the controller cluster sends data 1115 to the third gateway host 1045 indicating the same two prefixes and two BGP neighbors 16.1.1.1 and 17.1.1.1. In some embodiments, the controller cluster transmits this data in the same format as other non-flow entry configuration data for the gateway (e.g., as data tuples transmitted using the OVSDB protocol). The BGP configuration data sent from the controller may also include other data such as the autonomous system number (which will be the same across the gateways), router identification info for the gateways, and additional information about the peer routers (e.g., the autonomous system numbers of the peers).

After receiving the configuration data from the controller cluster 1100, applications (e.g., daemons running in the virtualization software) on each of the gateway hosts 1035-1045 configure the BGP daemons operating on their respective namespaces (e.g., by generating a configuration file for the BGP daemon). The BGP daemons then begin operations, and attempt to set up connections with their identified peer external routers. For example, the BGP daemon in the namespace 1050 establishes two separate TCP connections with the routers 1065 and 1070, then further establishes BGP sessions with these routers by sending BGP Open and keep-alive messages. If such messages are also received from these routers, then the BGP daemon can send out Update packets to the peer routers.

Figure 12:
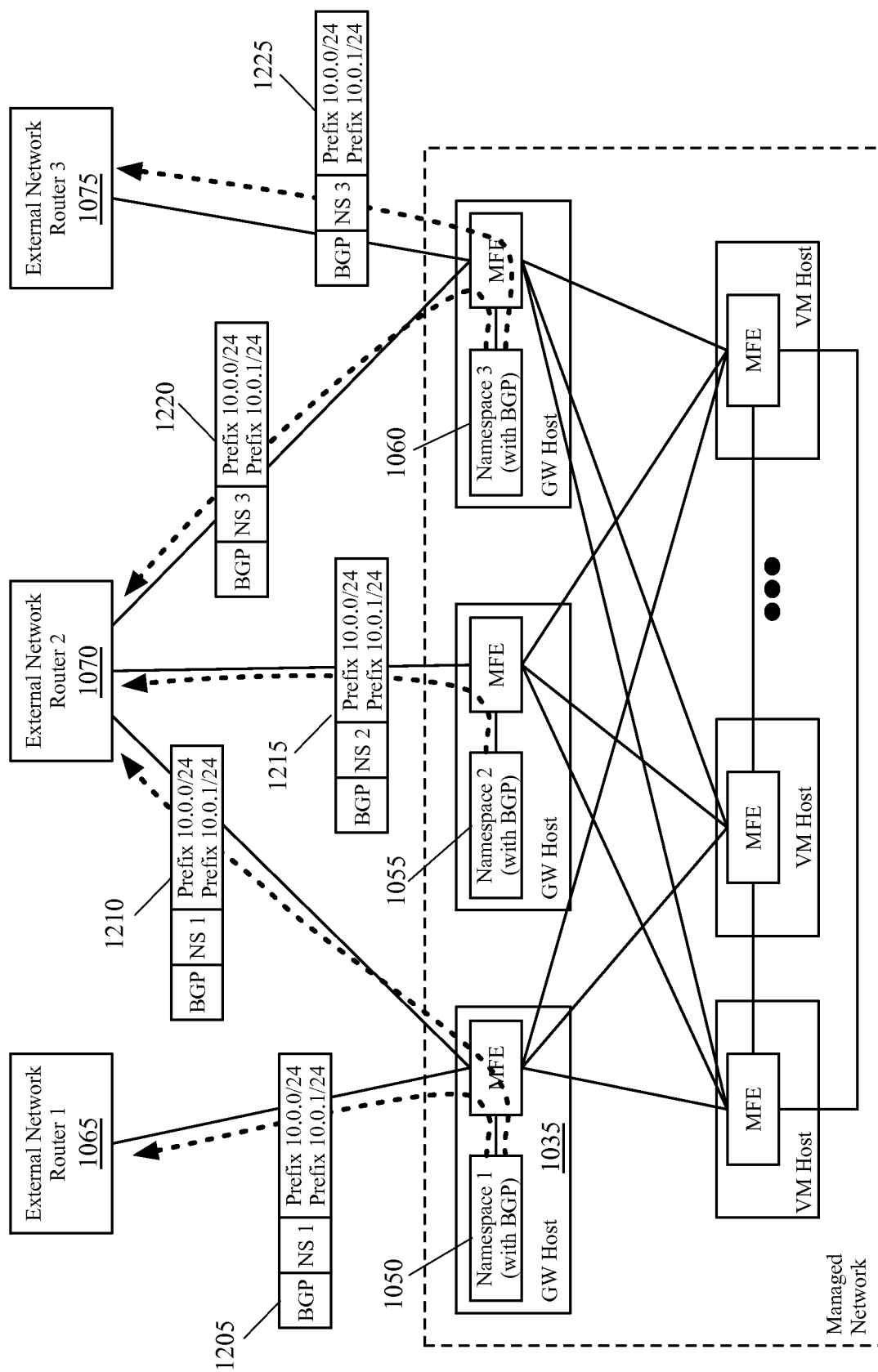
FIG. 12 conceptually illustrates the BGP Update packets sent by BGP daemons in the namespaces according to some embodiments.

FIG. 12 conceptually illustrates the BGP Update packets sent by BGP daemons in the namespaces 1050-1060 according to some embodiments. These packets, in some embodiments, identify themselves as BGP Update packets (i.e., in the BGP header), identify the source router, and identify reachability information for various prefixes. This reachability information, in some embodiments, identifies (i) a prefix in CIDR format and (ii) an ordered set of autonomous systems through which packets will pass in order to reach an IP address in the subnet defined by the prefix if sent to the source of the Update packet. For instance, in a typical physical network, a router might identify a prefix 192.10.10.0/24 that is reachable through autonomous systems 15, 8, 6 (with the sending router located in autonomous system 15).

In most cases of L3 gateways for a logical network, all of the routes to VMs attached to the logical switches will only have a single autonomous system in their reachability information, that to which the gateway belongs. In general, either each logical network is a single autonomous system, or the managed network as a whole is a single autonomous system. In some cases, however, the advertised routes could have more than one autonomous system (e.g., if the managed network is divided into multiple autonomous systems through which packets pass in order to reach the logical switches).

As shown, the namespace 1050 sends two Update packets 1205 and 1210 to the routers 1065 and 1070 respectively. The namespace 1050 sends each of these packets through its local MFE, which includes bridges to the NIC(s) of the gateway host 1035. Each of these packets is the same (except for the destination router information), indicating the two prefixes 10.0.0/24 and 10.0.1/24 and the sending namespace information. The namespace 1055 sends a single packet 1215 to the router 1070, indicating the same prefix reachability data but with different self-identification information. Finally, the third namespace 1060 sends two packets 1220 and 1225 to routers 1070 and 1075, also identifying the same two prefixes with equivalent reachability information, with its own self-identification information.

As a result of receiving these Update packets, the external routers 1065-1075 update their own routing tables. In some embodiments, the routers add the learned routes to their Routing Information Base (RIB), and then recompute routes to the identified destinations to use in the Forwarding Information Base (FIB). In some embodiments, the RIB includes all routes that the router has learned (via connection, manual input of routes, or dynamic routing protocols such as BGP), while the FIB includes the routes that the router will actually use to forward packets.

The routers 1065 and 1075 only have a single way to reach the prefixes 10.0.0/24 and 10.0.1/24—through L3 gateways on the hosts 1035 and 1045 respectively. However, the router 1070 receives route advertisement from the namespaces on all three gateway hosts 1035-1045, each indicating themselves as possible next hops to reach these prefixes. In general, when confronted with multiple routes in the RIB to reach a particular destination IP address or range of addresses, one of the physical routers determines which of the routes is optimal (e.g., based on the number of autonomous systems traversed, or other data) and selects the most optimal route to use in the FIB. In this case, though, the three possible routes presented to the router 1070 for 10.0.0/24 are equivalent. In some embodiments, the router 1070 simply chooses one of these routes for its FIB. If the router 1070 is capable of equal-cost multi-path (ECMP) forwarding, however, then the router adds all three of the routes (i.e., to the namespaces 1050-1060) to its FIB as equal-cost options. This enables the spreading of traffic across the three gateways, preventing any of them from becoming a single bottleneck for incoming traffic.

Figure 13:
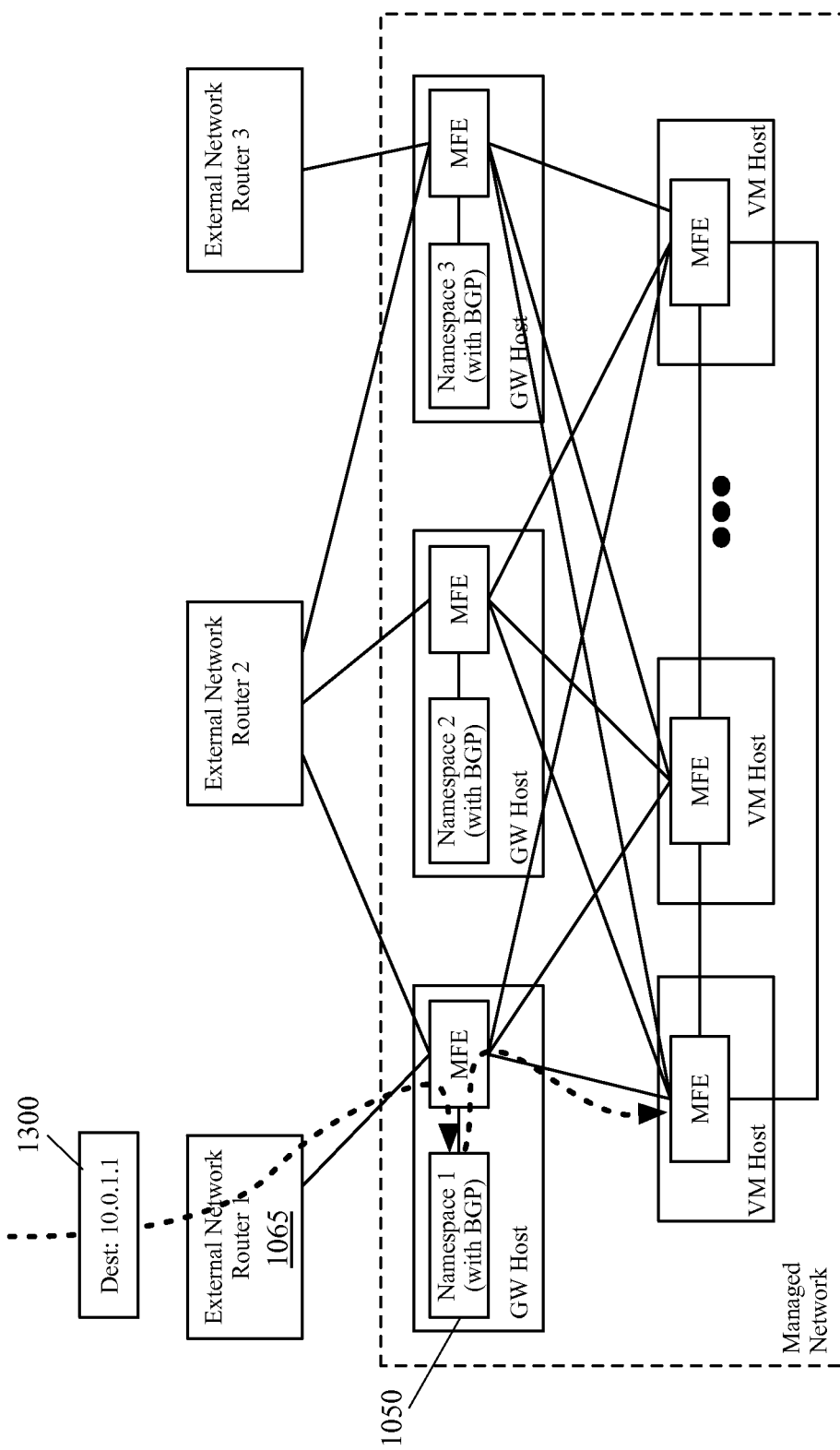
FIGS. 13 and 14 conceptually illustrate the path taken by traffic ingressing into the managed network of FIG. 10.
Figure 14:
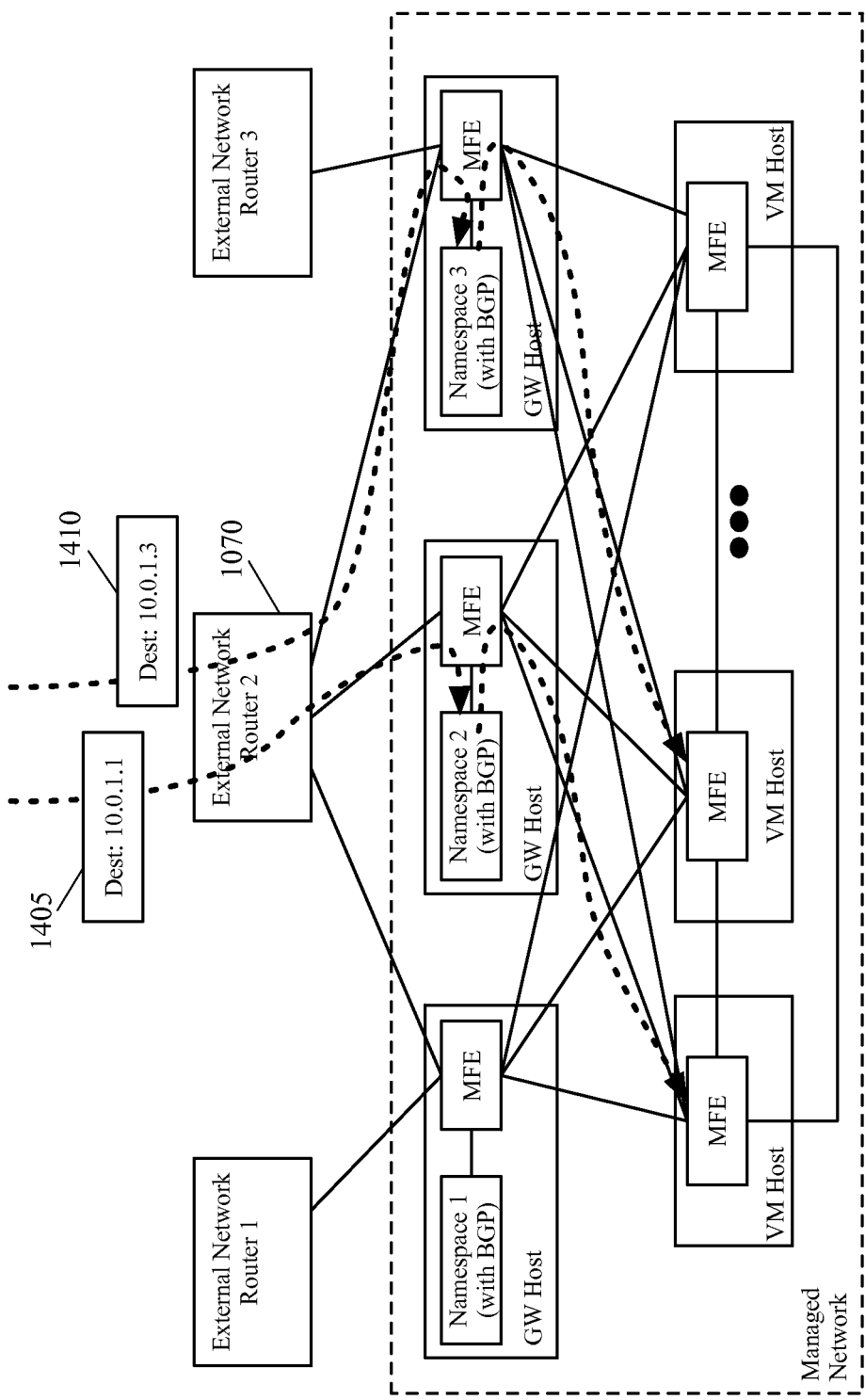

FIGS. 13 and 14 conceptually illustrate the path taken by traffic ingressing into the managed network 1025. First, FIG. 13 illustrates the path taken by a packet 1300 sent from an external source to a VM in the managed network with a destination IP address of 10.0.1.1. In this figure, the path taken by the packet 1300 is shown as the thick dashed line. The packet arrives at the external router 1065, which consults its forwarding information base. Based on the Update packet 1205 received by the router 1065, its FIB indicates that packets with destination IP addresses in the range 10.0.1/24 should be sent to the namespace 1050. Accordingly, the external router 1065 forwards the packet to the gateway host 1035.

The packet arrives at the MFE on the gateway host 1035, which forwards the packet to the namespace 1050 which serves as a gateway for the particular logical network. In some embodiments, the external router 1065 would have previously sent an ARP request to the gateway host 1050 requesting a MAC address for 10.0.1.1, and the namespace 1050 would have responded with its MAC address. As such, the packet 1300 is addressed to the MAC address of the namespace 1050, which enables the MFE to forward the packet to this destination.

The namespace 1050 receives the packet, processes it through its IP network stack (including its routing table), and returns the packet to the MFE through a different interface with the MFE. In some embodiments, the processing pipeline in the namespace may include some or all of network address translation, firewall processing, and routing. Some embodiments, however, do not allow stateful services such as network address translation to be performed on the gateways for distributed logical routers with multiple gateways, due to the difficulty of state sharing. The routing performed by the namespace, in some embodiments, maps the destination IP address to a destination MAC address of the logical router port to which the gateway attaches, in some embodiments. In other embodiments, the routing maps the destination IP address to the destination MAC address of the VM or other entity to which the packet is being sent. When the MFE receives the packet through a different interface, this enables the MFE to treat the packet as entering the logical router, at which point the MFE can perform logical processing to identify the logical egress port of a logical switch for the packet, and send the packet to the appropriate one of the VM hosts 1030.

FIG. 14 illustrates two packets 1405 and 1410 sent from the external network to VMs with IP addresses 10.0.1.1 and 10.0.1.3, respectively, through router 1070. In this case, both of these packets 1405 are forwarded by the same entry in the FIB of the router 1070, but to different gateways in the managed network 1025. When the external router 1070 receives the packet 1405, the FIB entry indicates for the router to use an ECMP technique to choose one of the three equal cost destinations 1050-1060. The router 1070, in some embodiments, hashes a set of the packet properties in order to determine to which of the destinations to send the packet. For instance, some embodiments use the source and destination IP addresses, while other embodiments use source and/or destination MAC addresses, the transport connection 5-tuple (source IP address, destination IP address, transport protocol, source transport port number, and destination transport port number), or other combinations of packet properties. In order to determine how to correlate a hash result to a particular one of the equal-cost destinations, some embodiments simply calculate the hash modulo the number of listed destinations. Other embodiments use algorithms such as consistent hashing or highest random weight, that modify the destination for less of the traffic when a gateway is added or removed from the list of equal-cost destinations than would a simple modulo N algorithm.

Irrespective of the algorithm used (some embodiments may not even use a hash function, but instead use other load balancing techniques), the advertisement of the same routes by several active L3 gateways for a logical router to the same external physical router allows for that physical router to use its ECMP techniques to spread traffic among these several gateways. Thus, in this case, the router 1070 sends the first packet 1405 to the namespace 1055 and the second packet 1410 to the namespace 1060, even though these packets are governed by the same forwarding entry in the router.

The previous example shown in FIGS. 10-14 illustrates an example of a single logical network being implemented in a managed network 1025. The example of FIGS. 15-18 conceptually illustrates two logical networks implemented in a set of gateways. In this case, the top half of FIG. 15 illustrates the architecture of a first logical network 1500 and a second logical network 1525. These logical networks have similar architectures, with the first logical network 1500 including a logical router 1515 that connects two logical switches 1505 and 1510 to each other and to an external network 1520. The first logical switch 1505 includes IP addresses in the range 10.0.0/24 and the second logical switch 1510 includes IP addresses in the range 10.0.1/24. The logical router 1515 includes four ports that connect to the external network 1520. The second logical network 1525 includes a logical router 1540 that connects two logical switches 1530 and 1535 to each other and to the external network 1520. The first logical switch 1530 includes IP addresses in the range 11.0.0/24 and the second logical switch 1535 includes IP addresses in the range 11.0.1/24. The logical router 1540 includes three ports that connect to the external network 1520. The first and second logical networks 1500 and 1525 belong to different tenants, in this case.

The bottom portion of FIG. 15 illustrates the physical implementation of these networks in a managed network 1550, which is similar to the physical implementation of the logical network 1000 shown in FIG. 10. For simplicity, the VM hosts 1545 are collectively represented as a single box in this diagram. While the figure indicates a single tunnel between each MFE in a gateway host and the VM hosts 1545, one of ordinary skill will recognize that in some embodiments each of the gateway hosts has numerous separate tunnels to the separate machines hosting VMs of the logical networks.

The portion of the managed network 1550 that implements these two logical networks 1500 and 1525 includes four gateway hosts 1555-1570. On three of these gateway hosts 1555, 1560, and 1570, namespaces implementing logical ports for both the logical router 1515 and the logical router 1540 operate. That is, the gateway host 1555 hosts both a namespace 1557 implementing a first connection to the external network for the logical router 1515 and a namespace 1559 implementing a first connection to the external network for the logical router 1540. The gateway host 1560 hosts both a namespace 1562 implementing a second connection to the external network for the logical router 1515 and a namespace 1564 implementing a second connection to the external network for the logical router 1540. The gateway host 1570 hosts both a namespace 1572 implementing a third connection to the external network for the logical router 1515 and a namespace 1574 implementing a third connection to the external network for the logical router 1540. Finally, the gateway host 1565 only hosts a single namespace 1567 (at least when considering the implementation of these two logical networks—the gateway host may have namespaces for other logical networks not shown) implementing a fourth connection to the external network for the logical router 1515. Thus, different logical routers may have different numbers of ports facing external networks, as determined by administrator configuration in some embodiments. In addition, each of the gateway hosts 1555-1570 connects to only a single external physical router 1575.

Figure 16:
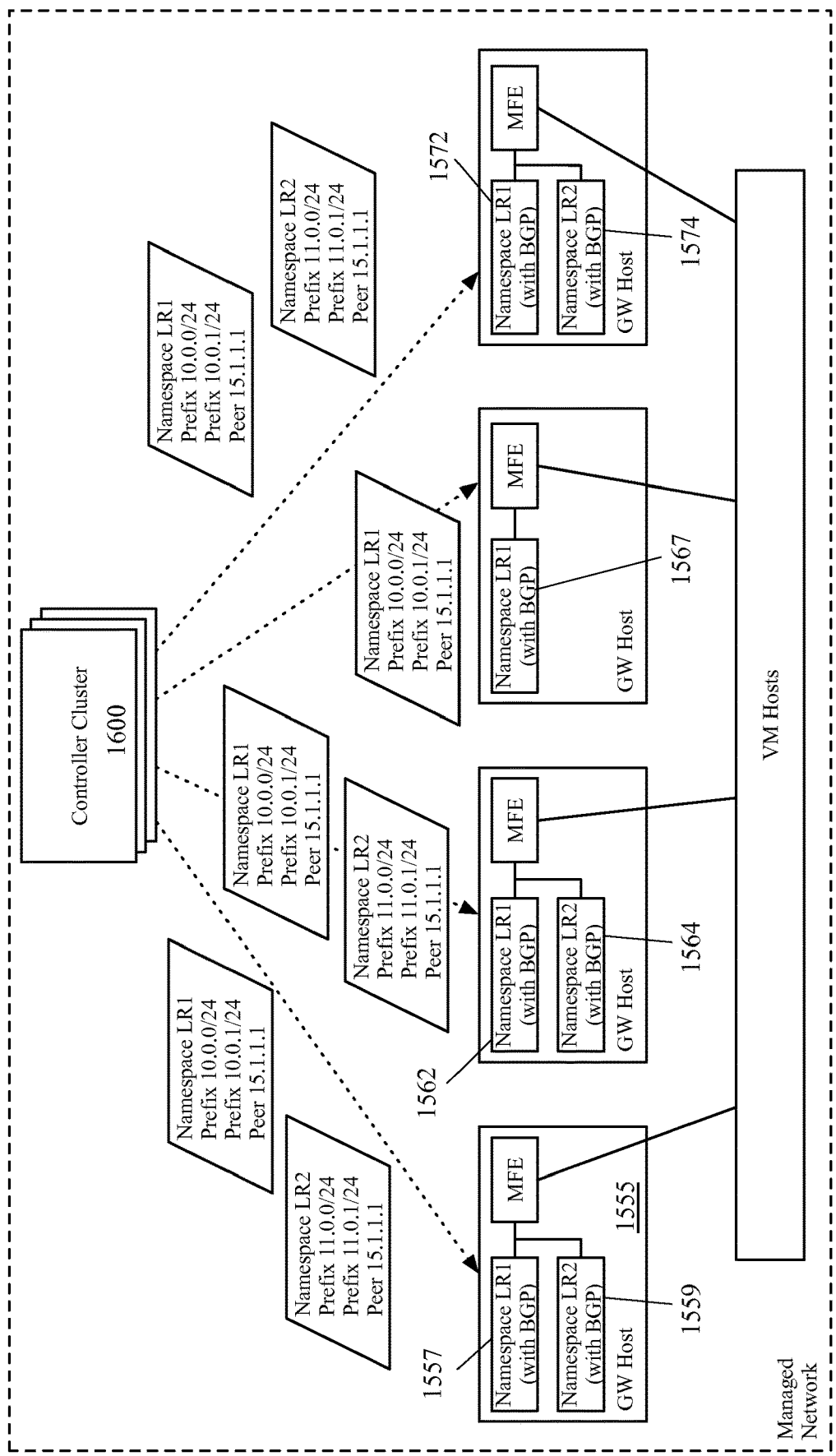
FIG. 16 illustrates the provisioning of BGP daemons in seven namespaces of FIG. 15 by a controller cluster.

FIG. 16 illustrates the provisioning of the BGP daemons in the seven namespaces 1557-1574 by a controller cluster 1600, similar to the provisioning shown in FIG. 11. In this case, however, the controller cluster generates BGP configuration data for namespaces implementing connections for both of the logical routers 1515 and 1540. In some embodiments that use a hierarchical network of controllers such as that shown in FIG. 3, the controller cluster 1600 includes two different logical controllers that generate the BGP configuration for the two different logical routers. These two different logical controllers would then both send the generated configuration data to the same set of physical controllers for distribution to the gateway hosts. A physical controller that manages the gateway host 1555 would receive data from both of the logical controllers to distribute to the gateway host 1555.

Even if the same controller generates the data for both BGP configurations, in some embodiments the controller distributes this data in separate transactions. Thus, the gateway host 1555 receives data defining the namespace 1557 and its BGP configuration separate from the data defining the namespace 1559 and its BGP configuration. As shown, these configurations may specify the same neighbor router, but different prefixes to advertise. In some embodiments, the BGP neighbors are stored as global information on the gateway host, for use by all of the BGP daemons running in the various namespaces on the host. That is, each external router to which a gateway host has a connection will be a peer for all instances of BGP operating on the gateway host. In other embodiments, the peering is determined on a per-namespace (per-L3 gateway) level, and some BGP daemons on a particular host will peer with a router while others do not.

Figure 17:
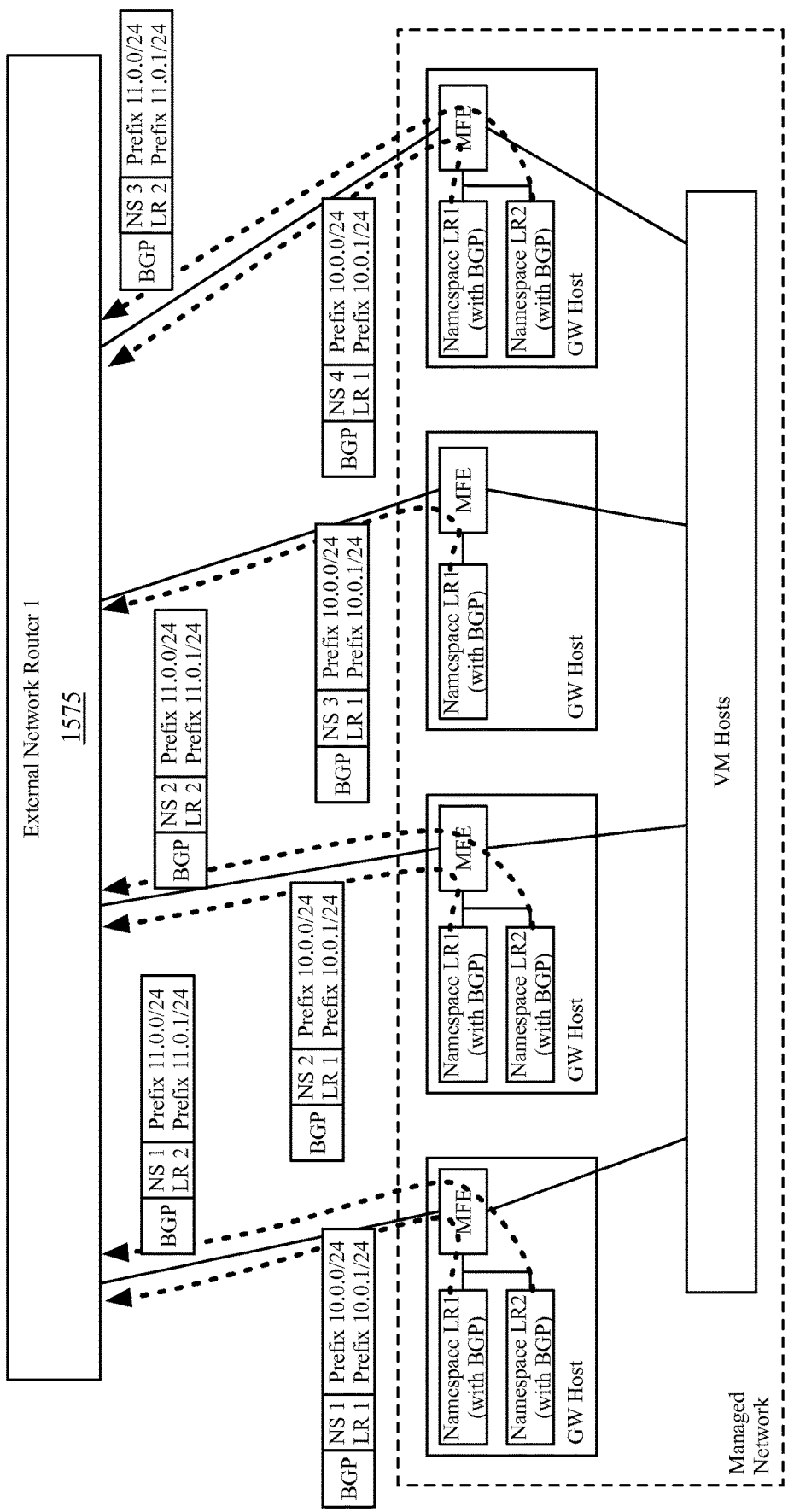
FIG. 17 conceptually illustrates the BGP Update packets sent by the various BGP daemons of FIG. 15 to an external router, once the daemons running in the various namespaces have established adjacencies with the router.

FIG. 17 conceptually illustrates the BGP Update packets sent by the various BGP daemons to the external router 1575, once the daemons running in the various namespaces have established adjacencies with the router. These packets are similar to those described above by reference to FIG. 12. As a result, the router 1575 will have four equal-cost options for packets sent to IP addresses in the ranges 10.0.0/24 and 10.0.1/24, and three equal-cost options for packets sent to IP addresses in the ranges 11.0.0/24 and 11.0.1/24.

Figure 18:
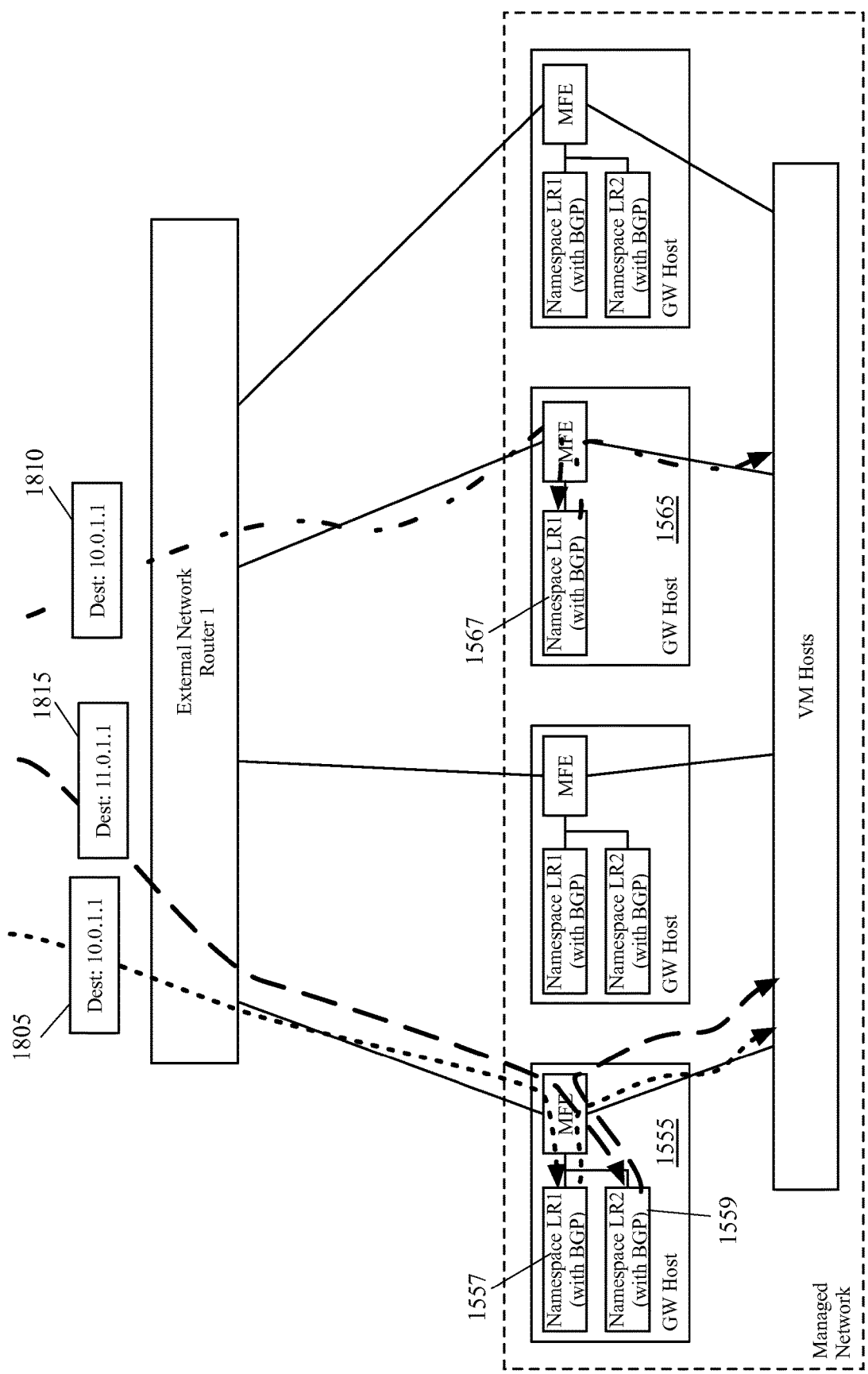
FIG. 18 conceptually illustrate the paths taken by three packets ingressing into the managed network of FIG. 15.

FIG. 18 conceptually illustrate the paths taken by three packets ingressing into the managed network 1550. A first packet 1805 and a second packet 1810 both have a destination IP address of 10.0.1.1. However, while having the same destination, these packets may have different additional properties (e.g., source IP address, source and destination transport port numbers, transport protocols, etc.). As such, using its ECMP algorithm, the router 1575 sends the packets to different namespaces (the path of the packets is indicated by different types of dashed/dotted lines). The router 1575 sends the first packet 1805 to the namespace 1557 in the gateway host 1555, while sending the second packet 1810 to the namespace 1567 in the gateway host 1565. Thus, even packets sent to the same IP address may be routed differently into the network. However, some embodiments require that the external router use an algorithm that routes packets from the same transport connection to the same one of the gateways. Using a calculation based on either the source/destination IP addresses, or the connection 5-tuple serves this purpose.

In addition to the packet 1805 sent to the gateway host 1555, the external router 1575 also sends a packet 1815 with a destination IP address of 11.0.1.1 to this gateway host. This third packet 1815 is sent by the MFE at the gateway host 1555 to the other namespace 1559, which routes the packet back to the MFE for logical first-hop processing. The MFE, in some embodiments, differentiates between the packets by destination MAC address, as described above.

This section refers to several packets of different types. The term "packet" is used here as well as throughout this application to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

V. Controller as Route Server

The above sections describe a network control system in which the network controller generates the BGP configuration for a logical router implementation, then sends that configuration to a gateway that performs both the ingress and egress routing for the network as well as the route advertisement to one or more routers in the external network. In some embodiments, however, the controller or controller cluster has a direct connection to the external router, and acts as a route server. That is, in addition to generating configuration data in order for the managed network to implement a logical network (e.g., BGP configuration data, routing table for L3 gateways, flow entries for the MFEs, etc.), the controller advertises routes to one or more routers in the external networks, thereby preventing this traffic from taking up bandwidth in the data path of the gateway MFEs.

The controller of some embodiments sends BGP updates to the external routers that, rather than identifying the source of the packet as the next hop for advertised prefixes, instead identify one of the namespaces implementing a L3 gateway as the next hop. In addition, in some embodiments, the controller receives BGP packets from the routers, which it can use to supplement the routing table for one or more logical routers.

Figure 19:
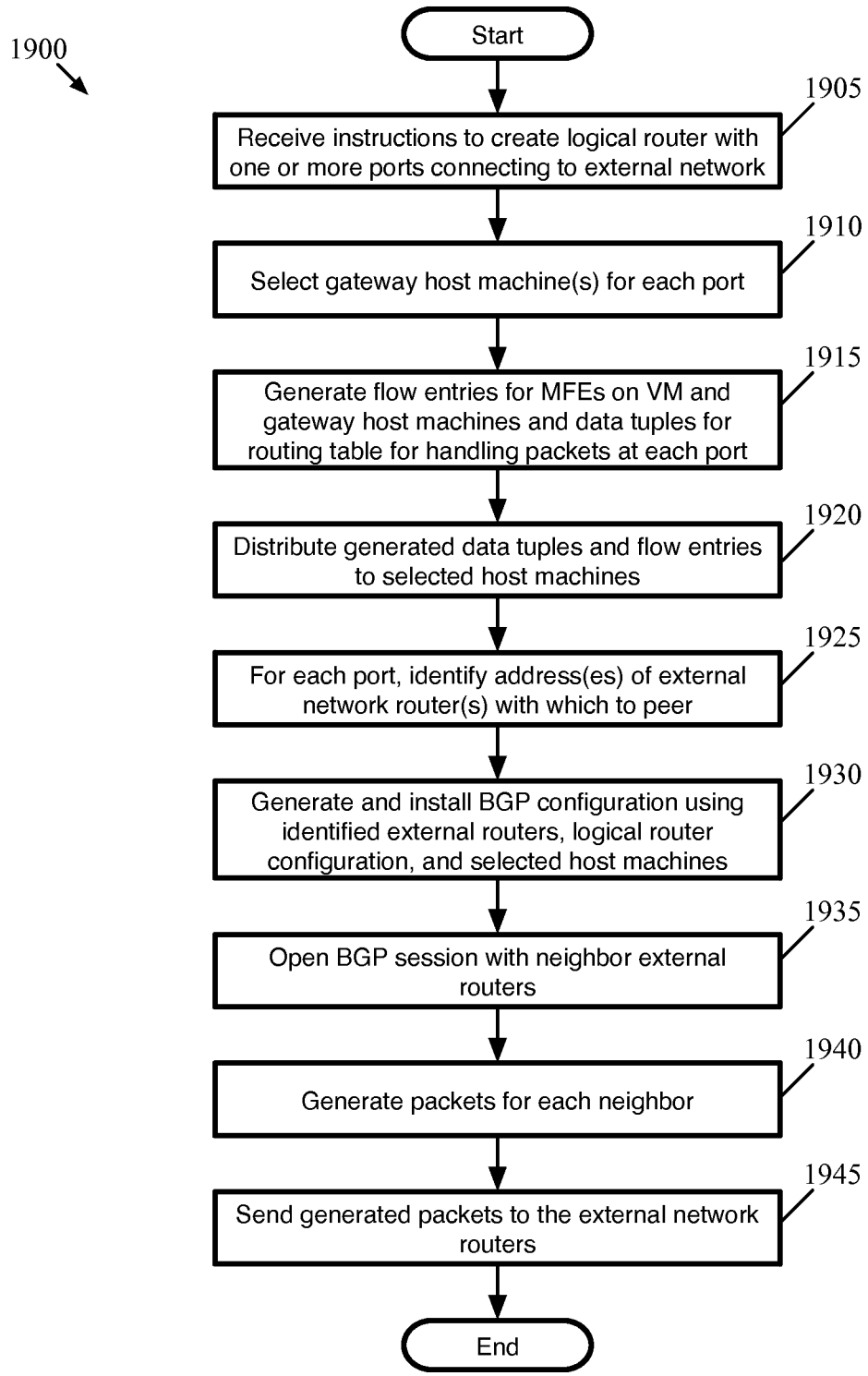
FIG. 19 conceptually illustrates a process of some embodiments for generating BGP configuration data for a logical network and then implementing that configuration data by a BGP service in the controller that generated the data.

FIG. 19 conceptually illustrates a process 1900 of some embodiments for generating BGP configuration data for a logical network and then implementing that configuration data by a BGP service in the controller that generated the data. In some embodiments, portions of the process 1900 are performed by a table mapping engine and/or route generation engine within a controller, while other portions of the process are performed by a BGP application within the controller. The controller generates the BGP configuration, but then provides it to a module running internally, rather than distributing the configuration to a gateway host that runs a BGP daemon.

As shown, the process 1900 begins by receiving (at 1905) instructions to create a logical router with one or more ports connecting to an external network. These instructions may be the result of a network administrator designing a logical network (e.g., through a cloud management application that passes the logical network configuration through controller APIs) that includes the logical router. In some embodiments, the instructions to create the logical router specifically indicate that the connections to the external network should be implemented using BGP, or another protocol, for router peering and route advertisement. In other embodiments, this capability is automatically enabled for all logical routers with at least one connection to the external network.

Next, the process selects (at 1910) gateway host machines for each of the ports that connect to the logical network. Some embodiments assign each port to a different gateway host, while other embodiments allow multiple ports (and therefore multiple namespaces hosting routing tables) to be created on a single gateway host. In some embodiments, the gateway hosts are arranged in terms of clusters, or failure domains. These clusters, in some embodiments, may be sets of host machines that are physically located together in the managed network, and therefore more likely to all fail together (e.g., due to a top of rack switch failing, power issues, etc.). Different embodiments may assign gateways to host machines differently respective to the clusters. For instance, some embodiments assign only one gateway per cluster for a particular logical router, while other embodiments assign all gateways for a logical router to the same cluster. Yet other embodiments may assign gateways to several different clusters, but allow two or more gateways within a single cluster.

Furthermore, in some embodiments, the gateway host machines may be assigned to different groups based on the functions for which those gateway hosts are used. For example, within a physical managed network, some embodiments use a first group of gateway hosts for providing logical services (e.g., DHCP, metadata proxy) and a second group of gateway hosts for L3 gateways. Each group may span several clusters of gateway hosts, thereby allowing for the process to select gateway host machines within the second group from several clusters (i.e., failure domains).

Some embodiments allow the administrator to specify the cluster to which the controller assigns each logical port of the logical router, and the controller handles selection of the actual gateway host within that cluster. Thus, the administrator might specify to have two logical ports assigned to gateways in a first cluster, four in a second cluster, and two more in a third cluster. The controller then assigns each logical port to a specific gateway host in its selected cluster. For this assignment, some embodiments use a load balancing technique, such as calculating a hash function of a property of the logical router or port (e.g., a UUID assigned by the controller) modulo the number of gateway hosts in the cluster. This assigns the logical router ports to gateway hosts within the cluster effectively at random (even though the algorithm itself is deterministic), and therefore load balances the L3 gateways across the gateway hosts over the long run.

Some other embodiments may use other techniques to load balance the L3 gateways across the hosts in a cluster. For instance, rather than using the hash algorithm to choose between all gateway hosts in a cluster, some embodiments choose between only those gateways with the fewest number of logical routers currently operating, and modulo the result of the hash function by this smaller number of gateways. Other embodiments analyze the number of logical routers on each gateway and the operational load of the gateways (e.g., based on number of packets processed over a particular timeframe) in order to determine to which gateway host a particular logical router should be assigned.

Next, the process 1900 generates (at 1915) flow entries for the MFEs on both the VM hosts and selected gateway host machines in order to implement the logical router in a distributed fashion and forward packets within the managed network as well as handle packets entering and exiting the network, and generates data tuples for the routing table for handling packets in L3 gateways implementing each logical port that connects to the external network. These various flow entries and routing table data tuples are described in detail above by reference to, e.g., FIG. 5.

The process then distributes (at 1920) the generated data tuples and/or flow entries to the various host machines. In some embodiments, the two types of data (flow entries and routing table data tuples) are distributed via different protocols. Some embodiments distribute the flow entries to both the VM hosts and the gateway hosts via a first protocol such as OpenFlow, while distributing the routing table data tuples to the gateway hosts via a second protocol such as OVSDB. The OVSDB protocol used in some embodiments also carries configuration information for the MFEs (for both the VM hosts and the gateway hosts).

In addition to generating and distributing the data for provisioning the forwarding of packets within the network, the controller of some embodiments is responsible for generating a routing protocol (e.g., BGP) configuration and handling the exchange of routing information with external routers. As such, the process 1900 identifies (at 1925) the addresses (and other information) of the external network router(s) with which to peer for each logical port (i.e., each L3 gateway) that connects to the external network. In some embodiments, the administrator inputs this data for each logical port, and handles ensuring that the external routers are correctly connected to the gateway hosts (or, e.g., a top of rack switch to which the gateway hosts connect). In other embodiments, the network controller automatically determines the set of external routers to which each of the gateway hosts is connected based on its stored network state information, and uses these as the external network routers with which to peer the L3 gateway. In some route server embodiments, the administrator also ensures that the controller is able to connect with the external routers. In various different embodiments, the controller(s) connect to the routers via a direct connection, through other machines in the managed network (e.g., gateways or other host machines), etc.

With the external routers identified for each logical port, the process generates and installs (at 1930) a BGP configuration on the controller using the identified external routers, the logical network configuration, and the selected host machines. In some embodiments, the controller instantiates a separate BGP process for each L3 gateway for which it acts as a route server. Thus, if the logical router is defined with three ports facing the external network, then the controller instantiates three BGP processes (e.g., the BGP daemon described above, or a different BGP application) for advertising routes for each of the three gateways. In other embodiments, the controller instantiates a single BGP process that performs route advertisement for all of the gateways implementing ports for the logical router. In some such embodiments, a single BGP process handles route advertisement for all logical routers managed by the controller (e.g., for multiple different logical networks).

To generate the BGP configuration for the particular logical router, the controller (e.g., the table mapping engine in the controller) identifies the CIDR prefixes for the logical switches that attach to the logical router, as these are the prefixes that the controller as route server will advertise to the external routers (which will be the same for each gateway). In addition, the controller uses the selections of gateway host machines for the BGP configuration, and information generated for the namespace that will run on the gateway host machine. The BGP process on the controller will send out packets advertising these namespaces (rather than itself) as the actual next hop(s) for the advertised routes, and therefore must be able to provide the requisite data about the namespaces (e.g., the autonomous system number, the router identifier, etc.). Furthermore, the configuration requires an identification of the external routers with which to exchange route information for each namespace. In some cases, the namespace to external router connections might be similar to those in FIG. 10 (i.e., with different L3 gateways for the logical router connecting to different sets of external routers), in which case the controller cannot simply advertise the same set of next hop destinations to each external router. Instead, the controller stores the list of neighbors for each next hop L3 gateway, such that it can send packets to each of these neighbors advertising the particular L3 gateway as a next hop for the routes to the logical network.

In some embodiments, the controller generates a configuration file, or several configuration files, for the BGP instance(s). These configuration files may be similar to the files generated by the namespace daemon described above. The controller stores the configuration files in a location at which the BGP processes can access the files and load their configuration. At this point, the controller can begin acting as a route server to contact the external routers.

As such, the process 1900 opens (at 1935), or attempts to open, BGP session(s) with the neighbor external routers identified in the configuration. As in the inline model described in the previous section, several BGP sessions are started, each operating as its own independent state machine. For instance, if the logical network includes three ports facing the external network (and thus three gateways), each of which connect to two different external routers, then the controller will initiate six separate BGP sessions in some embodiments. In other embodiments, the controller initiates only one BGP session per external router, and sends Updates that specify the several different next hop options for the routes advertised to the external router. This process 1900 assumes that adjacency is established for each BGP session—if the BGP process fails to open a session with a particular router, then the controller continues attempting to do so in some embodiments before transitioning to operation 1940.

Using the BGP configuration data, the process generates (at 1940) packets for each established BGP session. In some embodiments, these packets are standard BGP Update packets that identify the known reachable prefixes, the next hop destination for those prefixes, and the list of autonomous systems through which a packet will have to pass to reach each prefix. In this case, the controller sending the Update packet is not the next hop—the packet instead identifies one of the L3 gateways as that next hop. For routes to logical switches, the BGP packet advertises the subnet (e.g., 10.1.1/24) and only a single autonomous system number (that to which the L3 gateway belongs), as packets will not have to be sent to any other autonomous systems once reaching the L3 gateway in order to reach the VM hosts.

For each generated packet, the process sends (at 1945) the generated packet out of the controller to the destination physical router. As mentioned above, this connection may be implemented as a direct connection between the controller and the external router, or may travel through portions of the managed network (e.g., gateways, etc. If the BGP process on the controller establishes adjacencies with three different physical routers for three L3 gateway next hops, then the process will send three different BGP Update packets to three different destinations each. Furthermore, the controller might be acting as a route server for several different logical networks, in which case the controller also sends several different Update packets advertising completely different routes.

Figure 20:
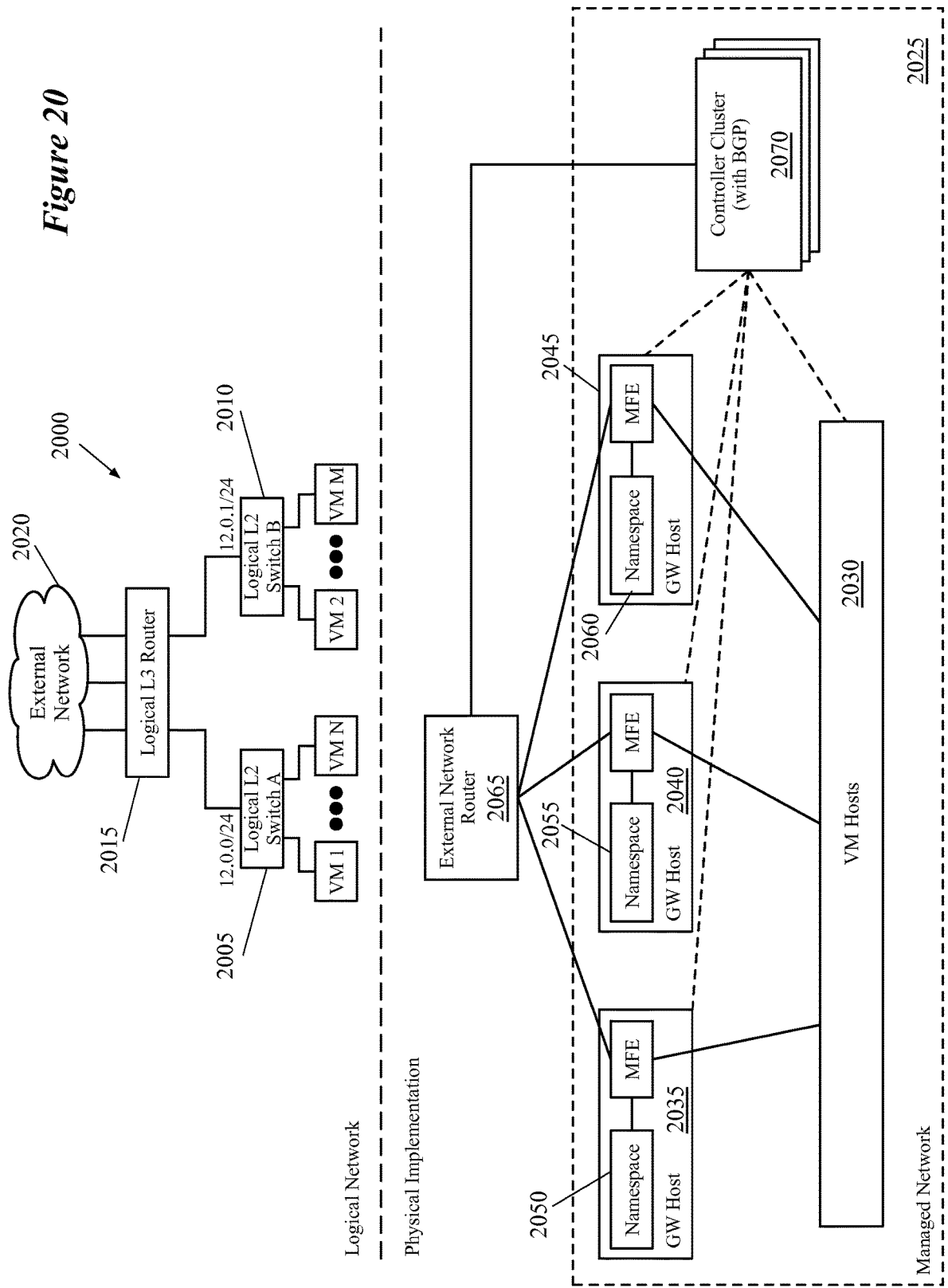
FIG. 20 illustrates both a logical network and the physical implementation of that logical network in a managed network, in which the controller acts as a route server.
Figure 21:
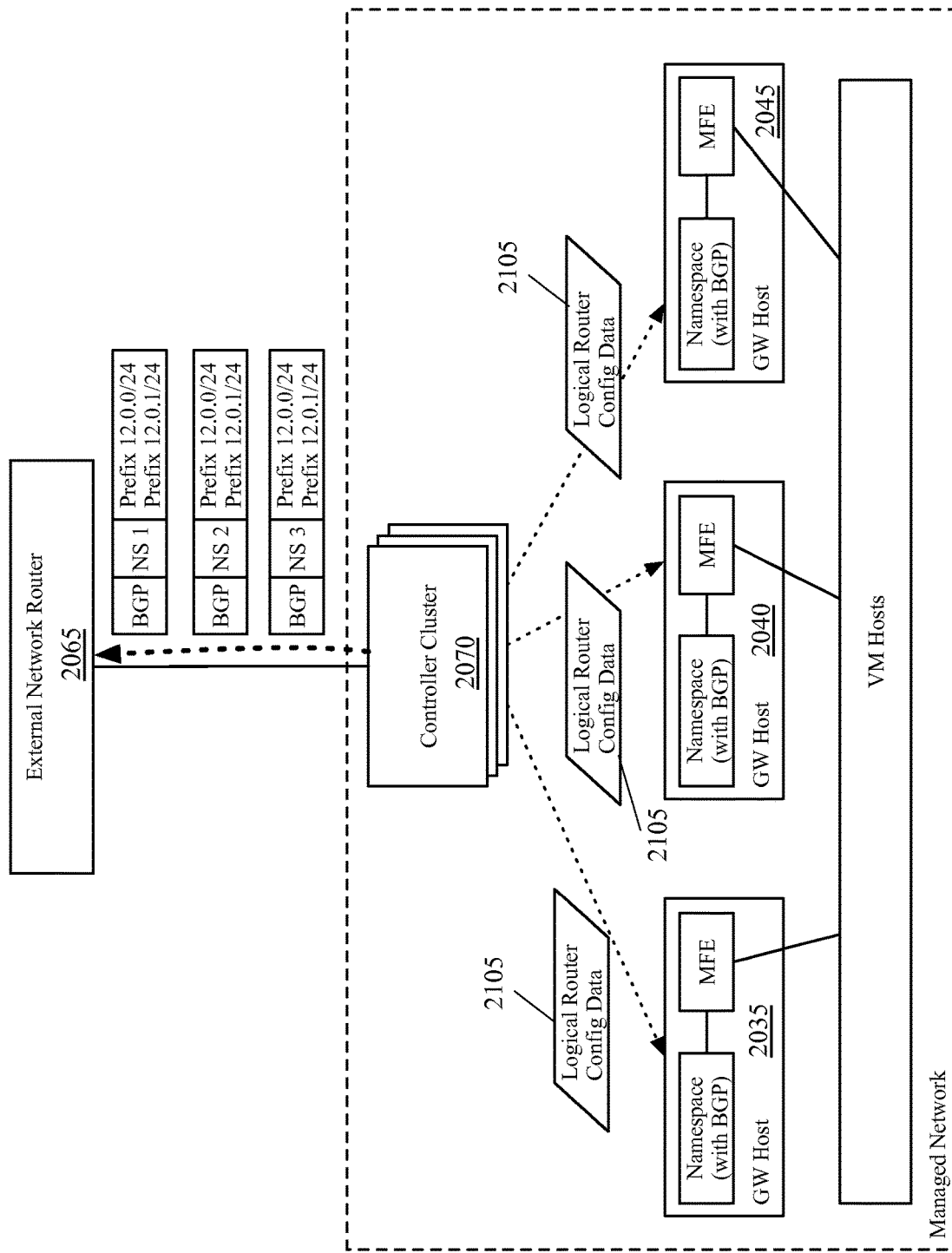
FIG. 21 conceptually illustrates data sent by the controller cluster in order to effectuate a logical router of the logical network of FIG. 20.
Figure 22:
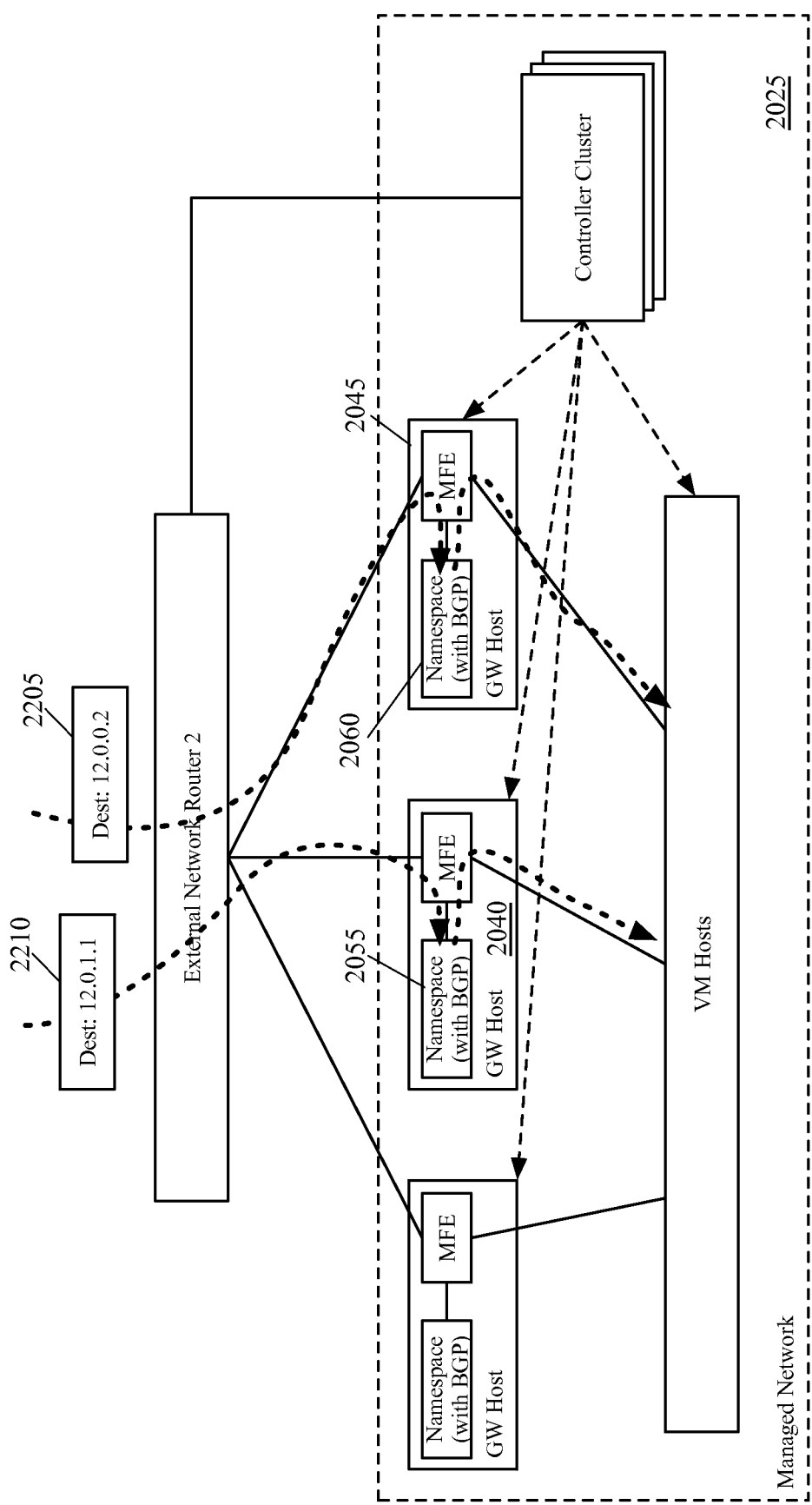
FIG. 22 conceptually illustrates the path taken by several packets entering the managed network of FIG. 20.

FIGS. 20-22 conceptually illustrate an example of the use of a controller as a route server that advertises routes to an external router for a logical network. FIG. 20 illustrates both the logical network 2000 and the physical implementation of that logical network in a managed network 2025. As shown in the top half of the figure, the logical network 2000 is configured similarly to the logical network 1000 of the example in the previous section, with a single logical router 2015 connecting two logical switches 2005 and 2010. The first logical switch 2005 includes IP addresses in the subnet 12.0.0/24, and the second logical switch 2010 includes IP addresses in the subnet 12.0.1/24. In addition, the logical router 2015 includes three ports that connect to an external network 2020, for which route advertisement using a controller as route server is activated.

The bottom portion of FIG. 20 illustrates the physical implementation of the logical network 2000. For simplicity, the VM hosts 2030 are collectively represented as a single box in this diagram, as in FIG. 15 above. The three ports of the logical router 2015 that connect to the external network 2020 are implemented as L3 gateways in namespaces 2050-2060 that operate on gateway hosts 2035-2045, respectively. In this case, the three gateway hosts each connect to the same single external router 2065 in order to transmit and receive packets entering and exiting the logical network.

However, unlike the previous examples, the namespaces 2050-2060 do not operate BGP daemons or any other routing protocol applications, only functioning to process the ingressing and egressing packets. Instead, a controller cluster 2070 operates to (i) provide provisioning data to the host machines 2030-2045 and (ii) operate as a route server to exchange routing information with the external router 2065. In this figure, the dashed lines between the controller cluster 2070 and the host machines 2030-2045 indicates control path connections, while the solid lines (between the gateways 2035-2045 and the router 2065, the gateways 2035-2045 and the VM hosts 2030, and the controller cluster 2070 and the router 2065) indicate data path connections.

FIG. 21 conceptually illustrates some of the control and data path data sent by the controller cluster 2070 in order to effectuate the logical router 2015. As shown, the controller cluster 2070 distributes logical router configuration data 2105 (e.g., as data tuples defining routing tables for the namespaces, as flow entries for the MFEs, etc.) to the gateway hosts 2035-2045. In some embodiments, the controller cluster sends this data in two channels, with the flow entries for the MFE sent via a first protocol (e.g., OpenFlow) and the data tuples defining the namespace and the routing table for the namespace sent via a second protocol (e.g., OVSDB). The controller cluster of some embodiments distributes the logical router configuration data 2105 through a hierarchy of controllers, with a single logical controller generating the data and distributing the data to the various physical controllers that manage and directly provide data to the three gateway hosts 2045.

In addition, the controller cluster 2070 transmits three separate BGP packets to the external network router 2065. Some embodiments establish three separate sessions with the external router 2065 (one for each gateway for which the controller acts as a route server), while other embodiments transmit the three BGP Updates as part of a single session. These BGP packets each (i) advertise the CIDR prefixes 12.0.0/24 and 12.0.1/24, (ii) indicate for each of the prefixes the ordered list of autonomous systems used to reach addresses in the range defined by the prefixes (which will be the single autonomous system for the logical network, in most situations), and (iii) identify the next hop for the advertised prefixes. In some embodiments, only this next hop varies between the three packets, as this identifies the different gateways.

As a result of receiving these three packets, the physical router 2065 updates its routing table to include three possible equal cost next hops for packets in the identified IP address ranges (12.0.0/24 and 12.0.1/24). Assuming the router 2065 has ECMP capabilities, it will spread the traffic for these IP ranges between the three L3 gateways on the hosts 2035-2045. FIG. 22 conceptually illustrates the path taken by several packets 2205 and 2210 entering the managed network 2025. Both of the packets are received by the logical router 2065, and processed by the same forwarding information base entry. This entry states to use an ECMP algorithm to decide among the three possible next hops (L3 gateways) for a packet. As a result, the router sends the first packet 2205 to the namespace 2055 on the gateway host 2040 and the second packet 2210 to the namespace 2060 on the gateway host 2045. The MFEs and namespaces process the packets as described above in the previous section in order to forward the packets to the destination virtual machines.

Figure 23:
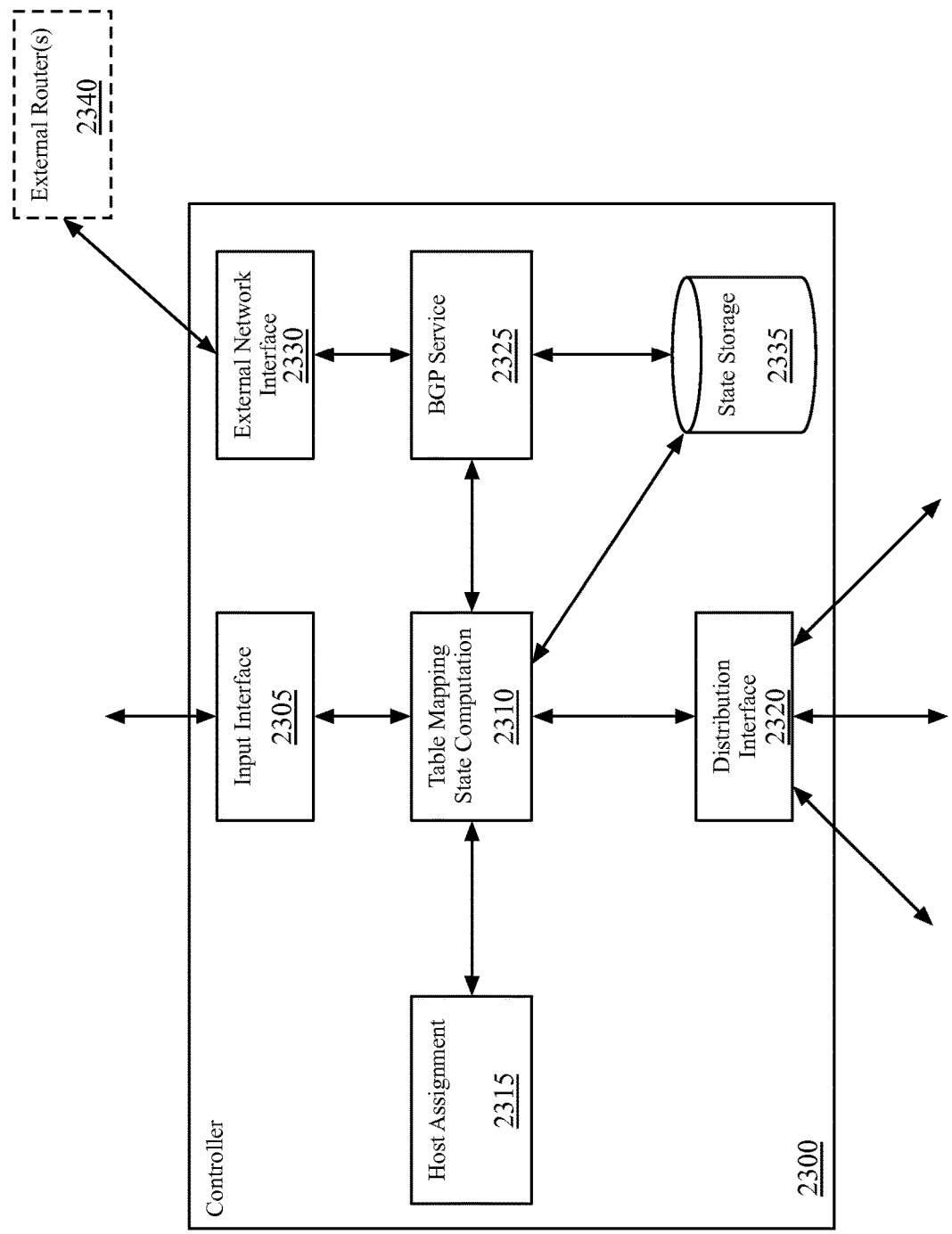
FIG. 23 conceptually illustrates the software architecture of a controller of some embodiments that acts as a route server for a logical network.

FIG. 23 conceptually illustrates the software architecture of a controller 2300 of some embodiments that acts as a route server for a logical network. As shown, the controller 2300 includes an input interface 2305, a table mapping state computation module 2310, a host assignment module 2315, a distribution interface 2320, a BGP service 2325, and an external network interface 2330. In addition, the network controller 2300 includes one or more state storage databases 2335, which in some embodiments stores input and/or output of the table mapping state computation module.

The input interface 2305 of some embodiments receives input from one or more users to define logical networks (e.g., sets of VMs connected through logical switches, logical routers, middleboxes, gateways to external networks, etc.). For example, a user could define a logical network such as that shown in FIG. 20, described above. In some embodiments, the request received at the input interface specifies the logical ports in terms of source and destination MAC addresses entered (or selected) by the user.

When the input interface 2305 receives a specification of a logical network, the interface of some embodiments translates this specification into logical control plane data that defines the logical network, and passes this data to the table mapping state computation module 2310. In some embodiments, the input interface 2305 reads this logical control plane data into input tables of the state computation module 2310. The table mapping state computation module 2310 of some embodiments includes a table mapping engine with a set of input tables and output tables, and maps records in the input tables to records in the output tables according to a set of rules. More specifically, some embodiments translate logical control plane data into logical forwarding plane data and subsequently translate the logical forwarding plane data into universal or customized physical control plane data that can be passed down to the MFEs that implement the logical network. The table mapping state computation module 2310 of some embodiments uses n Log, and is described in greater detail in U.S. Publication 2013/0058228, which is incorporated herein by reference.

In addition to generating the physical control plane data, in some embodiments the table mapping state computation module 2310 generates other data tuples, such as those for the routing tables, and BGP configuration data. As described above, the state computation module may use a set of hosts selected for hosting gateways by the host assignment module 2315, the IP address ranges of the VMs connected to the logical networks, and information entered through the input interface about the external router(s) to compute the BGP configuration data tuples.

In some embodiments, the table mapping state computation module 2310 stores its output state in the state storage database(s) 2335. This database 2335 stores MAC address to logical port bindings, physical control plane data output by the table mapping state computation module 2335, routing table data tuples, BGP configuration information, and other data in some embodiments.

The host assignment module 2315 uses a hash function or other algorithm to select gateway hosts for a logical network in some embodiments. Based on information provided by the state computation module 2310, the host assignment module 2315 determines the set of gateway hosts and returns this selection to the state computation module. For instance, in some embodiments, based on logical network configuration input, the state computation module 2310 specifies that a particular logical router will have a specific number of L3 gateways located in a specific set of gateway host clusters. The state computation module 2310 requests that the host assignment module 2315 select a particular gateway host in a particular cluster, information which the state computation module uses when generating the state and the BGP configuration.

As shown, the controller 2300 distributes data to host machines (both VM hosts and gateway hosts) through its MFE interface 2320. Through this interface, the controller distributes physical control plane data, routing table and configuration data tuples, etc. to the MFEs, L3 gateways, etc. at the host machines. In some embodiments, the interface is a direct connection to the host machines, while in other embodiments the controller 2300 is a logical controller that distributes the generated data to a set of physical controllers. Furthermore, in the inline model embodiments, in which the BGP service operates in the gateways rather than the controller, the controller uses this interface to distribute BGP configuration data tuples.

In the illustrated embodiments, however, the BGP service 2325 operates on the controller. This BGP service receives and installs a configuration or set of configurations from the table mapping state computation 2310 (e.g., as a set of data tuples), and then establishes BGP sessions with routers outside of the managed network according to this configuration. In some embodiments, the BGP service 2325 combines the functionality of the namespace daemon and the BGP daemon, in that it receives the data tuples defining the configuration, generates a configuration file useable for instantiating a BGP process, reads and installs the configuration file, and establishes and participates in BGP sessions with the external routers.

The BGP service 2325 of some embodiments opens and establishes BGP sessions with the external routers 2340 through the external network interface 2330. This interface may be a NIC that handles IP packets in some embodiments, similar to the connections between gateways and external routers. Through this interface, the BGP service 2325 sends updates to the external routers 2340 for each BGP session that it establishes, enabling the routers 2340 to forward packets into the logical networks via the gateways provisioned by the controller 2300.

In addition to advertising routes into the logical network to the external router, in some embodiments the controller cluster as route server receives BGP packets from the external router and uses these to update the routing tables for the logical network. In general, BGP is a bidirectional protocol, in that each router in a peer-to-peer session sends its routing information to the other router in the session. As such, the external router(s) of some embodiments send their information to the controller cluster, indicating reachable IP addresses and prefixes. IF, as in FIG. 10, some of the L3 gateways connect to multiple routers, then the controller cluster can determine, for various IP addresses advertised by the L3 gateways, which of the external routers is the optimal next hop for the IP addresses. The controller cluster can then add this information to the routing table that it distributes to the L3 gateways.

Figure 24:
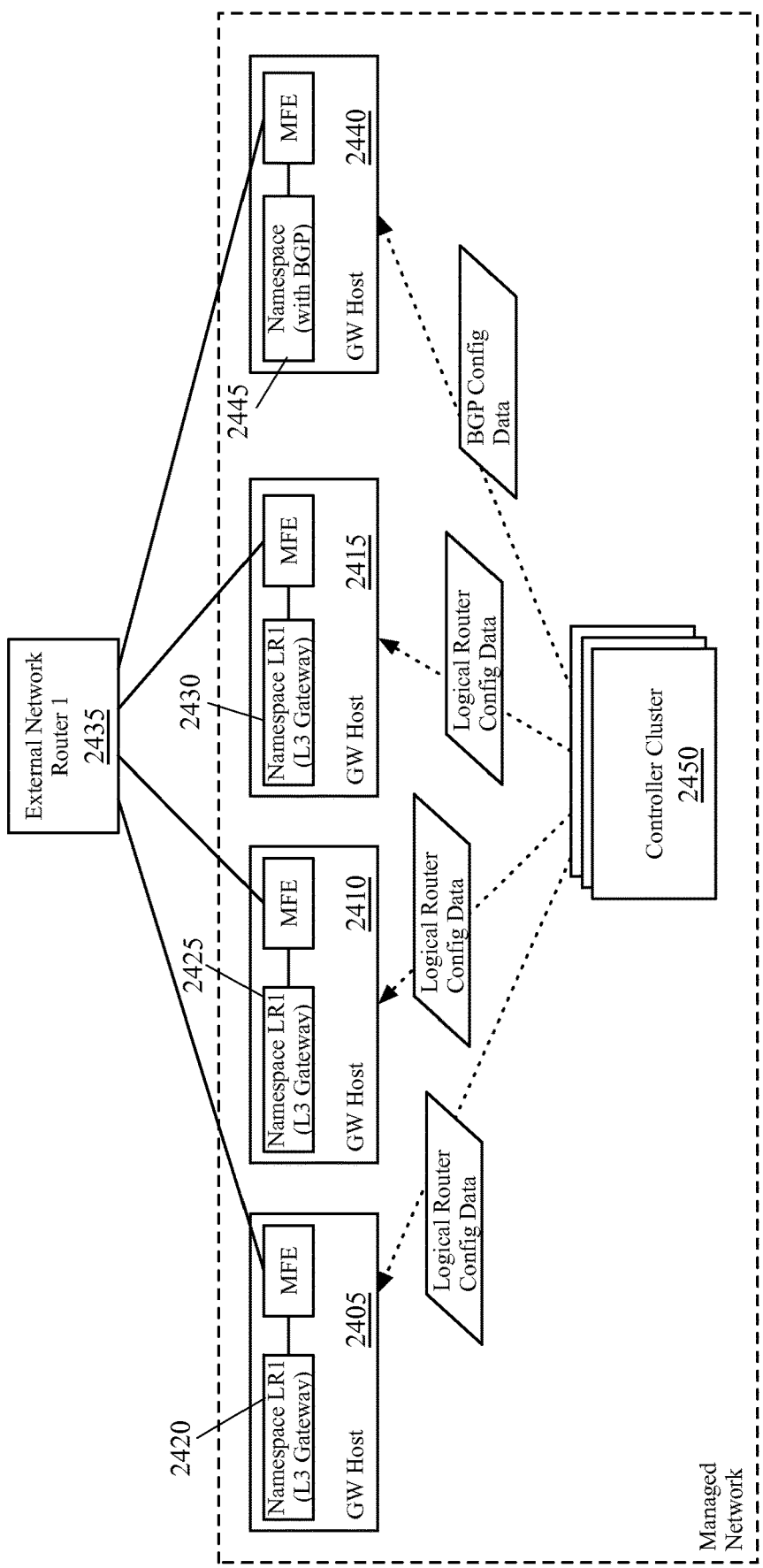
FIG. 24 conceptually illustrates such a managed network of some embodiments within which a logical network is implemented, and which uses a separate gateway as a route server.

While the above section describes using the controller as a route server, some embodiments instead use one or more gateway host machines, separate from the gateway hosts that process ingress and egress traffic for a logical network, as route servers for the logical router. FIG. 24 conceptually illustrates such a managed network 2400 of some embodiments within which a logical network (similar in structure to that of FIG. 1 or FIG. 10) is implemented, and which uses a separate gateway as a route server. For simplicity, this figure does not illustrate the host machines upon which the VMs attached to the logical network reside.

The logical router has three ports connecting to the external network, and therefore these ports are implemented on three gateways 2405-2415, in three namespaces 2420-2430. These namespaces operate as L3 gateways to handle ingress and egress traffic, but do not operate a routing protocol application, and therefore do not exchange data with the external network router 2435. Instead, the controller selects a fourth gateway host 2440 to operate as a route server for the logical network. A namespace 2445 operates on the gateway host 2440, running a BGP daemon similar to those shown above in Section II.

As shown, the controller cluster 2450 generates and distributes (i) logical router configuration data to the three gateway hosts 2405-2415 in order to configure the L3 gateways in the namespaces 2420-2430 and (ii) BGP configuration data to the gateway host 2440 in order to configure the BGP daemon operating in the namespace 2440. This enables the namespace 2445 to open one or more BGP sessions with the external router 2435 and advertise route information to the external router indicating the three L3 gateways as possible next hops for the IP addresses of the logical network.

VI. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 25:
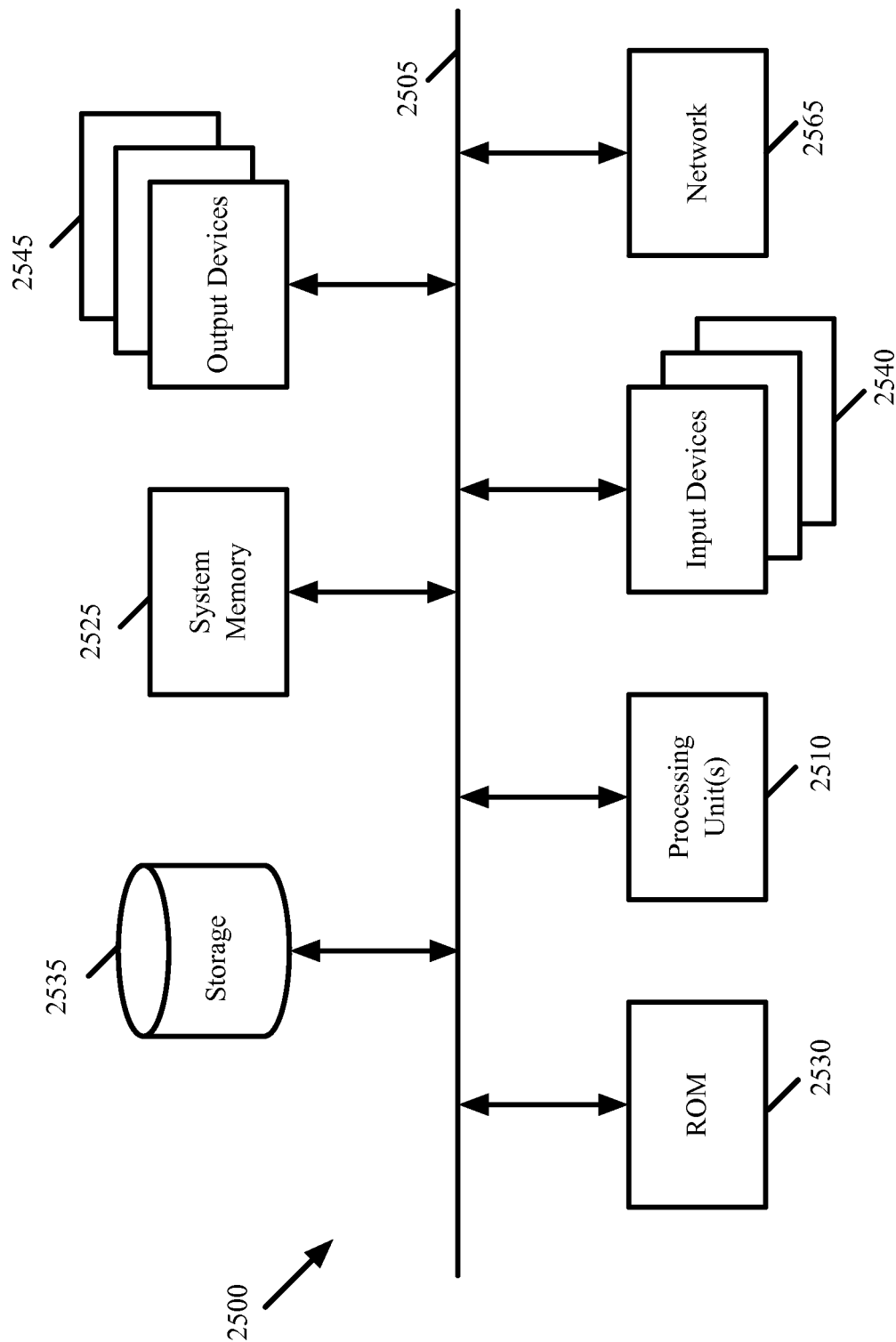
FIG. 25 conceptually illustrates an electronic system with which some embodiments of the invention are implemented.

FIG. 25 conceptually illustrates an electronic system 2500 with which some embodiments of the invention are implemented. The electronic system 2500 can be used to execute any of the control, virtualization, or operating system applications described above. The electronic system 2500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2500 includes a bus 2505, processing unit(s) 2510, a system memory 2525, a read-only memory 2530, a permanent storage device 2535, input devices 2540, and output devices 2545.

The bus 2505 collectively represents all system, peripheral, and chipset buses that communicatively connect the numerous internal devices of the electronic system 2500. For instance, the bus 2505 communicatively connects the processing unit(s) 2510 with the read-only memory 2530, the system memory 2525, and the permanent storage device 2535.

From these various memory units, the processing unit(s) 2510 retrieve instructions to execute and data to process in order to execute the processes of the invention. The processing unit(s) may be a single processor or a multi-core processor in different embodiments.

The read-only-memory (ROM) 2530 stores static data and instructions that are needed by the processing unit(s) 2510 and other modules of the electronic system. The permanent storage device 2535, on the other hand, is a read-and-write memory device. This device is a non-volatile memory unit that stores instructions and data even when the electronic system 2500 is off. Some embodiments of the invention use a mass-storage device (such as a magnetic or optical disk and its corresponding disk drive) as the permanent storage device 2535.

Other embodiments use a removable storage device (such as a floppy disk, flash drive, etc.) as the permanent storage device. Like the permanent storage device 2535, the system memory 2525 is a read-and-write memory device. However, unlike storage device 2535, the system memory is a volatile read-and-write memory, such a random access memory. The system memory stores some of the instructions and data that the processor needs at runtime. In some embodiments, the invention's processes are stored in the system memory 2525, the permanent storage device 2535, and/or the read-only memory 2530. From these various memory units, the processing unit(s) 2510 retrieve instructions to execute and data to process in order to execute the processes of some embodiments.

The bus 2505 also connects to the input and output devices 2540 and 2545. The input devices enable the user to communicate information and select commands to the electronic system. The input devices 2540 include alphanumeric keyboards and pointing devices (also called "cursor control devices"). The output devices 2545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 25, bus 2505 also couples electronic system 2500 to a network 2565 through a network adapter (not shown). In this manner, the computer can be a part of a network of computers (such as a local area network ("LAN"), a wide area network ("WAN"), or an Intranet, or a network of networks, such as the Internet. Any or all components of electronic system 2500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5, 8, 9, and 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a gateway executing on a host computer in a managed network that interfaces with at least one router external to the managed network, wherein a logical network is implemented across a plurality of host computers of the managed network, a method comprising:

routing (i) packets received from the external router and directed to destinations in the logical network and (ii) packets received from the host computers across which the logical network is implemented and directed to destination addresses outside of the logical network; and peering with the external router in order for the logical network to advertise a set of network addresses in the logical network that are reachable through the gateway.

2. The method of claim 1, wherein:

the logical network comprises at least one logical switch to which virtual machines attach;

the virtual machines have a range of network addresses; and the advertised set of network addresses comprises the range of network addresses.

3. The method of claim 1 further comprising advertising an interface of the gateway as a next hop for the set of network addresses in the logical network.

4. The method of claim 1, wherein the gateway is implemented by a namespace executing on the host computer.

5. The method of claim 1, wherein peering with the external router comprises executing a routing protocol application to establish adjacency with the external router and exchange routing information with the external router.

6. The method of claim 5, wherein a daemon executes on the host computer to receive database records defining a configuration for the routing protocol application and to convert the received database records into a configuration file for the routing protocol application.

7. The method of claim 6, wherein the daemon executes within virtualization software of the host computer.

8. The method of claim 6, wherein the configuration comprises data defining settings for the routing protocol application, the set of network addresses reachable through the gateway, and data defining the external router with which to peer.

9. The method of claim 8, wherein the data defining the external router comprises a network address, an autonomous system number, a keep-alive time, and a hold-down timer for the external router.

10. The method of claim 1, wherein:

the logical network is a first logical network implemented across a first plurality of host machines and the gateway is a first gateway;

a second gateway executing on the host computer (i) routes packets received from the external router and directed to destinations in the second logical network and packets received from the host computers across which the second logical network is implemented and directed to destination addresses outside of the second logical network and (ii) peers with the external router in order for the second logical network to advertise a set of network addresses in the second logical network that are reachable through the gateway.

11. A non-transitory machine readable medium storing a program which when executed by at least one processing unit of a host computer in a managed network implements a gateway that interfaces with at least one router external to the managed network, wherein a logical network is implemented across a plurality of host computers of the managed network, the program comprising sets of instructions for:

routing (i) packets received from the external router and directed to destinations in the logical network and (ii) packets received from the host computers across which the logical network is implemented and directed to destination addresses outside of the logical network; and peering with the external router in order for the logical network to advertise a set of network addresses in the logical network that are reachable through the gateway.

12. The non-transitory machine readable medium of claim 11, wherein:

the logical network comprises at least one logical switch to which virtual machines attach;

the virtual machines have a range of network addresses; and the advertised set of network addresses comprises the range of network addresses.

13. The non-transitory machine readable medium of claim 11, wherein the program further comprises a set of instructions for advertising an interface of the gateway as a next hop for the set of network addresses in the logical network.

14. The non-transitory machine readable medium of claim 11, wherein the gateway is implemented by a namespace executing on the host computer.

15. The non-transitory machine readable medium of claim 11, wherein the set of instructions for peering with the external router comprises a set of instructions for executing a routing protocol application to establish adjacency with the external router and exchange routing information with the external router.

16. The non-transitory machine readable medium of claim 15, wherein a daemon executes on the host computer to receive database records defining a configuration for the routing protocol application and to convert the received database records into a configuration file for the routing protocol application.

17. The non-transitory machine readable medium of claim 16, wherein the daemon executes within virtualization software of the host computer.

18. The non-transitory machine readable medium of claim 16, wherein the configuration comprises data defining settings for the routing protocol application, the set of network addresses reachable through the gateway, and data defining the external router with which to peer.

19. The non-transitory machine readable medium of claim 18, wherein the data defining the external router comprises a network address, an autonomous system number, a keep-alive time, and a hold-down timer for the external router.

20. The non-transitory machine readable medium of claim 11, wherein:

the logical network is a first logical network implemented across a first plurality of host machines and the gateway is a first gateway;

a second gateway executing on the host computer (i) routes packets received from the external router and directed to destinations in the second logical network and packets received from the host computers across which the second logical network is implemented and directed to destination addresses outside of the second logical network and (ii) peers with the external router in order for the second logical network to advertise a set of network addresses in the second logical network that are reachable through the gateway.

* * * * *